(12) United States Patent
Xiong et al.

(10) Patent No.: US 8,374,238 B2
(45) Date of Patent: Feb. 12, 2013

(54) SPATIAL SCALABILITY IN 3D SUB-BAND DECODING OF SDMCTF-ENCODED VIDEO

(75) Inventors: Ruiqin Xiong, Beijing (CN); Jizheng Xu, Beijing (CN); Feng Wu, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1874 days.

(21) Appl. No.: 11/127,001

(22) Filed: May 10, 2005

(65) Prior Publication Data

US 2006/0114993 A1 Jun. 1, 2006

Related U.S. Application Data

(60) Provisional application No. 60/587,842, filed on Jul. 13, 2004.

(51) Int. Cl.
*H04N 7/12* (2006.01)
*H04N 1/66* (2006.01)

(52) U.S. Cl. ............... 375/240.11; 375/240.19

(58) Field of Classification Search .......... 348/404, 348/394, 409, 412, 415, 416; 375/240.12, 375/240.11, 240.18, 240.21, 240.16, 240.08, 375/240.2, 240.19, 240.27, 240.25
See application file for complete search history.

(56) References Cited

U.S. PATENT DOCUMENTS

| | | | |
|---|---|---|---|
| 5,136,377 A | 8/1992 | Johnston et al. | |
| 5,300,949 A | 4/1994 | Rodriguez et al. | |
| 5,414,469 A | 5/1995 | Gonzales et al. | |
| 5,565,920 A * | 10/1996 | Lee et al. ............ | 375/240.11 |
| 5,611,038 A | 3/1997 | Shaw et al. | |
| 5,764,296 A | 6/1998 | Shin | |
| RE35,910 E | 9/1998 | Nagata et al. | |
| 5,821,986 A | 10/1998 | Yuan et al. | |
| 5,828,421 A | 10/1998 | Boyce et al. | |
| 5,864,637 A | 1/1999 | Liu et al. | |
| 5,970,173 A | 10/1999 | Lee et al. | |
| 6,002,801 A | 12/1999 | Strongin et al. | |
| 6,104,434 A | 8/2000 | Nakagawa et al. | |
| 6,229,570 B1 * | 5/2001 | Bugwadia et al. ............ | 348/441 |
| 6,239,847 B1 | 5/2001 | Deierling | |
| 6,259,741 B1 | 7/2001 | Chen et al. | |
| 6,339,434 B1 | 1/2002 | West et al. | |
| 6,418,166 B1 | 7/2002 | Wu et al. | |
| 6,456,663 B1 | 9/2002 | Kim | |

(Continued)

FOREIGN PATENT DOCUMENTS

| | | |
|---|---|---|
| CN | 1378384 | 11/2002 |
| CN | 1465193 | 12/2003 |

(Continued)

OTHER PUBLICATIONS

Andreopoulos et al., "A New Method for Complete-to-Overcomplete Discrete Wavelet Transforms," *Proc. IEEE Conf. Digital Signal Proc.*, 4 pp. (Jul. 2002).

(Continued)

*Primary Examiner* — Behrooz Senfi
(74) *Attorney, Agent, or Firm* — Klarquist Sparkman, LLP

(57) ABSTRACT

Techniques and tools are described for scalable video coding and decoding. For example, a 3D sub-band decoder receives video encoded using spatial-domain motion-compensated temporal filtering at a first spatial resolution. The decoder decodes at least part of the video for output at a second spatial resolution lower than the first spatial resolution. The decoder uses any of several techniques to improve performance by devoting extra computational resources to the decoding, devoting extra buffer resources to storing reference picture information, and/or considering spatial high-pass sub-band information.

20 Claims, 21 Drawing Sheets

U.S. PATENT DOCUMENTS

| | | | |
|---|---|---|---|
| 6,499,060 B1 | 12/2002 | Wang et al. |
| 6,501,484 B1 | 12/2002 | Porter |
| 6,510,177 B1 | 1/2003 | De Bonet et al. |
| 6,529,631 B1 | 3/2003 | Peterson et al. |
| 6,535,555 B1 | 3/2003 | Bordes et al. |
| 6,600,785 B1 | 7/2003 | Nishigori et al. |
| 6,678,424 B1 | 1/2004 | Ferguson |
| 6,700,933 B1 | 3/2004 | Wu et al. |
| 6,728,317 B1 | 4/2004 | Demos |
| 6,823,014 B2 | 11/2004 | Kim |
| 6,873,368 B1 | 3/2005 | Yu et al. |
| 6,937,291 B1 | 8/2005 | Gryskiewicz |
| 6,992,725 B2 | 1/2006 | Mohsenian |
| 6,993,078 B2 | 1/2006 | Hall et al. |
| 7,010,037 B2 | 3/2006 | Ye et al. |
| 7,072,525 B1 | 7/2006 | Covell |
| 7,154,952 B2 | 12/2006 | Tourapis et al. |
| 7,200,275 B2 | 4/2007 | Srinivasan et al. |
| 7,233,362 B2 | 6/2007 | Wu |
| 7,317,759 B1 | 1/2008 | Turaga et al. |
| 7,375,767 B2 | 5/2008 | Lee et al. |
| 7,570,834 B2 | 8/2009 | Deshpande |
| 7,653,133 B2 | 1/2010 | Woods et al. |
| 7,747,094 B2 | 6/2010 | Sekiguchi et al. |
| 2002/0037047 A1 | 3/2002 | Van Der Schaar et al. |
| 2002/0064226 A1 | 5/2002 | Bauer et al. |
| 2002/0159484 A1 | 10/2002 | Azizoglu et al. |
| 2002/0181583 A1 | 12/2002 | Corbera |
| 2002/0181586 A1* | 12/2002 | Kondo et al. | 375/240.08 |
| 2002/0186890 A1 | 12/2002 | Lee et al. |
| 2002/0186896 A1 | 12/2002 | Ferguson |
| 2003/0026339 A1 | 2/2003 | Presquet-Popescu et al. |
| 2003/0099298 A1 | 5/2003 | Rose et al. |
| 2003/0133500 A1* | 7/2003 | Auwera et al. | 375/240.11 |
| 2003/0161401 A1 | 8/2003 | Shen et al. |
| 2004/0013195 A1 | 1/2004 | Panusopone et al. |
| 2004/0042549 A1 | 3/2004 | Huang et al. |
| 2004/0213345 A1 | 10/2004 | Holcomb et al. |
| 2004/0264567 A1 | 12/2004 | Xu et al. |
| 2005/0018771 A1 | 1/2005 | Bourge et al. |
| 2005/0157791 A1 | 7/2005 | Sun |
| 2005/0195896 A1 | 9/2005 | Huang et al. |
| 2005/0195900 A1 | 9/2005 | Han |
| 2005/0259729 A1 | 11/2005 | Sun |
| 2005/0281333 A1 | 12/2005 | Ghanbari |
| 2006/0008006 A1 | 1/2006 | Cha et al. |
| 2006/0013305 A1 | 1/2006 | Sun |
| 2006/0072672 A1 | 4/2006 | Lin et al. |
| 2006/0072673 A1 | 4/2006 | Lin et al. |
| 2006/0083303 A1 | 4/2006 | Han et al. |
| 2006/0083308 A1 | 4/2006 | Schwarz et al. |
| 2006/0093036 A1 | 5/2006 | Park et al. |
| 2006/0133485 A1 | 6/2006 | Park et al. |
| 2006/0133503 A1 | 6/2006 | Park et al. |
| 2006/0146937 A1* | 7/2006 | Ye et al. | 375/240.19 |
| 2006/0153465 A1* | 7/2006 | Zhang et al. | 382/240 |
| 2006/0159173 A1 | 7/2006 | Ye et al. |
| 2006/0165302 A1 | 7/2006 | Han et al. |
| 2006/0193388 A1* | 8/2006 | Woods et al. | 375/240.16 |
| 2006/0262985 A1 | 11/2006 | Chen et al. |
| 2006/0268991 A1 | 11/2006 | Segall et al. |
| 2006/0285594 A1 | 12/2006 | Kim et al. |
| 2007/0014349 A1 | 1/2007 | Bao et al. |
| 2007/0053431 A1 | 3/2007 | Cammas et al. |
| 2007/0091997 A1 | 4/2007 | Fogg et al. |
| 2007/0121723 A1 | 5/2007 | Mathew et al. |
| 2007/0140354 A1 | 6/2007 | Sun |
| 2007/0160126 A1 | 7/2007 | Van Der Meer et al. |
| 2007/0160153 A1 | 7/2007 | Sullivan |
| 2007/0171969 A1 | 7/2007 | Han et al. |
| 2007/0201551 A1 | 8/2007 | Wang et al. |
| 2007/0223579 A1 | 9/2007 | Bao |
| 2007/0223582 A1 | 9/2007 | Borer |
| 2007/0230575 A1 | 10/2007 | Han |
| 2007/0274396 A1 | 11/2007 | Zhang et al. |
| 2008/0008249 A1 | 1/2008 | Yan |
| 2008/0013630 A1 | 1/2008 | Li et al. |
| 2008/0084930 A1 | 4/2008 | Sekiguchi et al. |
| 2008/0089417 A1 | 4/2008 | Bao et al. |
| 2008/0095235 A1 | 4/2008 | Hsiang |
| 2008/0152000 A1 | 6/2008 | Kaushik |
| 2008/0165848 A1 | 7/2008 | Yan et al. |
| 2008/0304567 A1* | 12/2008 | Boyce et al. | 375/240.16 |
| 2009/0003718 A1 | 1/2009 | Liu et al. |
| 2009/0060034 A1 | 3/2009 | Park et al. |
| 2009/0060050 A1 | 3/2009 | Park et al. |
| 2009/0207912 A1 | 8/2009 | Holcomb et al. |
| 2009/0219994 A1 | 9/2009 | Tu et al. |
| 2009/0262798 A1 | 10/2009 | Chiu et al. |
| 2010/0142615 A1 | 6/2010 | Han |

FOREIGN PATENT DOCUMENTS

| | | |
|---|---|---|
| EP | 1 401 211 | 3/2004 |
| EP | 1 617 677 | 1/2006 |
| JP | 4-207684 | 7/1992 |
| JP | 2000-506687 | 5/2000 |
| JP | 2000-165866 | 6/2000 |
| JP | 2001-197527 | 7/2001 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-035029 | 2/2008 |
| RU | 2191469 | 10/2002 |
| SU | 1506554 | 9/1989 |
| WO | WO 98/41029 | 9/1998 |
| WO | WO 99/09748 | 2/1999 |
| WO | 00/33581 | 6/2000 |
| WO | 00/74385 | 12/2000 |
| WO | 01/95633 | 12/2001 |
| WO | WO 02/01881 | 1/2002 |
| WO | WO 02/054777 | 7/2002 |
| WO | WO 02/085026 | 10/2002 |
| WO | 02/096120 | 11/2002 |
| WO | WO 03/007619 | 1/2003 |
| WO | WO 03/061294 | 7/2003 |
| WO | WO 2004/036919 | 4/2004 |
| WO | WO 2006/006777 | 1/2006 |
| WO | 2006/079997 | 8/2006 |
| WO | WO 2006/112620 | 10/2006 |
| WO | 2006/125713 | 11/2006 |
| WO | 2007/008286 | 1/2007 |
| WO | 2007/009875 | 1/2007 |
| WO | WO 2007/018669 | 2/2007 |
| WO | 2007/042365 | 4/2007 |
| WO | 2008/004816 | 1/2008 |

OTHER PUBLICATIONS

Andreopoulos et al., "Fully-Scalable Wavelet Video Coding Using In-Band Motion Compensated Temporal Filtering," *IEEE International Conference on Acoustics, Speech, and Signal Processing. IEEE*, 4 pp. (Apr. 2003).

Andreopoulos et al., "Wavelet-Based Fully-Scalable Video Coding With In-Band Prediction," *Proc. 3rd IEEE Benelux Signal Processing Symposium (SPS-2002)*, pp. S02-1 to S02-4 (Mar. 2002).

Chen et al., "Bidirectional MC-EZBC with Lifting Implementation," 26 pp. (document marked May 2003).

Ji et al., "Architectures of Incorporating MPEG-4 AVC into Three-Dimensional Wavelet Video Coding," *Picture Coding Symposium 2004*, 6 pp. (Dec. 2004).

Luo et al., "Advanced Lifting-based Motion Threading (MTh) Technique for the 3D Wavelet Video Coding," *Proceedings of the SPIE/IEEE Visual Communications and Image Processing (VCIP2003)*, vol. 5150, pp. 707-718 (Jun. 2003).

Luo et al., "Motion Compensated Lifting Wavelet and Its Application in Video Coding," *Proceedings of the IEEE Int. Conf. on Multimedia and Expo*, 4 pp. (Aug. 2001).

Mehrseresht et al., "Adaptively Weighted Update Steps in Motion Compensated Lifting Based on Scalable Video Compression," *Proceedings of the IEEE Int. Conf. on Image Processing*, vol. 2, 4 pp. (Sep. 2003).

Pesquet-Popescu et al., "Three-dimensional Lifting Schemes for Motion Compensated Video Compression," *ICASSP*, vol. 3, 4 pp. (2001).

Santa Cruz, "JVT-O061-CE9verif.doc," 2 pp. (downloaded from the World Wide Web on May 10, 2005.).

Sebe et al., "An Overcomplete Discrete Wavelet Transform for Video Compression," 4 pp. (2002).

Secker et al., "Highly Scalable Video Compression Using a Lifting-based 3D Wavelet Transform with Deformable Mesh Motion Compensation," vol. 3, 4 pp. (2002).

Secker et al., "Lifting-based Invertible Motion Adaptive Transform (LIMAT) Framework for Highly Scalable Video Compression," *IEEE Trans. Image Processing*, vol. 12, 35 pp. (Dec. 2003).

Song et al., "Content Adaptive Update Steps for Lifting-Based Motion Compensated Temporal Filtering," *Picture Coding Symposium*, 5 pp. (Dec. 2004).

Sun et al., "Seamless Switching of Scalable Video Bitstreams for Efficient Streaming," *IEEE Transactions on Multimedia*, vol. 6, No. 2, pp. 291-303 (Apr. 2004).

Voloshynovskiy et al., "A Stochastic Approach to Content Adaptive Digital Image Watermarking," 26 pp. (1999).

Wu et al., "Smart: An Efficient, Scalable and Robust Streaming Video System," *EURASIP on Applied Signal Processing*, vol. 2, 39 pp. (Feb. 2004).

Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).

Xiong et al., "Spatial Scalability in 3D Wavelet Coding with Spatial Domain MCTF Encoder," *Picture Coding Symposium*, 6 pp. (Dec. 2004).

Xu et al., "3D Sub-band Video Coding Using Barbell Lifting," MPEG2004/M10569/S05, 14 pp. (downloaded from the World Wide Web on May 10, 2005.).

Anonymous, "Video Subgroup Schedule, 68th MPEG Meeting," 6 pp. (Mar. 2004).

Brainard et al., "Composite Television Coding: Subsampling and Interpolation," SMPTE Journal, pp. 717-724 (Aug. 1982).

Catmull et al., "A Class of Local Interpolating Splines," Computer Aided Geometric Design, Academic Press, pp. 317-326 (Mar. 1974).

Chang et al., "A Scalable Video Compression Technique Based on Wavelet Transform and MPEG Coding" *IEEE Trans. on Consumer Electronics*, vol. 45, No. 3, pp. 788-793 (Aug. 1999).

Chen et al., "Adaptive Joint Source-Channel Coding using Rate Shaping," *ICASSP*, 4 pp. (May 2002).

Chen et al., "Frame Loss Error Concealment for SVC," *Journal of Zhejiang Univ.—Science A*, vol. 7, No. 5, pp. 677-683 (May 2006).

Choi et al., "Motion-compensated 3-D subband coding of video," *IEEE Trans. on Image Processing*, vol. 8, No. 2, pp. 155-167 (Feb. 1999).

Chooi et al., "3D Subband Coder for Very Low Bit Rates" *IEEE*, pp. 405-408 (Apr. 1994).

"DivX Multi Standard Video Encoder," 2 pp. (Downloaded from the World Wide Web on Jan. 24, 2006).

Dufaux et al., "Abstract: Motion-compensated generic coding of video based on a multi resolution data structure," 2 pp. (1993) [downloaded from the World Wide Web on Jan. 25, 2006].

Einarsson et al., "Mixed Resolution Video Coding for Low Bit-Rate Channels," *Proc. Int'l Workshop on Coding Techniques for Very Low Bit-Rate Video: VLBV97*, Linköping, Sweden, pp. 77-80 (Jul. 1997).

Gharavi et al., "Video Coding and Distribution over ATM for Multipoint Teleconferencing," GLOBECOM '93, 7 pp. (1993).

Han et al., "Robust and Efficient Scalable Video Coding with Leaky Prediction," *IEEE Int'l Conf. on Image Processing*, vol. 2, 4 pp. (Sep. 2002).

ISO/IEC, "ISO/IEC 11172-2: Information Technology—Coding of Moving Pictures and Associated Audio for Storage Media at up to About 1.5 Mbit/s," 122 pp. (Aug. 1993).

ISO/IEC 14496-10, Joint Video Team (JVT) of ISO/IEC MPEG & ITU-T VCEG, Joint Draft 6, Apr. 2006, 527 pgs.

ISO/IEC, "Information Technology—Coding of Audio-Visual Objects: Visual, ISO/IEC 14496-2, Committee Draft," 330 pp. (Mar. 1998).

ISO/IEC JTC1/SC29/WG11 MPEG2003/N6193, "Call for Proposals on Scalable Video Coding Technology," 12 pp. (Dec. 2003).

ISO/IEC JTC1/SC29/WG11 MPEG2004/W6383, "Subjective test results for the CfP on Scalable Video Coding Technology," 17 pp. (Mar. 2004).

ITU, Recommendation H.261, "Line Transmission of Non-Telephone Signals," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

ITU, "ITU-T Recommendation H.264: Advanced Video Coding for generic audiovisual services," 281 pp. (May 2003).

Iwahashi et al., "A Motion Compensation Technique for Downscaled Pictures in Layered Coding," *IEICE Transactions on Comm.*, vol. E77-B , No. 8, pp. 1007-1012 (Aug. 1994).

Ji et al., "Three-Dimensional Subband Scalable Video Coding Embedded with H.264/AVC/ Codec," *Proc of SPIE*, vol. 5960, pp. 201-209 (Jul. 2005).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).

Karlsson et al., "Subband Coding of Video for Packet Networks" *Optical Engineering*, vol. 27, No. 7, pp. 574-586 (Jul. 1988).

Keys, "Cubic Convolution Interpolation for Digital Image Processing," Computer Graphics, vol. ASSP-29, No. 6, pp. 1153-1160 (Dec. 1981).

Kirenko et al., "Modification of 3d Wavelet Scalable Video Coding" Philips Research Laboratories, The Netherlands, 6 pp. (document not dated).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Mitchell et al., "Reconstruction Filters in Computer Graphics," Computer Graphics, vol. 22, No. 4 pp. 221-228 (Aug. 1988).

Notice on First Office Action dated Jul. 10, 2009, from Chinese Patent Application No. 200510109821.X, 7 pp.

Ohm, "Three Dimensional Subband Coding with Motion Compensation," *IEEE Trans. on Image Processing*, vol. 3, No. 5, pp. 559-571 (Sep. 1994).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Schwarz et al., "Overview of the Scalable H.264/MPEG4-AVC Extension," *IEEE Int'l Conf. on Image Processing*, 4 pp. (Oct. 2006).

Schwarz et al., "Overview of the Scalable Video Coding Extension of the H.264/AVC Standard," *IEEE Transactions on Circuits and Systems for Video Technology*, 18 pp. (Sep. 2007).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Tomasi et al., "Bilateral Filtering for Gray and Color Images," *IEEE Int'l Conf. on Computer Vision*, 8 pp. (Jan. 1998).

Video Compression 1: H 261—Multimedia Systems (Module 4 Lesson 2), 5 pp. (document not dated).

Wang et al., "Adaptive Image Matching in the Subband Domain," *Proc. SPIE*, 12 pp. (Dec. 2004).
Wang et al., "WZS: Wyner-Ziv Scalable Predictive Video Coding," *Proc. Picture Coding Symposium*, 6 pp. (Dec. 2004).
Wien, "Variable Block-Size Transforms for Hybrid Video Coding," Dissertation, 182 pp. (Feb. 2004).
Xu et al., "Three-Dimensional Embedded Subband Coding with Optimal Truncation (3D ESCOT," *Applied and Computational Harmonic Analysis*, pp. 290-315 (May 2001).
Zhao et al., "Macroblock Skip-Mode Prediction for Complexity Control of Video Encoders," *IEEE Int'l Conf. on Visual Information Engineering*, 4 pp. (Jul. 2003).
Notice on Grant of Patent Right for Invention dated Mar. 25, 2010, from Chinese Patent Application No. 200510109821.X, 4 pp.
Bjontegaard et al., "H.263 Anchors—Technical Description," MPEG95/0322 (1995).
Chen et al., "Improved MC-EZBC with Quarter-pixel Motion Vectors," ISO/IEC JTC1/SC29/WG11, MPEG2002/m8366, Fairfax (2002).
Chen et al., "Improvements to the MC-EZBC Scalable Video Coder," ICIP 2003, vol. 2, pp. 14-17 (Sep. 2003).
Li et al., "All-phase Motion Compensated Prediction for High Performance Video Coding," Proc. ICIP, vol. 3, pp. 538-541 (2001).
Netravali et al., "Adaptive Quantization of Picture Signals Using Spatial Masking," *Proc. IEEE*, vol. 65, pp. 536-548 (1977).
Abhayaratne, "2D Wavelet Transforms with a Spatially Adaptive 2D Low Pass Filter," *Signal Processing Symp.*, pp. 93-96 (Jun. 2004).
Abhayaratne, "Spatially Adaptive Integer Lifting with No Side Information for Lossless Video Coding," *Picture Coding Symp.*, 6 pp. (Apr. 2003).

Andreopoulos et al., "Complete-to-Overcomplete Discrete Wavelet Transforms for Scalable Video Coding with MCTF," *Proc. SPIE Visual Communications and Image Processing*, pp. 719-731 (Jul. 2003).
European Search Report dated Jun. 9, 2011, from European Patent Application No. 05106331.1, 9 pp.
ISO/IEC JTC1/SC29/WG11 MPEG2004/M11126, "Spatial Scalability in 3D Wavelet Coding with Spatial Domain MCTF Encoder," 14 pp. (Jul. 2004).
Notice of Rejection dated Jun. 24, 2011, from Japanese Patent Application No. 2005-204298, 3 pp.
Piella et al., "An Adaptive Update Lifting Scheme with Perfect Reconstruction," *IEEE Int'l Conf. on Image Processing*, vol. 3, pp. 190-193 (Oct. 2001).
Turaga et al., "Content-adaptive filtering in the UMCTF framework," *IEEE Proc. Int'l Conf. on Acoustics, Speech and Signal Processing*, vol. 3, pp. 621-624 (Apr. 2003).
Wu et al., "Bit-depth scalability compatible to H.264/AVC-scalable extension," *J. Vis. Commun. Image R.*, vol. 19, pp. 372-381 (Jun. 2008).
Yang et al., "A Novel Adaptive De-Interlacing Algorithm Based on Motion Compensation," *Microelectronics and Computer*, Issue 9, pp. 4-6 (Sep. 30, 2002).
Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).

\* cited by examiner

Software 180 implementing video decoder adapted for spatial scalability in inverse motion-compensated temporal filtering

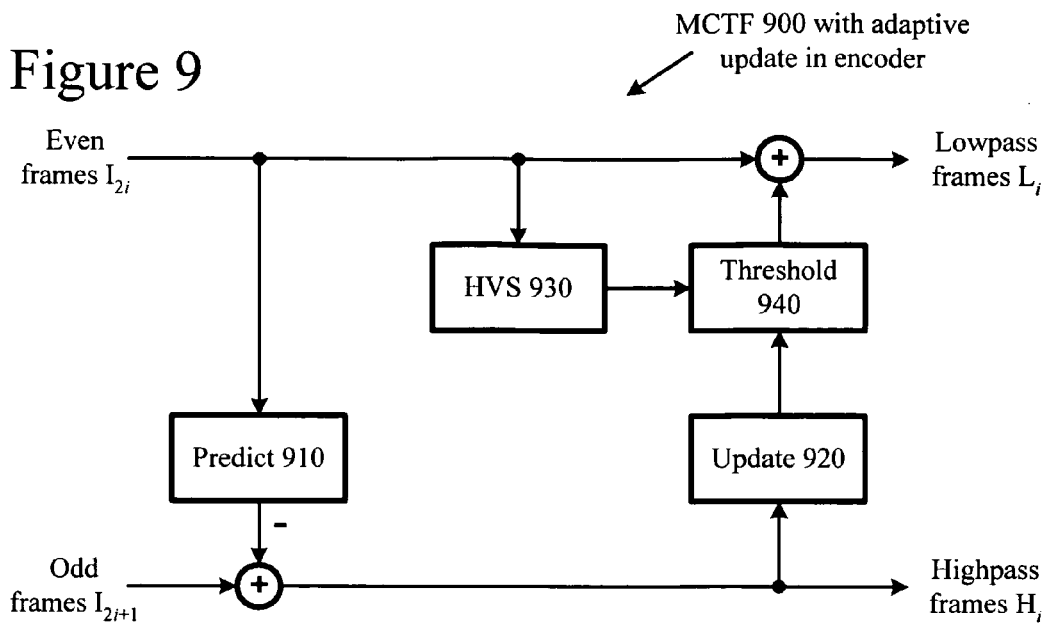
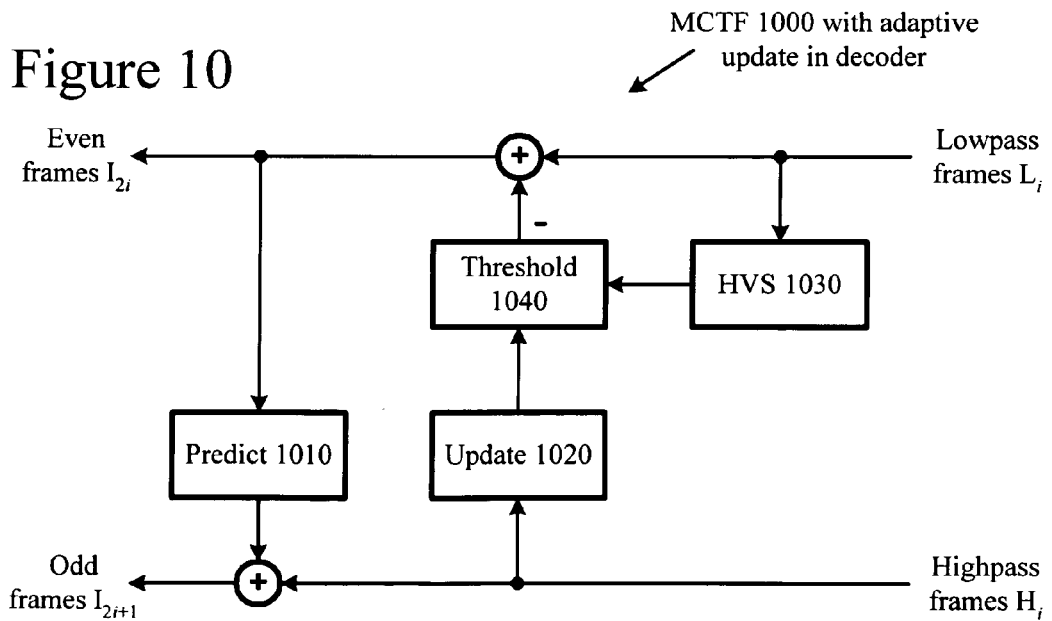

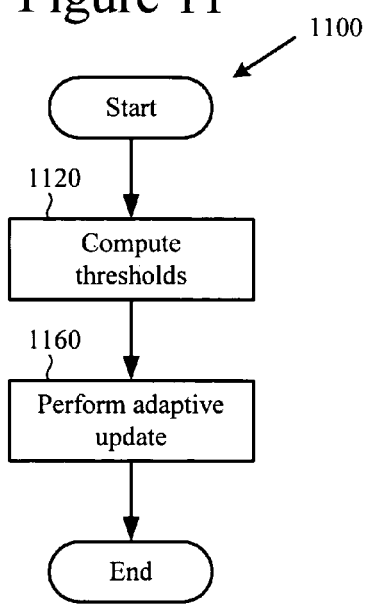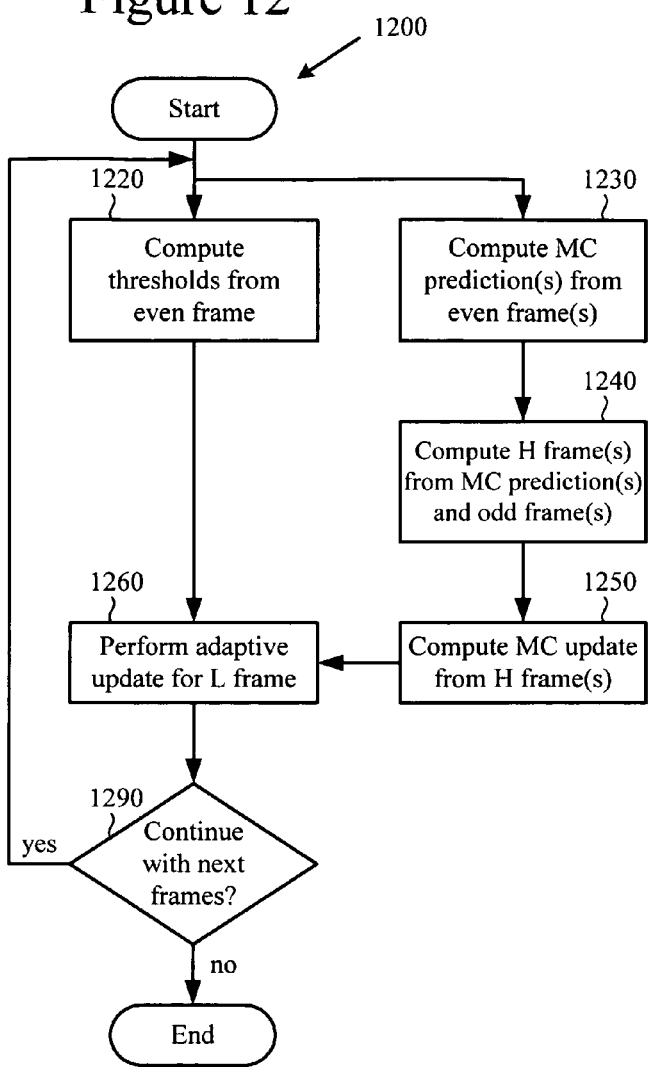

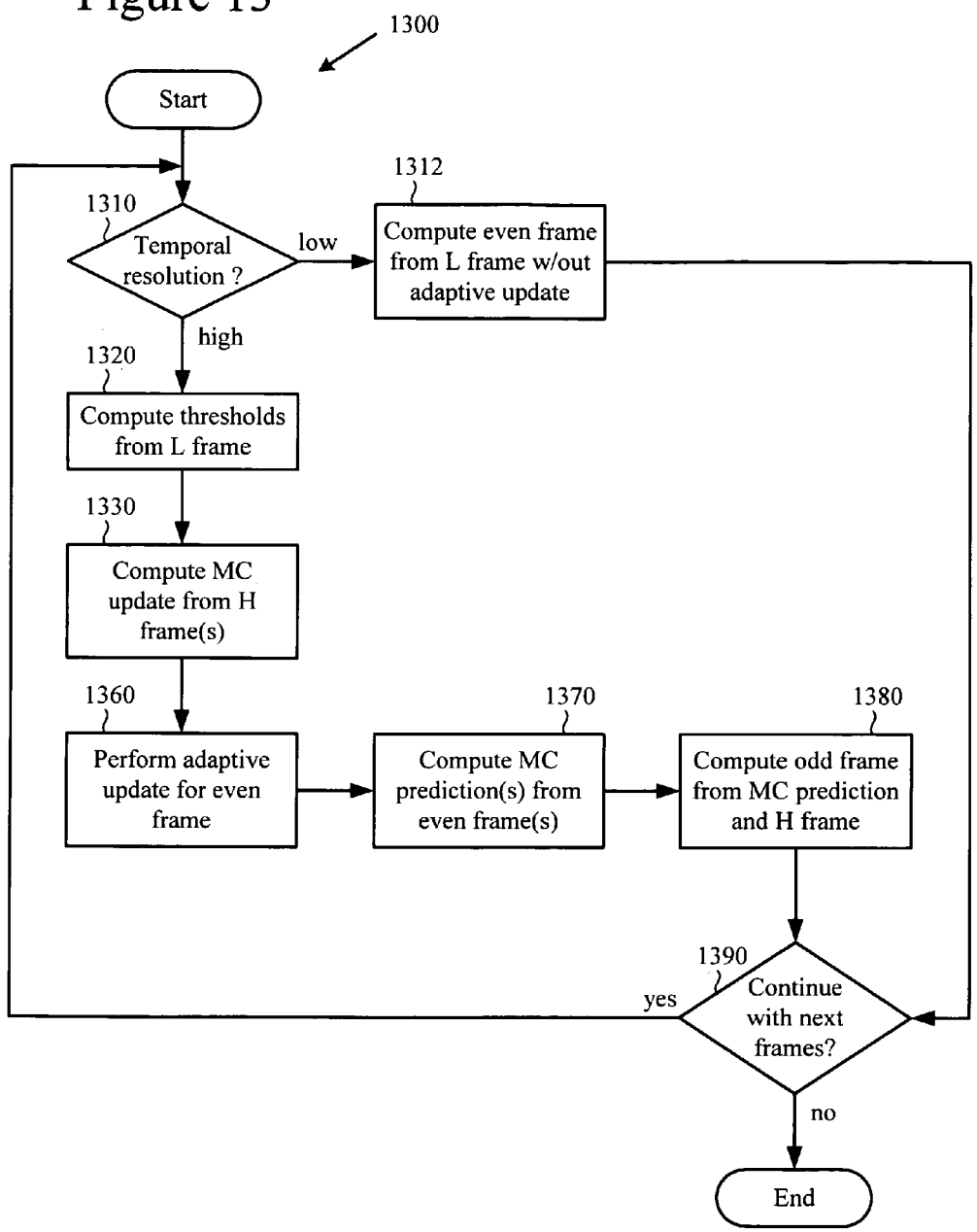

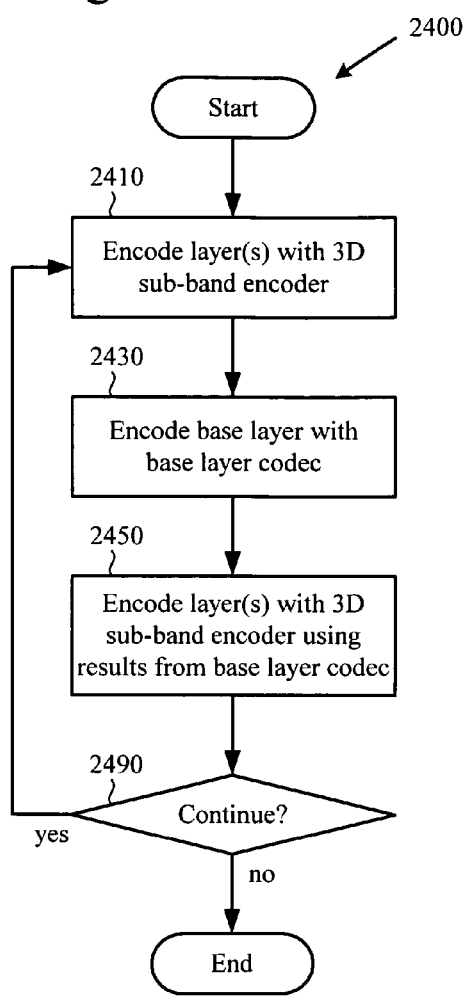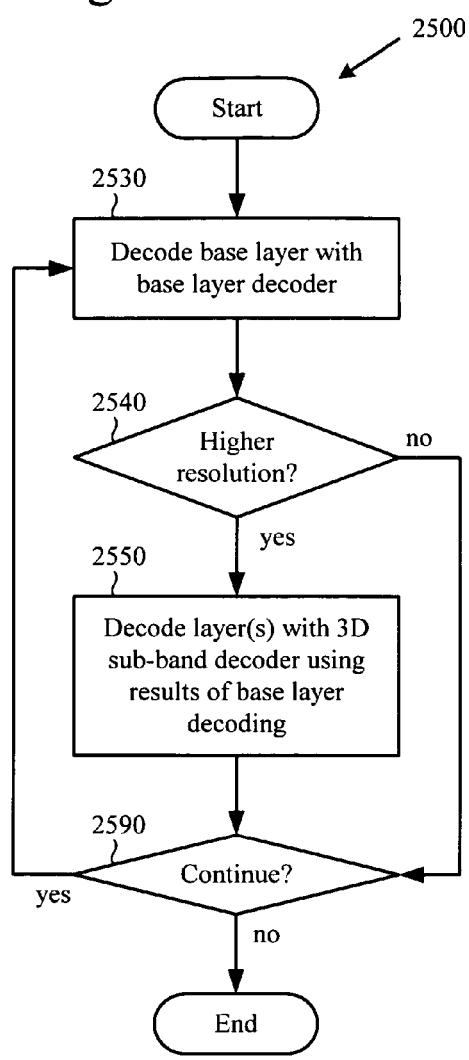

SPATIAL SCALABILITY IN 3D SUB-BAND DECODING OF SDMCTF-ENCODED VIDEO

CROSS REFERENCE TO RELATED APPLICATION

This application claims the benefit of U.S. Provisional Application No. 60/587,842, filed Jul. 13, 2004, the disclosure of which is hereby incorporated by reference.

FIELD

Techniques and tools are described for scalable video coding and decoding. For example, for video encoded using spatial-domain motion-compensated temporal filtering at a particular spatial resolution, a video decoder reconstructs video for output at a lower spatial resolution.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

As a general rule in video compression, quality varies directly in relation to bit rate. For a given video sequence, if the sequence is encoded at higher quality, the bit rate for the sequence will be higher, and if the sequence is encoded at lower quality, the bit rate for the sequence will be lower. Various factors can affect the bit rate and quality of a raw video sequence, including temporal resolution (e.g., 7.5, 15, 30, or 60 video frames per second), spatial resolution (e.g., 176×144 (QCIF), 352×288 (CIF), or 704×576 (4CIF) pixels per video frame), and sample resolution (e.g., 8, 16, or 24 bits per pixel). Quality and bit rate may be changed by moving temporal, spatial, and/or sample resolution up or down.

Quality and bit rate also depend on the amount of distortion introduced by simplification or removal of information content during lossy compression. This affects, for example, the amount of blurriness, blockiness, graininess, etc. in the video when reconstructed. Stated differently, lossy compression decreases the quality of the sequence so as to allow the encoder to achieve lower bit rates.

As another general rule, quality and bit rate depend on the complexity of a video sequence in terms of detail and motion. For some fixed quality level, a complex sequence typically requires more bits to encode than a simple sequence. The flip side of this is, when encoded at some fixed bit rate, the complex sequence typically has lower quality than the simple sequence.

In some scenarios, encoding video at a single bit rate/quality level is all that is required. For example, if video is being encoded for playback with a single type of device, or if video is being encoded for playback in a point-to-point videoconference over a telephone line, it may be desirable to simply encode the video at a single bit rate/quality level. In many other scenarios, however, encoding video at multiple bit rates and quality levels is desirable. For example, when streaming video over the Internet, a video server often has to provide video to devices with different capabilities and/or deliver video over various kinds of network environments with different speed and reliability characteristics.

One way to address diverse network and playback requirements is to encode the same video sequence at multiple bit rates and quality levels, which can lead to storage and transmission inefficiencies for the multiple independent compressed video bit streams. As an alternative, sub-band or wavelet video encoding provides a way to encode a video sequence in a multi-resolution way in a single, scalable compressed video bitstream. With sub-band or wavelet encoding, a video sequence is decomposed into different temporal and spatial sub-bands.

As a simple example, a video sequence is split into a low resolution temporal sub-band (roughly corresponding to a lower frame rate version of the sequence) and a high resolution temporal sub-band (which can be combined with the low resolution temporal sub-band to reconstruct the original frame rate sequence). Information for an individual video frame may similarly be split into a low resolution spatial sub-band and multiple higher resolution spatial sub-bands. Temporal and spatial decomposition may be used together. Either type of decomposition may be repeated, for example, such that a low resolution sub-band is further decomposed. By selecting particular sub-bands for transmission or decoding at different resolutions, temporal and spatial scalability can be implemented.

In addition, information for an individual sub-band may be represented as a bit plane with multiple layers of bit resolution. Fidelity to the original encoded information can be selectively reduced (along with bit rate) by transmitting some, but not all, of the bits for the sub-band. Or, fidelity can be selectively reduced (along with processing requirements) by decoding less than all of the bits for the sub-band.

Although scalable video coding and decoding techniques facilitate various spatial, temporal, and bit fidelity scalabilities of a compressed bit stream, there are several shortcomings to existing scalable video coding and decoding techniques.

Existing scalable video coding and decoding techniques typically do not provide performance that is competitive with non-scalable techniques at low bit rates. While the performance of scalable video coding and decoding techniques is good at higher bit rates and qualities, they use too many bits at low bit rates compared to non-scalable video coding and decoding techniques.

Moreover, many existing hardware and software tools were designed according to specific non-scalable video coding and decoding techniques. Users of such tools may be reluctant to invest in new scalable video coding and decoding techniques and tools that are incompatible with existing tools. Moreover, content providers may be reluctant to produce encoded content that is incompatible with the prevailing installed base of video decoding tools.

Sometimes, a decoder plays back video at a spatial resolution lower than the original spatial resolution. This might occur, for example, if a decoder device has only a small screen or if higher spatial resolution information is dropped by a network. Decoding at the lower spatial resolution is problematic, however, when temporal decomposition occurs at the original spatial resolution during encoding. Existing scalable video decoding techniques fail to adequately address this decoding scenario.

Finally, existing scalable video coding and decoding techniques fail to account for the perceptibility of distortion in certain decisions during encoding and decoding. Specifically, existing scalable video coding techniques introduce an excessive amount of perceptible distortion in low resolution temporal sub-bands in some kinds of temporal decomposition.

Given the critical importance of compression and decompression to digital video, it is not surprising that scalable video coding and decoding are richly developed fields. Whatever the benefits of previous scalable video coding and decoding techniques, however, they do not have the advantages of the following techniques and tools.

SUMMARY

Techniques and tools described herein improve the performance of scalable video coding and decoding. For example, a 3D sub-band video decoder receives video encoded using spatial-domain motion-compensated temporal filtering ("SDMCTF") at one spatial resolution. The 3D sub-band video decoder decodes the video for output at a lower spatial resolution. Using any of several techniques, the 3D sub-band decoder improves performance in such decoding.

According to a first set of tools and techniques, a decoder such as a 3D sub-band decoder receives video encoded by SDMCTF at a first spatial resolution. The decoder decodes at least part of the video with in-band inverse motion-compensated temporal filtering for output at a second spatial resolution lower than the first spatial resolution. In doing so, the decoder performs interpolation for one or more reference pictures, and the interpolation is not in-band interpolation on buffered spatial low-pass sub-band information. For example, the decoder: (1) performs an inverse spatial sub-band transform on the buffered spatial low-pass sub-band information, (2) performs an overcomplete spatial sub-band transform on the results of the inverse spatial sub-band transform (where the interpolation applies to the results of the overcomplete spatial sub-band transform), and (3) performs motion-compensated prediction. Or, the decoder: (1) performs an inverse spatial sub-band transform on the buffered spatial low-pass sub-band information (where the interpolation applies to the results of the inverse spatial sub-band transform), (2) performs a downsampling discrete wavelet transform on the results of the interpolation, and (3) performs motion-compensated prediction.

According to a second set of tools and techniques, a decoder such as a 3D sub-band decoder receives video encoded by SDMCTF at a first spatial resolution. The decoder decodes at least part of the video with spatial-domain inverse motion-compensated temporal filtering ("SDIMCTF") for output at a second spatial resolution lower than the first spatial resolution. One or more reference pictures for the SDIMCTF are reconstructed from received spatial low-pass sub-band information, but not from received spatial high-pass sub-band information associated with resolution enhancement up to the first spatial resolution. For example, the decoder: (1) performs an inverse spatial sub-band transform on the received spatial low-pass sub-band information but not any spatial high-pass sub-band information, (2) performs spatial-domain interpolation on the results of the inverse spatial sub-band transform, (3) performs motion-compensated prediction for the SDIMCTF using the results of the spatial-domain interpolation as reference picture information, and (4) performs a spatial sub-band transform on the results of the motion-compensated prediction. Or, the decoder: (1) performs spatial-domain interpolation on buffered spatial-domain information, and (2) performs motion-compensated prediction for the SDIMCTF using the results of the spatial-domain interpolation as reference picture information.

According to a third set of tools and techniques, a decoder such as a 3D sub-band decoder receives video encoded by SDMCTF at a first spatial resolution. The decoder decodes at least part of the video with SDIMCTF for output at a second spatial resolution lower than the first spatial resolution. The decoding uses spatial high-pass sub-band information associated with resolution enhancement up to the first spatial resolution to improve motion compensation performance in the SDIMCTF, but does not use the spatial high-pass sub-band information to enhance resolution up to the first spatial resolution. For example, the decoder: (1) performs spatial-domain interpolation on buffered spatial-domain information, and (2) performs motion-compensated prediction for the SDIMCTF using the results of the spatial-domain interpolation as reference picture information. The spatial high-pass sub-band information may be generated as intermediate results of the SDIMCTF and retained as the buffered spatial-domain information. Or, the spatial high-pass sub-band information may be part of the received video, such that the buffered spatial-domain information is generated from received spatial low-pass sub-band information and the received spatial high-pass sub-band information.

The foregoing and other objects, features, and advantages of the invention will become more apparent from the following detailed description, which proceeds with reference to the accompanying figures.

BRIEF DESCRIPTION OF THE DRAWINGS

FIGS. 9 and 10 are block diagrams illustrating MCTF with an adaptive update stage in an encoder and IMCTF with an adaptive update stage in a decoder, respectively.

FIGS. 11, 12, and 13 are flowcharts illustrating techniques for adaptive update operations.

FIG. 24 is a flowchart illustrating a technique for scalable encoding with a 3D sub-band encoder having an embedded base layer codec.

FIG. 25 is a flowchart illustrating a technique for scalable decoding with a 3D sub-band decoder having an embedded base layer decoder.

DETAILED DESCRIPTION

In three-dimensional ("3D") wavelet or sub-band video coding, video is decomposed into many temporal-spatial sub-bands through a number of temporal transforms and spatial transforms. The sub-bands are somewhat independent, in that some of them can be dropped for scalability. For example, to decode low spatial resolution video, the spatial high-pass sub-bands are dropped and a decoder carries out decoding only with the received data in spatial low-pass sub-bands.

The various techniques and tools described herein may be used independently. Some of the techniques and tools may be used in combination (e.g., in different phases of a combined encoding and/or decoding process).

I. Example Operating Environments

Figure 1:
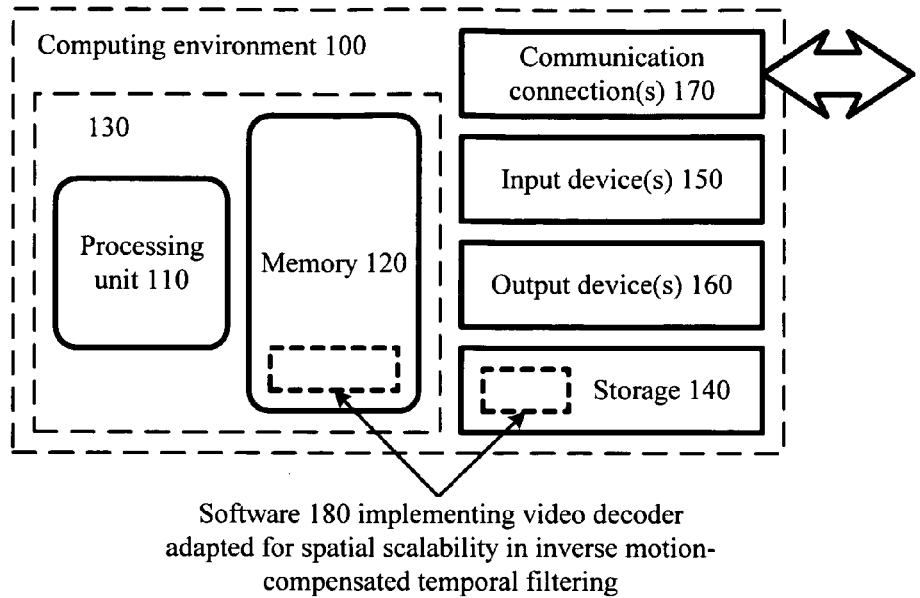
FIG. 1 is a block diagram of a generalized operating environment for scalable video coding and decoding.

FIG. 1 illustrates a generalized example of a suitable computing environment (100) in which several of the described embodiments may be implemented. The computing environment (100) is not intended to suggest any limitation as to scope of use or functionality, as the described techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing a video encoder and/or decoder that uses one or more of the techniques described herein.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "signal," "determine," and "apply" to describe computer operations in a computing environment. These terms are high-level abstractions for operations performed by a computer, and should not be confused with acts performed by a human being. The actual computer operations corresponding to these terms vary depending on implementation.

II. Example Video Encoders and Video Decoders

Figure 2:
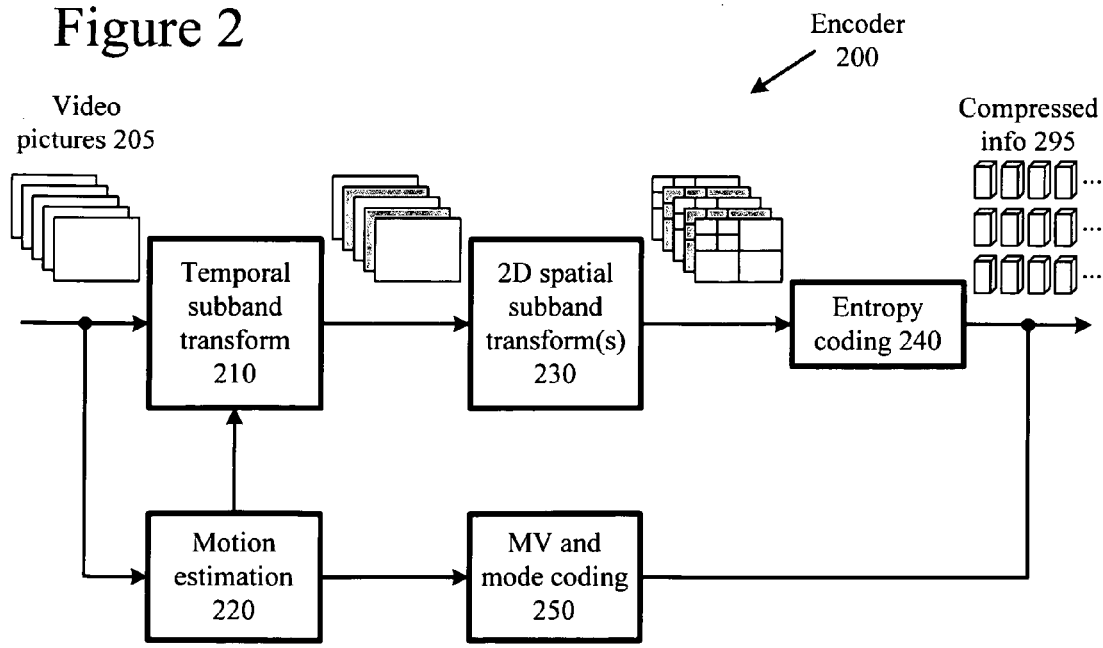
FIGS. 2, 3, 4, and 5 are block diagrams of generalized video encoders and/or decoders in conjunction with which various described embodiments may be implemented.
Figure 3:
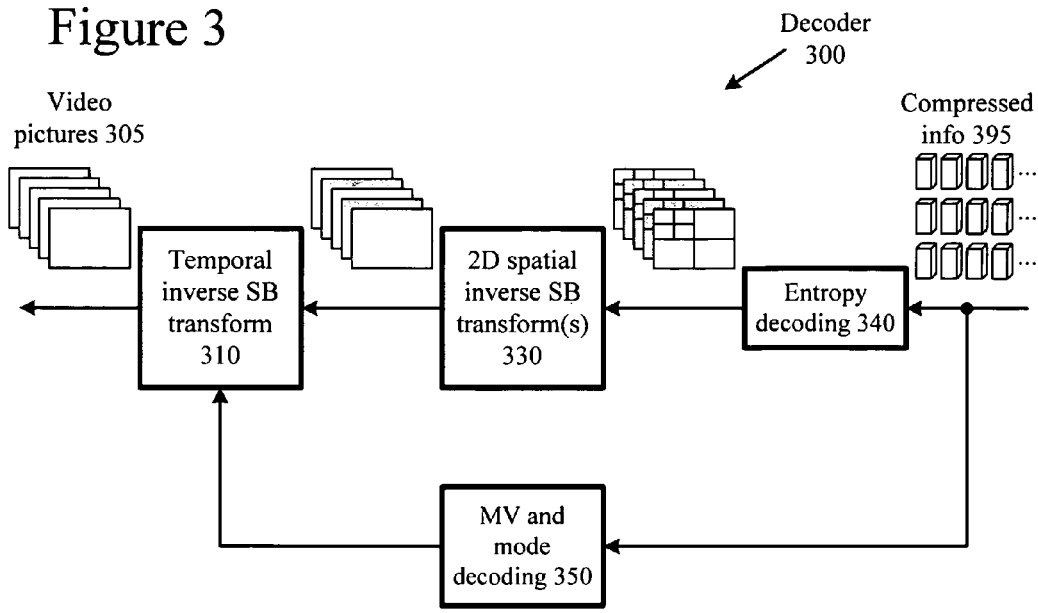
Figure 4:
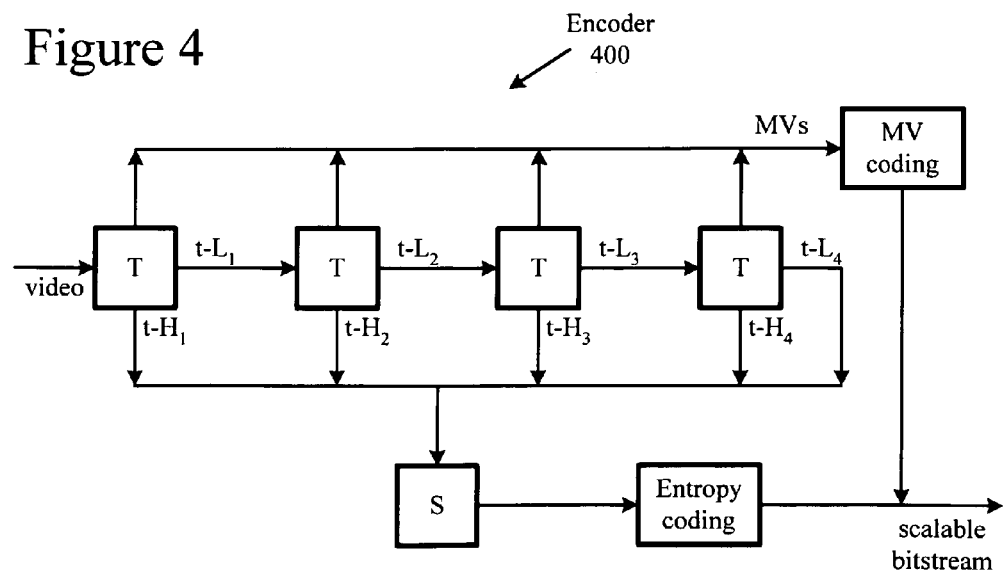
Figure 5:
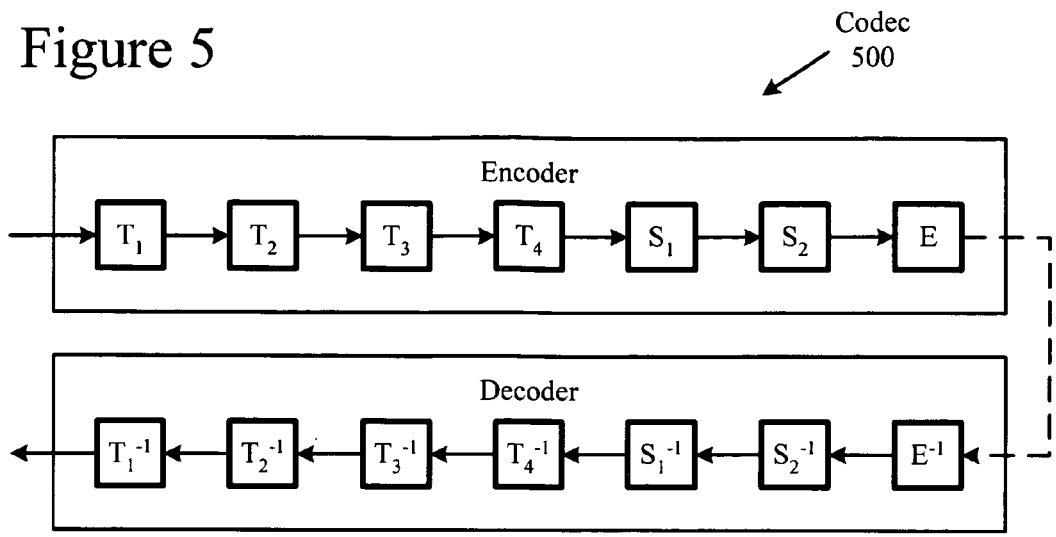

FIG. 2 is a block diagram of a generalized video encoder system (200) in conjunction with which various described embodiments may be implemented. FIG. 4 shows a generalized encoder (400) with four layers of temporal decomposition followed by one layer of spatial decomposition. FIG. 3 is a block diagram of a generalized video decoder system (300), in conjunction with which various described embodiments may be implemented. FIG. 5 shows a combined encoder/decoder system (500) with four layers of (inverse) temporal decomposition and two layers of (inverse) spatial decomposition.

The relationships shown between modules within the encoders and decoders indicate the main flow of information in the encoders and decoders; other relationships are not shown for the sake of simplicity. In particular, aside from motion information, FIGS. 2 and 3 do not show side information indicating the encoder settings, modes, tables, etc. used for a video sequence, frame, macroblock, block, etc. Such side information is sent in the output bit stream, potentially after entropy encoding of the side information.

Depending on implementation and the type of compression desired, modules of an encoder or decoder shown in the Figures can be added, omitted, split into multiple modules, combined with other modules, and/or replaced with like modules. In alternative embodiments, encoders or decoders with different modules and/or other configurations of modules perform one or more of the described techniques. For example, although FIG. 2 shows spatial decomposition (230) downstream from temporal decomposition (210) in the encoder system (200), the encoder system (200) may alternatively or in addition include one or more layers of spatial decomposition before the temporal decomposition (210) begins. In such a case, a corresponding decoder system (300) may include one or more layers of inverse spatial decomposition after the inverse temporal decomposition (310).

3D sub-band video coding achieves performance comparable to state-of-the-art non-scalable video coding (e.g., per the H.264 or VC-1 standard) at middle or high bit rates. Compared to conventional non-scalable approaches, however, the amount of bits spent on coding motion vectors in 3D sub-band video coding is relatively large. As a result, 3D sub-band video coding typically performs worse than non-scalable approaches at low bit rates, where the bits spent coding motion vectors account for a larger percentage of the total bit rate.

A. Example Video Encoders 3D sub-band video coding is an elegant way to provide multiple levels of spatial and/or temporal scalability by employing multiple levels of spatial/temporal sub-band decomposition of video. FIG. 2 illustrates a generic 3D sub-band video coding scheme (200). The encoder (200) receives a sequence of video pictures (205) (e.g., progressive video frames, interlaced video frames, or fields of interlaced video frames), and produces compressed video information (295) as output. Particular embodiments of video encoders typically use a variation or supplemented version of the generalized encoder (200).

The encoder (200) decomposes a video signal by a temporal sub-band transform (210). FIG. 2 shows output for a single level of temporal decomposition into a low resolution sub-band and a high resolution sub-band, but the temporal decomposition may include 4, 5, or some other number of levels of decomposition.

In FIG. 2, the temporal decomposition (210) is a motion-compensated temporal filtering ("MCTF"), so the encoder (200) performs motion estimation (220) to compute motion information for the video signal. The exact strategy of the motion estimation (220) depends on implementation and can include, for example, integer-pixel searching followed by sub-pixel refinement, a spiral search pattern, minimization of a rate-distortion function that considers actual or modeled residual coding cost, motion information coding cost, motion prediction modes, etc.

In some implementations, the encoder (200) computes motion vectors for variable-size blocks of motion vectors (from 4×4 up to 16×16) in the motion estimation (220) and applies such motion vectors in MCTF. For example, for a 16×16 macroblock, the encoder (200) computes motion vector(s) for one 16×16 partition, two 16×8 partitions, two 8×16 partitions, or four 8×8 partitions, where each 8×8 may be further split into two 8×4 partitions, two 4×8 partitions, or four 4×4 partitions. Or, the encoder (200) computes motion vectors for larger blocks (e.g., 32×32) of higher spatial resolution video (e.g., CIF) to facilitate use of the motion vectors when decoding only lower spatial resolution video (e.g., QCIF). Alternatively, the encoder (200) computes motion information for other size blocks.

The motion accuracy of the motion estimation (220) and MCTF depends on implementation. For example, the motion estimation (220) and MCTF use quarter-pixel motion vectors. Alternatively, the motion estimation (220) and MCTF use motion information with some other accuracy. For example, to facilitate use of quarter-pixel motion vectors when decoding only QCIF video, the encoder (200) computes half-pixel motion vectors for CIF video and/or integer-pixel motion vectors for 4CIF video.

The direction of motion estimation (220) and MCTF may be forward, backward, bi-directional, or intra. In some implementations, the encoder (200) sets the motion estimation (220) and compensation direction per partition of a macroblock as either forward, backward, bi-directional, or intra. Alternatively, the encoder (200) sets the directions at some other level and/or does not allow some directions (e.g., intra).

In some implementations, reference frames may be padded (e.g., by simple repetitive padding) to allow for motion estimation/compensation outside of the reference frames. Sub-pixel interpolation on reference frames generates sample values for fractional motion estimation/compensation using a bilinear filter, bicubic filter, sinc filter, or some other filter. In some implementations, the encoder uses overlapped block motion compensation ("OBMC"). Alternatively, motion vector range is limited to be within reference frame boundaries and/or OBMC is not used.

Several examples of MCTF are described below using a 5/3 biorthogonal wavelet structure. Alternatively, the encoder (200) performs another number and/or type of temporal sub-band transform (210) (e.g., Haar) and/or motion estimation (220). FIG. 2 shows spatial-domain MCTF in which full spatial resolution video is temporally transformed. Alternatively, the encoder (200) includes one or more spatial sub-band transforms before the temporal decomposition (210), and the MCTF is in-band MCTF on spatial sub-bands from the initial spatial decomposition.

After the temporal transform (210), the encoder (200) applies one or more two-dimensional ("2D") spatial sub-band transform(s) (230) to further decompose the signals. FIG. 2 shows output for two levels of 2D spatial decomposition, where the sub-band with low spatial resolution horizontally and vertically is further decomposed horizontally and vertically. For example, the 2D spatial sub-band transform is a dyadic discrete wavelet transform ("DWT"). The wavelet filter may be, for example, for a 9/7 DWT filter or a 5/3 DWT filter. Alternatively, the encoder (200) performs another number (such as 3 or 4) of spatial sub-band transforms and/or performs another type of spatial sub-band transform (230).

After the temporal transform(s) (210) and spatial transform(s) (230), the signals are organized into different spatio-temporal sub-bands, which correspond to different spatio-temporal resolutions of the input video (205). The encoder (200) entropy codes (240) the sub-bands. For example, the encoder (200) uses 3D embedded block coding with optimal truncation ("EBCOT") in some implementations. JPEG 2000 uses a 2D form of EBCOT, and the encoder (200) in such implementations basically extends 2D EBCOT into 3D coding. Each sub-band, generated by temporal and spatial transforms, is divided into 3D coding blocks that are coded independently. For each coding block, the encoder (200) uses bit-plane coding and context-based arithmetic coding. Alternatively, the encoder (200) uses some other form of entropy coding for the sub-band information.

The encoder (200) also codes (250) the motion information (e.g., motion vectors, motion mode selection information). For example, the encoder (200) uses some form of entropy coding such as simple variable length codes to entropy encode motion vector information, partitions of macroblocks, and directions of motion estimation/compensation. For a motion vector, the encoder (200) encodes the difference between the motion vector and its predictor. The motion vector predictor may be computed using median prediction from previously encoded/decoded motion vectors or using some other motion vector prediction technique. Alternatively, the encoder (200) uses other and/or additional coding (250) techniques for motion information.

With the properties of the sub-band transforms (210, 230), the encoder (200) supports spatial scalability and temporal/frame-rate scalability naturally. Moreover, with bit-plane coding of sub-band coefficients, the encoder (200) also generally supports quality/signal-to-noise ratio ("SNR") scalability.

These scalabilities are very useful for video transmission over error-prone networks such as the Internet or wireless networks. Different sub-bands may be encoded for transmission with different levels of error correction or resiliency to transmission errors. Or, different sub-bands may be transmitted at different priority levels, where the network supports prioritized transmission.

The various scalabilities can also help different devices share the same compressed video stream, even though the different devices have different memory resources, computational power, display size, accessible bandwidth, etc. In this way, the task of encoding the video (205) at different bit rates is simplified.

One advantage of multi-level temporal decomposition is that temporal redundancy within a video signal can be exploited in a large range. The first few levels of temporal sub-band transforms can exploit the temporal redundancy among near frames, and the last few levels of temporal sub-band transforms can take advantage of dependencies among frames across longer distances.

FIG. 4 shows an example 3D sub-band video encoder (400) with four layers of temporal decomposition and one layer of spatial decomposition. Essentially, FIG. 4 shows one possible expansion of the temporal sub-band transform (210) in FIG. 2 and also shows the data flow for different levels of temporal decomposition. FIG. 4 also introduces new notation for temporal and spatial decomposition.

In FIG. 4, the encoder (400) applies a four-level temporal sub-band transform to video with a frame rate of f frames per second. Each level $T_i$ of temporal sub-band transform divides the signal input to that level into two temporal sub-bands—a temporal low-pass sub-band and a temporal high-pass sub-band. Each sub-band then has half the frame rate of the input video signal to that level. In FIG. 4, the terms $t\text{-}L_i$ and $t\text{-}H_i$ denote the output low-pass sub-band and high-pass sub-band, respectively, after the $i^{th}$ level temporal transform $T_i$. Both $t\text{-}L_i$ and $t\text{-}H_i$ have frame rate $f/2^i$. In FIG. 4, the signal $t\text{-}L_i$ is decomposed for several iterations with a temporal sub-band transform $T_{i+1}$ to exploit long-range dependencies and enable lower frame rate video that can be decoded by the decoder.

To illustrate with a simple numerical example, suppose the input video is 30 frame per second ("fps") CIF video. The output low-pass sub-band $t\text{-}L_1$ from the first temporal decomposition is 15 fps video, as is the output high-pass sub-band $t\text{-}H_1$ from the first temporal decomposition. The output sub-bands $t\text{-}L_2$ and $t\text{-}H_2$ from the second temporal decomposition are 7.5 fps video, and the output sub-bands $t\text{-}L_3$ and $t\text{-}H_3$ from the third temporal decomposition are 3.75 fps video. Finally, the output sub-bands $t\text{-}L_4$ and $t\text{-}H_4$ from the fourth temporal decomposition are 1.875 fps video. The spatial resolution is CIF for all of the output low-pass and high-pass sub-bands in the example.

Motion information among frames is estimated at the different levels, and each level's temporal transform is performed along the current level's motion trajectories. Each level of temporal decomposition thus produces motion vectors, which are subsequently coded. In FIG. 4, there are four sets of motion vectors, corresponding to the four levels of temporal transform.

The output temporal low-pass sub-band $t\text{-}L_4$ and output temporal high-pass sub-bands $t\text{-}H_1$, $t\text{-}H_2$, $t\text{-}H_3$ and $t\text{-}H_4$ are then decomposed with a single-level 2D spatial sub-band transform $S_1$, which divides the respective input sub-bands into low-pass horizontal, low-pass vertical ("LL"), low-pass horizontal, high-pass vertical ("LH"), high-pass horizontal, low-pass vertical ("HL"), and high-pass horizontal, high-pass vertical ("HH") sub-bands. Alternatively, the encoder (400) includes other and/or additional levels of spatial decomposition before and/or after a temporal decomposition level, or the encoder (400) uses a different spatial decomposition pattern.

Continuing the numerical example started above for FIG. 4, the low-pass sub-band $t\text{-}L_4$ has CIF spatial resolution. With the single-level 2D spatial sub-band transform $S_1$, the temporal sub-band $t\text{-}L_4$ is decomposed into a LL sub-band, LH sub-band, HL sub-band, and HH sub-band. Each of the LL, LH, HL, and HH sub-bands has QCIF resolution. Similarly, each of the temporal high-pass sub-bands $t\text{-}H_1$, $t\text{-}H_2$, $t\text{-}H_3$ and $t\text{-}H_4$ starts with CIF resolution and is decomposed into QCIF-resolution LL, LH, HL, and HH sub-bands.

The spatially decomposed sub-bands are then entropy coded and output.

B. Example Video Decoders

FIG. 3 illustrates a generic 3D sub-band video decoding scheme (300). The decoder (300) receives compressed video information (395) and produces a sequence of video pictures (305) (e.g., progressive video frames, interlaced video frames, or fields of interlaced video frames) as output. Particular embodiments of video decoders typically use a variation or supplemented version of the generalized decoder (300).

The decoder (300) entropy decodes (340) information (395) for some or all of the spatio-temporal sub-bands. The video information (395) is still organized into different spatio-temporal sub-bands, which correspond to different spatio-temporal resolutions of the input video (205). In this way, the decoder (300) may select between different spatio-temporal resolutions, ignoring parts of the compressed bit stream (395), or the decoder (300) may simply decode (340) some subset of the compressed bit stream (395) that the decoder (300) actually receives. The decoder (300) essentially performs the inverse of the entropy coding (240) performed in the encoder (200) for that information which the decoder (300) decodes. For example, the decoder (300) receives and decodes (340) information encoded using 3D EBCOT. Alternatively, the decoder (300) uses some other form of entropy decoding for some or all of the sub-band information.

When the decoder (300) performs inverse MCTF ("IMCTF"), the decoder (300) decodes (350) the motion information (e.g., motion vectors, motion mode selection information), in many cases performing the inverse of the coding (250) performed in the encoder (200). For example, the decoder (300) uses some form of entropy decoding such as decoding of simple variable length codes. For a motion vector, the decoder (300) computes a motion vector prediction using median prediction or some other motion vector prediction technique, and then the decoder (300) combines the motion vector prediction with a motion vector differential. Alternatively, the decoder (300) uses other and/or additional decoding (350) techniques.

The decoder (300) applies one or more 2D inverse spatial sub-band transform(s) (330) to reconstruct the video spatially. FIG. 3 shows input and output for two levels of 2D inverse spatial decomposition. For example, the 2D inverse spatial sub-band transform is a dyadic inverse DWT ("IDWT"). Alternatively, the decoder (300) performs another number and/or type of inverse spatial sub-band transform (330).

The decoder (300) further reconstructs the video signal by an inverse temporal sub-band transform (310). FIG. 3 shows output for a single level of temporal reconstruction from a low resolution sub-band and a high resolution sub-band, but the temporal composition may include 4, 5, or some other number of levels of synthesis.

In FIG. 3, the inverse temporal transform (310) uses IMCTF, and the decoder (300) performs motion compensation using the decoded (350) motion information for the video signal. In general, the attributes of the motion information and IMCTF (e.g., partitions for motion compensation, motion vector accuracy, direction of motion compensation, use of reference frame padding, sub-pixel interpolation, use of OBMC) are as in the corresponding encoder (200) and signaled in the compressed video bit stream (395). Several examples of IMCTF are described below. Alternatively, the decoder (300) performs another number and/or type of inverse temporal sub-band transform (310) and/or motion compensation. FIG. 3 shows spatial-domain IMCTF in which full spatial resolution video is reconstructed using inverse temporal transforms. Alternatively, the decoder (300) performs in-band MCTF.

Returning to the encoder (400) of FIG. 4, a corresponding decoder could reconstruct the f/$2^i$ frame rate video from t-$L_i$ only. Or, the decoder could reconstruct the f/$2^{i-1}$ frame rate video from both t-$L_i$ and t-$H_i$ (including subsequent temporal high-pass sub-band information t-$H_{i+1}$, etc.).

FIG. 5 shows an example 3D sub-band video encoder-decoder ("codec") system (500) with four layers of temporal decomposition and two layers of spatial decomposition in the encoder, and a corresponding number of inverse transforms in the decoder. Essentially, FIG. 5 shows other possible versions of the encoder (200) and decoder (300) of FIGS. 2 and 3. FIG. 5 also introduces another, simpler notation for temporal and spatial decomposition and their inverse operations.

In FIG. 5, the encoder applies four levels of temporal sub-band transforms $T_i$ (i.e., $T_1$, $T_2$, $T_3$ and $T_4$) to video and applies two levels of spatial sub-band transforms $S_i$ (i.e., $S_1$ and $S_2$) to the results of the temporal decomposition. The encoder then performs entropy coding E. The decoder performs entropy decoding $E^{-1}$ and performs two levels of inverse spatial sub-band transforms $S_i^{-1}$ (i.e., $S_2^{-1}$ and $S_1^{-1}$) to the results of the entropy decoding. The decoder then applies four levels of inverse temporal sub-band transforms $T_i^{-1}$ (i.e., $T_4^{-1}$, $T_3^{-1}$, $T_2^{-1}$ and $T_1^{-1}$) to the results of the spatial reconstruction.

III. Motion-Compensated Temporal Filtering

To improve coding efficiency, motion-aligned temporal transforms (alternatively called motion-compensated temporal filtering ("MCTF") herein) are applied in temporal decomposition to effectively remove temporal redundancy. The main idea of MCTF is to align pixels among different frames while temporal decomposition is applied. Motion-aligned 3D coding schemes can provide scalability features as well as non-compromised, or even better, coding efficiency compared to other coding schemes.

Figure 6:
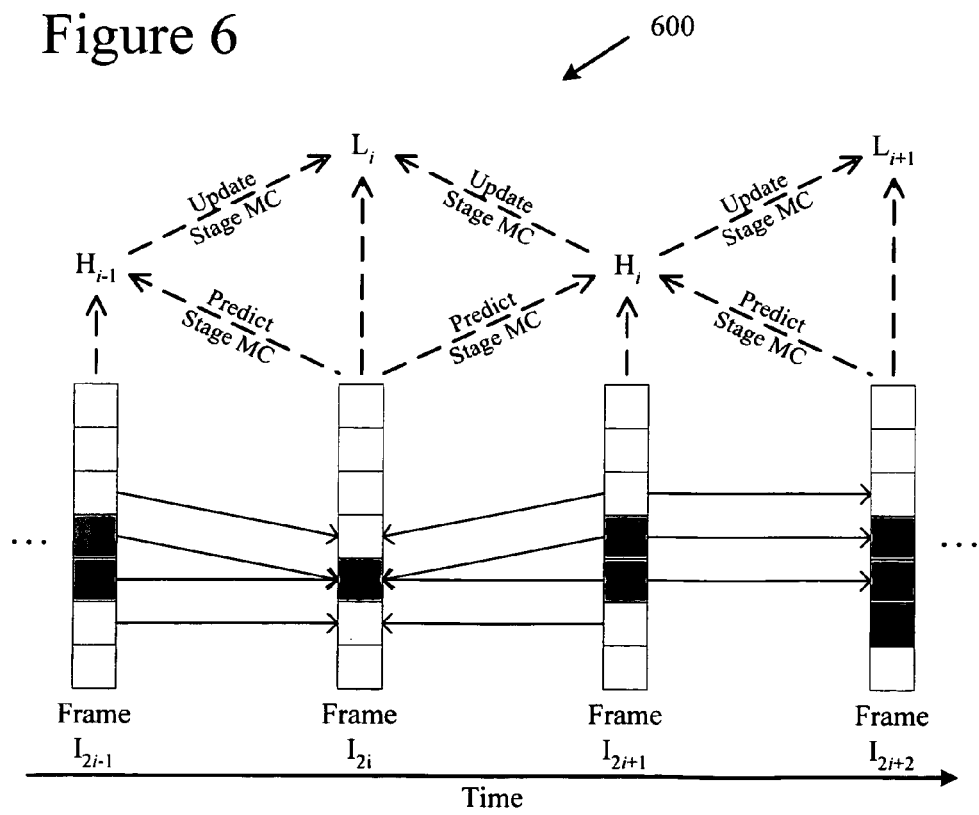
FIG. 6 is a diagram illustrating relationships between input video frames, temporal low-pass frames, and temporal high-pass frames in motion-compensated temporal filtering ("MCTF").

Among various MCTF schemes, lifting-based MCTF provides a flexible and efficient implementation. FIG. 6 illustrates relationships between input video frames, temporal low-pass frames, and temporal high-pass frames in a lifting-based MCTF scheme for a 5/3 biorthogonal wavelet.

FIG. 6 shows columns of pixels for four original, indexed video frames input to the MCTF. (The input frames themselves may be, for example, a temporal low-pass sub-band output from a previous level of MCTF.) The lifting-based wavelet transform in FIG. 6 involves two basic stages: a motion-compensated prediction ("MCP") stage and a motion-compensated update ("MCU") stage.

In the prediction stage, for an odd frame (e.g., frame $I_{2i+1}$), motion compensation from one or more of the adjacent even frames (e.g., frames $I_{2i}$ and $I_{2i+2}$) indicates a motion-compensated prediction for pixels of the odd frame. The high-pass frame (e.g., $H_i$) is essentially the difference between the odd frame and the motion-compensated prediction for the odd frame.

In the update stage, motion compensation of one or more of the available high-pass frames (e.g., $H_i$ and $H_{i-1}$) indicates a motion-compensated update. A low-pass frame (e.g., $L_i$) is essentially the difference between the update and an even frame (e.g., frame $I_{2i}$).

Figure 7:
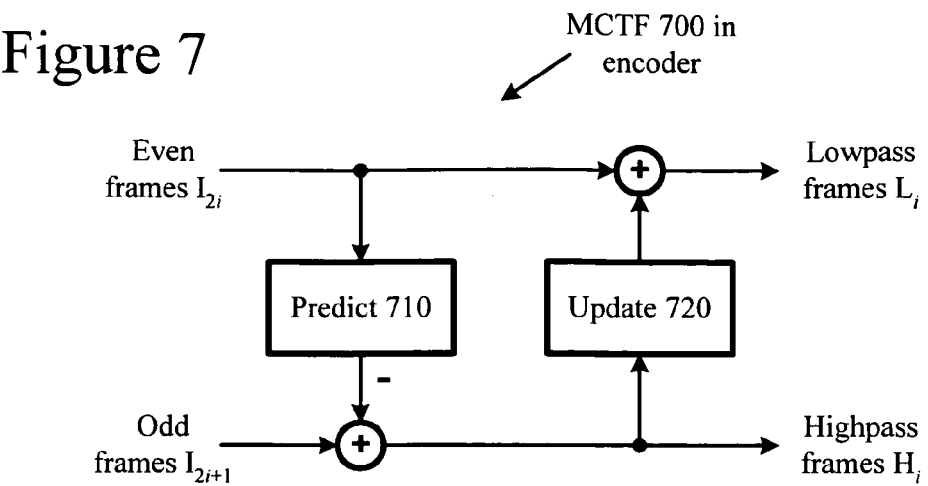
FIGS. 7 and 8 are block diagrams illustrating MCTF in an encoder and inverse MCTF ("IMCTF") in a decoder, respectively.
Figure 8:
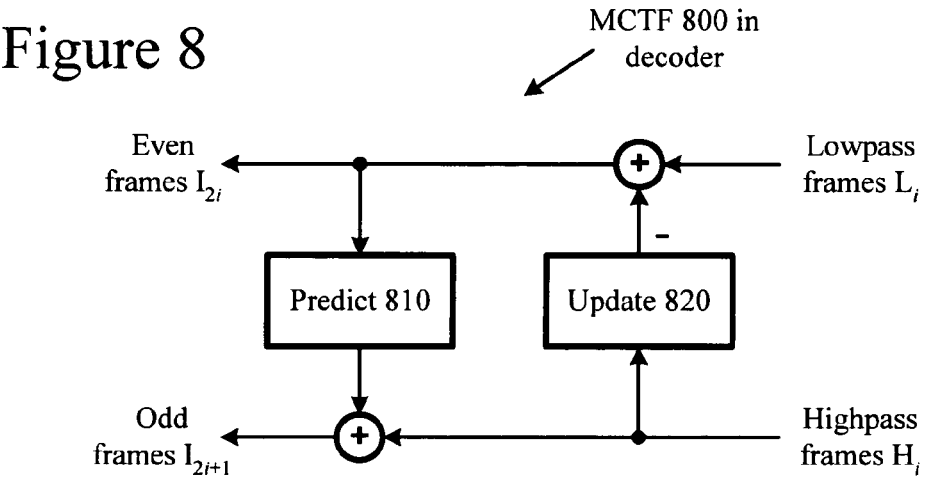

FIG. 7 illustrates conventional MCTF with lifting in an encoder, and FIG. 8 illustrates corresponding IMCTF in a decoder. For the sake of consistency, in FIGS. 7 and 8 and elsewhere in the application, even video frames are references for motion-compensate prediction and used for formation of low-pass frames, and odd video frame are the subjects of MCP and used for formation of high-pass video frames. Alternatively, the roles of odd and even frames are switched.

In the MCTF (700) of FIG. 7, even video frames are used as references in the MCP (710). For a particular odd video frame $I_{2i+1}$, the encoder computes a motion-compensated prediction from one or both of the adjacent even frames $I_{2i}$ and $I_{2i+2}$. The difference between the prediction and the original odd frame $I_{2i+1}$ is the temporal high-pass frame $H_i$.

The high-pass frames $H_i$ are used as references in the MCU (720). For a particular even video frame $I_{2i}$, the encoder computes a motion-compensated update from one or both of the high-pass frames $H_{i-1}$ and $H_i$ for adjacent odd video frames. The combination of the update and the original even frame $I_{2i}$ is the temporal low-pass frame $L_i$.

For example, assume that a video sequence of frames $I_0, I_1, \ldots, I_{2n-1}$ is to be processed with the MCTF (700) of FIG. 7. The predict module (710) computes the prediction $P(I_{2i+1})$ for the odd frame $I_{2i+1}$ from consecutive even frames $I_{2i}$ and $I_{2i+2}$ as follows.

$$P(I_{2i+1}) = \frac{1}{2}(MC(I_{2i}, MV_{2i+1 \to 2i}) + MC(I_{2i+2}, MV_{2i+1 \to 2i+2})), \quad (1)$$

where $MV_{2i+1 \to 2i}$ means motion vectors from the frame $I_{2i+1}$ to the frame $I_{2i}$, $MV_{2i+1 \to 2i+2}$ has an analogous meaning, and MC( ) means motion compensation that generates at least part of the current odd frame's prediction from an adjacent even frame. (Equation (1) is meant to illustrate MCP for a macroblock, macroblock partition, or other part of the odd frame for which the motion vectors apply, and such MCP is repeated for other macroblocks, macroblock partitions, etc. of the odd frame.) In some cases, the encoder considers only one of the adjacent even frames (not both) when computing the motion-compensated prediction (as in a Haar transform), with corresponding changes to MC contributions and weighting in equation (1), or the encoder encodes part or all of the odd frame using intra compression. In conjunction with an embedded base layer codec, the encoder may use frames other than adjacent even frames as reference frames, as described below.

The predict module (710) then calculates the high-pass frame $H_i$ as follows.

$$H_i = I_{2i+1} - P(I_{2i+1}) \quad (2).$$

In the update step (720), which follows the predict step (710) to complete a one-level temporal transform, the encoder computes the update $U(I_{2i})$ for even frame $I_{2i}$ from neighbouring high-pass frames as follows.

$$U(I_{2i}) = \frac{1}{4}((MC(H_{i-1}, MV_{2i \to 2i-1}) + MC(H_i, MV_{2i \to 2i+1})), \quad (3)$$

where MC( ) means motion compensation that generates at least part of the update for the even frame from an adjacent high-pass frame. As a simple approximation, motion vectors for the MCU are derived as the inverse of the corresponding motion vectors for the MCP. (Equation (3) is meant to show MCU for a macroblock, macroblock partition, or other part of the even frame for which motion vectors apply, and such MCU is repeated for other macroblocks, macroblock partitions, etc.) In some cases, the encoder considers only one of the high-pass frames (not both) when computing the motion-compensated update, with corresponding changes to MC contributions and weighting in equation (3), or the encoder considers neither of the high-pass frames.

The encoder then generates the low-pass frame as follows.

$$L_i = I_{2i} + U(I_{2i}) \quad (4).$$

In the IMCTF (800) of FIG. 8, the high-pass frames $H_i$ are used as references in the MCU (820). For a particular even video frame $I_{2i}$, the decoder computes a motion-compensated update from one or both of the high-pass frames $H_{i-1}$ and $H_i$ for adjacent odd video frames. The difference between the update and the corresponding temporal low-pass frame $L_i$ for the even frame $I_{2i}$ is the reconstructed even frame $I_{2i}$.

As reconstructed, the even video frames are used as references in the MCP (810). For a particular odd video frame $I_{2i+1}$, the decoder computes a motion-compensated predic-tion from one or both of the adjacent reconstructed even frames $I_{2i}$ and $I_{2i+2}$. The combination of the prediction and the corresponding temporal high-pass frame $H_i$ for the odd frame $I_{2i+1}$ is the reconstructed odd frame $I_{2i+1}$.

In the encoder, the predict step typically attempts to minimize or reduce the bit rate required to encode the high-pass frame (in spatial decomposition and entropy coding) along with motion vectors used for prediction. Thus, a high-pass frame $H_i$ is essentially the residual from bi-directional MCP (or forward MCP, or backward MCP, as the case may be) of the corresponding odd-indexed input video frames $I_{2i+1}$ from the relevant even-indexed original video frame(s). Then, the original even-indexed frame $I_{2i}$ is updated with the prediction residual as the low-pass frame.

The high-pass frame's energy depends upon the success of the motion models, which depends on the complexity of the motion, the uniformity of the motion across frames, and the motion model itself. If motion prediction is accurate, the prediction residual usually has small magnitude. Even when motion is truly captured, however, update steps are still useful in that they can reduce noise and aliasing due to low-pass filtering along motion trajectories. In general, update steps facilitate removal of high-frequency parts in the low-pass frames, thus improving coding efficiency.

If motion prediction is inaccurate (e.g., due to complex, unpredictable motion or the shortcomings of the motion model itself), object features may not align, causing several problems. Inaccurate motion prediction can result in multiple edges and increased energy in the high-pass sub-band frames. This not only hurts compression performance for encoding of the high-pass sub-bands themselves, it also adds ghost edges and contours to temporal low-pass frames during the update steps.

More generally, update steps can affect decoding performance when temporal scalability is enabled. In particular, problems at the decoder are possible when some temporal high-pass frames are partially or completely dropped, for example, due to limited channel bandwidth or device capability. (Often, temporal scalability in IMCTF is achieved by retaining a temporal low-pass sub-band while discarding the high-pass sub-bands in the temporal transform domain.) When motion prediction is not efficient, high-pass frames bring artifacts to low-pass frames (i.e., the lower frame rate video) during the update steps in encoding. When video is reconstructed from only the temporal low-pass frames, none of the high-pass contribution is removed by MCU in the decoder. Or, if temporal high-pass frame information is coarsely quantized, quality of the temporal low-pass frames may suffer because contributions from the high-pass frames are only approximately removed in the MCU in the decoder. Ghosting in the low-pass frames thus cannot be removed, even when more bits are allocated to the encoding of the low-pass frames.

One possible solution is to skip the update steps in the lifting-based MCTF in the encoder. This can significantly reduce overall coding performance, however, because update steps can reduce noise and aliasing due to low-pass filtering along motion trajectories. Moreover, update steps can decrease the overall distortion at the decoder by diffusing distortion among temporal high-pass sub-bands and temporal low-pass sub-bands.

IV. Adaptive Update Stage in MCTF and IMCTF

In some embodiments, a scalable video encoder adaptively performs update steps in lifting-based MCTF and/or a scalable video decoder adaptively performs update steps in IMCTF. By taking advantage of properties of the human visual system, the adaptive update steps improve the perceptible visual quality of low frame rate video decoded from temporal low-pass sub-bands. At the same time, compared to conventional update steps, the adaptive update steps maintain satisfactory performance for higher frame rate video decoded from both temporal low-pass and temporal high-pass sub-bands.

A. Example Encoders and Decoders

Adaptive update schemes achieve a good trade-off between the two contradictory goals of (1) adding original update information as much as possible and, (2) at the same time, decreasing the visual artifacts introduced by the update steps.

FIG. 9 depicts a MCTF framework (900) with adaptive update operations in an encoder, and FIG. 10 depicts an IMCTF framework (1000) with adaptive update operations in a decoder. For example, the frameworks (900, 1000) are incorporated into an encoder and/or decoder such as described with reference to FIGS. 2-5. Alternatively, the adaptive update operations are incorporated into another encoder and/or decoder.

With reference to FIG. 9, the MCTF framework (900) includes prediction (910) and update (920) stages. These stages basically proceed as described with reference to FIG. 7.

The MCTF framework (900) uses a human vision system ("HVS") model (930) to evaluate the signal from the predict step in terms of visual quality. For example, an encoder evaluates information in an even frame according to the HVS model (930). In some implementations, the HVS model (930) uses a just noticeable difference ("JND") metric. In other implementations, the HVS model (930) uses other perceptual criteria. The HVS model (930) provides threshold information to a threshold (940) stage, which evaluates and applies the results of the update (920) stage in view of the threshold information. For example, the HVS model (930) provides a threshold value per pixel of the even frame that was evaluated according to the model. Various examples of thresholds and their use in update operations are described below. Alternatively, the HVS model (930) provides different threshold information.

The result of the threshold (940) stage is that update information may be limited in parts of an image in which distortion is especially perceptible, while update information is not so limited for other parts of the image. Update information can thus be adaptively removed or limited before the update information is applied to an even frame, depending on human perception.

With reference to FIG. 10, the IMCTF framework (1000) also includes prediction (1010) and update (1020) stages. These stages basically proceed as described with reference to FIG. 8.

The IMCTF framework (1000) uses a HVS model (1030) to evaluate a signal in terms of visual quality. For example, a decoder evaluates information in a low-pass frame according to the HVS model (1030). In some implementations, the HVS model (1030) uses a just noticeable difference ("JND") metric. In other implementations, the HVS model (1030) uses other perceptual criteria.

The HVS model (1030) provides threshold information to a threshold (1040) stage, which evaluates and applies the results of the update (1020) stage in view of the threshold information. For example, the HVS model (1030) provides a threshold value per pixel of the low-pass frame that was evaluated according to the model. Various examples of thresholds and their use in update operations are described below. Alternatively, the HVS model (1030) provides different threshold information.

Comparing FIGS. 9 and 10, the HVS model (930) at the encoder side is applied to even frames whereas the HVS model (1030) at the decoder side is applied to low-pass frames. Even if the same HVS model (930, 1030) is used at the encoder side and decoder side, the thresholds may be slightly different. This is tolerable inasmuch as thresholds are likely to be very similar for corresponding even and low-pass frames, and since deviation between encoder and decoder states is local to a frame (as opposed to accumulating and getting worse over time).

Moreover, in the frameworks (900, 1000) of FIGS. 9 and 10, thresholds are computed at each level of MCTF/IMCTF. As such, the thresholds may be different at different levels of MCTF/IMCTF even for temporally corresponding frames.

Thus, in some implementations, the encoder-side MCTF (900) and decoder-side IMCTF (1000) apply the same JND metric in the HVS models (930, 1030). There is no coding overhead associated with the thresholds or thresholding operations, as the thresholds are independently computed and applied in the encoder and decoder. Alternatively, an encoder signals threshold information or decisions to a decoder, or the decoder applies a different HVS model than the encoder.

B. Example HVS Models and Thresholding Operations

The adaptive update step in the encoder may be generally represented as follows: $L_i = I_{2i} + f(U_{2i})$. The function $f(\ )$ is an adaptation function that is applied to the update $U_{2i}$ for even frame $I_{2i}$. $L_i$ is the resultant low-pass frame.

The adaptation function takes advantage of results and developments of human visual models. Extensive research has been conducted to develop computing models based on the human visual system. In various models, perceptual criteria are based on observations that there is inconsistency in sensitivity of the HVS to stimuli of varying levels of contrast and luminance changes in the spatial and temporal domain.

Among numerous computing models of the HVS, JND is widely used in perceptual coding and image watermarking. JND uses visibility thresholds that are defined as functions of the amplitude of luminance edge in which perturbation is increased until it becomes just discernible for humans. For more information, see A. N. Netravali and B. Prasada, "Adaptive Quantization of Picture Signals Using Spatial Masking," Proc. IEEE, vol. 65, pp. 536-548 (April 1977). JND is closely related with the texture masking property of the HVS. According to this criterion, noise is more visible in flat or texture-less areas, and noise is less visible in areas with edges and textures.

JND thresholds are image dependent. As long as update information remains below the JND thresholds, "update residual" transparency is achieved in the low-pass frames. As such, JND works well as an HVS model in adaptive update schemes. In one implementation of an adaptive update scheme, the JND model is defined as follows.

$$JND_x(i, j) = 1 - \frac{1}{1 + \theta \sigma_x^2(i, j)}, \quad (5)$$

where $\sigma_x^2(i, j)$ denotes the local variance of the image x in a window centred on the pixel with coordinates (i, j). JND may be computed from just luminance samples to reduce computational complexity. Or, JND may be computed from both luminance and chrominance samples. The size of the window depends on implementation. One example window size is 3×3, and another is 5×5. θ is a tuning parameter that can be chosen for a particular image. This is same as the noise visibility function value, supposing that the image is nonstationary Gaussian. The tuning parameter θ plays the role of contrast adjustment in the JND definition. To make the tuning parameter θ image-dependent, it may be computed as follows:

$$\theta = \frac{D}{\sigma_{x_{max}}^2}, \quad (6)$$

where $\sigma_{x_{max}}^2$ is the maximum local variance for a given image, and D∈[50,100] is an experimentally determined parameter. According to this JND definition, the JND value is small in flat areas since $\sigma_x^2(i, j)$ is small, and vice versa.

A more precise way to represent the adaptive update in the encoder is:

$$L_i = I_{2i} + f(I_{2i}, U_{2i}), \quad (7)$$
where $$f(I_{2i}, U_{2i}) = \begin{cases} U_{2i} & |U_{2i}| < JND_{I_{2i}} \cdot S \\ JND_{I_{2i}} \cdot S & U_{2i} \geq JND_{I_{2i}} \cdot S \\ -JND_{I_{2i}} \cdot S & U_{2i} \leq -JND_{I_{2i}} \cdot S \end{cases} \quad (8)$$

$JND_{I_{2i}}$ is an example of $JND_x(i, j)$ as defined above, and S denotes an implementation-dependent strength factor, for example, 12.5. The JND function is adaptive with local frame characteristics associated with visual masking. If local intensity variance is large, JND is relatively large (approaching 1 according to equation (5)), indicating a busy or detailed area. On the other hand, if local intensity variance is small, JND is relatively small (approaching 0 according to equation (5)), indicating a flat area. It is computed from the even index frame to be updated in the encoder and from the even index frame (actually, the low-pass image approximation thereof) in the decoder. As a result, the adaptive update can effectively alleviate ghosting artifacts due to high-pass frames and improve coding performance for temporal scalability.

As noted above, in some implementations, the encoder and decoder use the same JND metric and thresholding (with changes to index values, etc. in equation (8)), and there is not any overhead to be coded and delivered to the decoder for the adaptive update operations. Although the encoder and decoder operate on different images (the original frame at the encoder and a reconstructed low-pass version at the decoder), experimental results have shown that the resulting update mask at the decoder is a very close approximation to that at the encoder.

Alternatively, the encoder and/or decoder use another definition of JND, another HVS model, and/or other thresholding operations. For example, other and/or additional parameters may be used.

C. Example Adaptive Update Techniques

FIGS. 11 to 13 illustrate techniques (1100, 1200, 1300) for adaptive update operations. An encoder such as one described with reference to FIG. 9 performs the techniques (1100, 1200) shown in FIGS. 11 and 12, and a decoder such as one described with reference to FIG. 10 performs the techniques (1100, 1300) shown in FIGS. 11 and 13. Alternatively, another encoder or decoder performs the techniques (1100, 1200, 1300).

FIG. 11 shows a simplified, generalized technique (1100) for adaptive update operations. The encoder or decoder computes (1120) thresholds for the adaptive update. The encoder or decoder then performs (1160) the adaptive update operations.

FIG. 12 shows a detailed technique (1200) for adaptive update operations in an encoder, including additional details for MCP.

For a current even frame for which a low-pass frame will be computed, the encoder computes (1220) thresholds. For example, the encoder computes JND for the pixels of the current even frame as described in the previous section. Alternatively, the encoder computes (1220) the thresholds using some other metric.

For MCP, the encoder computes (1230) one or more motion-compensated predictions from the current even frame, e.g., going forward and/or backward to predict adjacent odd frames. The encoder may compute (1230) one or more other motion-compensated predictions for the adjacent odd frames from other even frames (or such a prediction may have been previously computed from an earlier even frame). The encoder then computes (1240) one or more high-pass frames from the motion-compensated prediction(s) and their corresponding adjacent odd frame(s).

Next, the encoder computes (1250) a motion-compensated update for the current even frame from the one or more high-pass frames. For example, the encoder applies in reverse the motion information computed during the MCP (1230) from the current even frame. Alternatively, the encoder uses a different mechanism to compute (1250) the update.

The encoder then performs (1260) an adaptive update for the current even frame, resulting in a low-pass frame. For example, the encoder performs adaptive thresholding operations using the motion-compensated update and JND thresholds as described in the previous section. Alternatively, the encoder performs (1260) the adaptive update using a different thresholding mechanism.

The encoder determines (1290) whether or not to continue the MCTF and, if so, continues with the next even frame.

FIG. 13 shows a detailed technique (1300) for adaptive update operations in a decoder, including separate paths for decoding at different frame rates.

The decoder determines (1310) the temporal resolution for decoding. The temporal resolution may be determined according to a user-level setting or some other setting, determined according to how much information the decoder actually receives (e.g., just the temporal low-pass information over an error prone channel), or determined in some other way. Alternatively, a decoder may have just one of the decoding paths. For example, one decoder may include the low frame rate path while another decoder includes the high frame rate path, suiting the resources of the respective decoders.

In the low frame rate path, the decoder computes (1312) a current even frame from received low-pass frame information (e.g., using the low-pass frame as the current frame). The adaptive update operation is not performed, since high-pass information and motion information are ignored or not received. Even in the absence of such information, the quality of the current even frame is improved (compared to conventional IMCTF) due to the adaptive update operation during encoding, since the addition of noticeable distortion to the even frame was limited during encoding.

In the high frame rate path, for the current even frame, the decoder computes (1320) thresholds from the corresponding low-pass frame received by the decoder. For example, the decoder computes JND for the pixels of the low-pass frame as described in the previous section. Alternatively, the decoder computes (1320) the thresholds using some other metric.

The decoder computes (1330) a motion-compensated update for the current even frame from one or more high-pass frames. For example, the decoder applies in reverse motion information computed during the MCP (1230) from the current even frame. Alternatively, the decoder uses a different mechanism to compute (1330) the update.

The decoder then performs (1360) an adaptive update to the low-pass frame to reconstruct the current even frame. For example, the decoder performs adaptive thresholding operations using the update and JND thresholds as described in the previous section. Alternatively, the decoder performs (1360) the adaptive update using a different thresholding mechanism.

For MCP, the decoder computes (1370) one or more motion-compensated predictions from the reconstructed current even frame, e.g., going forward and/or backward to predict adjacent odd frames. (Other motion-compensated predictions for an adjacent odd frame may have been previously computed from an earlier even frame.) The decoder then computes (1380) a reconstructed odd frame from the motion-compensated prediction for the odd frame and the corresponding high-pass frame. The decoder determines (1390) whether or not to continue the IMCTF and, if so, continues with the next even frame.

Various operations shown in FIGS. 12 and 13 may be split, combined with other operations, or reordered. For example, although FIG. 12 shows certain operations in parallel, these operations may instead be performed in series.

V. Embedded Base Layer Codec in 3D Sub-band Video Coding and Decoding

In some embodiments, a scalable video encoder includes an embedded base layer codec and a scalable video decoder includes an embedded base layer decoder. Basically, the bit stream yielded by the embedded base layer codec serves as a low bit rate, base layer of a 3D sub-band video coding bit stream. In the context of some scalable video coding/decoding systems, for example, the base layer provides video at minimum spatial, temporal, and SNR resolutions for the systems, upon which additional enhancement layers are added to provide scalability up to the maximum spatial, temporal, and SNR resolutions for the systems. (The exact role of the base layer in encoding and decoding differs in different embodiments.) For example, a 3D sub-band video encoder includes an embedded video codec and a 3D sub-band video decoder includes a corresponding embedded video decoder.

For many types of embedded codecs, this improves coding performance at low bit rates, where the bits spent encoding motion information in conventional 3D sub-band coding consume an inefficient proportion of the available bit rate, and the embedded video codec is more efficient in comparison. In some cases, the embedded base layer codec provides advantages such as closed-loop temporal prediction, in-loop filtering, and rate-distortion optimization without constraints associated with 3D sub-band coding. At the same time, the advantages of 3D sub-band coding at medium and higher bit rates (e.g., spatial and temporal scalabilities) are kept.

Another advantage of embedding a codec into 3D sub-band video coding is that it provides compatibility with the embedded codec and corresponding decoders. For example, if an MPEG-1 codec is embedded, any receiver with MPEG-1 decoding capability can decode a rough version of the compressed video (even if the MPEG-1 codec does not improve coding performance per se). If a H.264 or VC-1 codec is embedded, besides compatibility, this improves coding performance at low bit rates.

The techniques and tools described herein are not limited to systems having advantages in terms of performance and/or compatibility. Aside from performance and compatibility, embedding base layer codecs in a scalable video encoder, and embedding base layer decoders in scalable video decoders, may have other advantages.

A. Example Encoders and Decoders

FIGS. 14 through 19 illustrate three different schemes for embedding a base layer codec or decoder in an encoder or decoder, respectively. In the encoders, the codec for the base layer is embedded among temporal sub-band transforms, and the temporal sub-band transforms are followed by a spatial sub-band transform. Additional spatial sub-band transforms may be placed before and/or after the temporal sub-band transforms, with corresponding changes possible in the decoders as well. The base layer codec may be placed in a different location among the various transforms, with corresponding changes possible in the decoders.

In general, the placement of the embedded codec sets the frame rate and spatial resolution for the base layer video. For the sake of simplifying comparisons between the three schemes shown in FIGS. 14 through 19, the base layer resolution is set to be one quarter of the frame rate and half the spatial resolution of the original video. Thus, if the original video is 30 fps CIF video, for example, the base layer video is 7.5 fps QCIF video.

Figure 14:
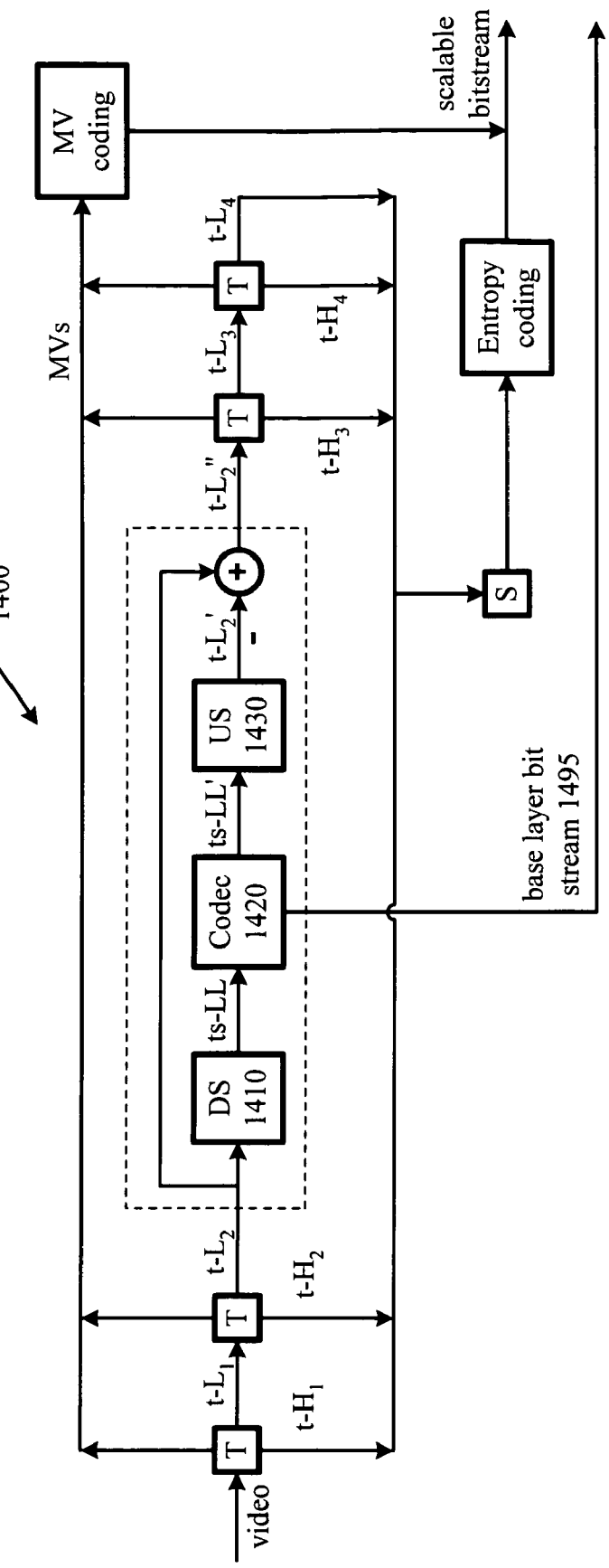
FIGS. 14, 15, 16, 17, 18, and 19 are block diagrams illustrating different schemes for embedding a base layer codec in a 3D sub-band encoder or embedding a base layer decoder in a 3D sub-band decoder.
Figure 16:
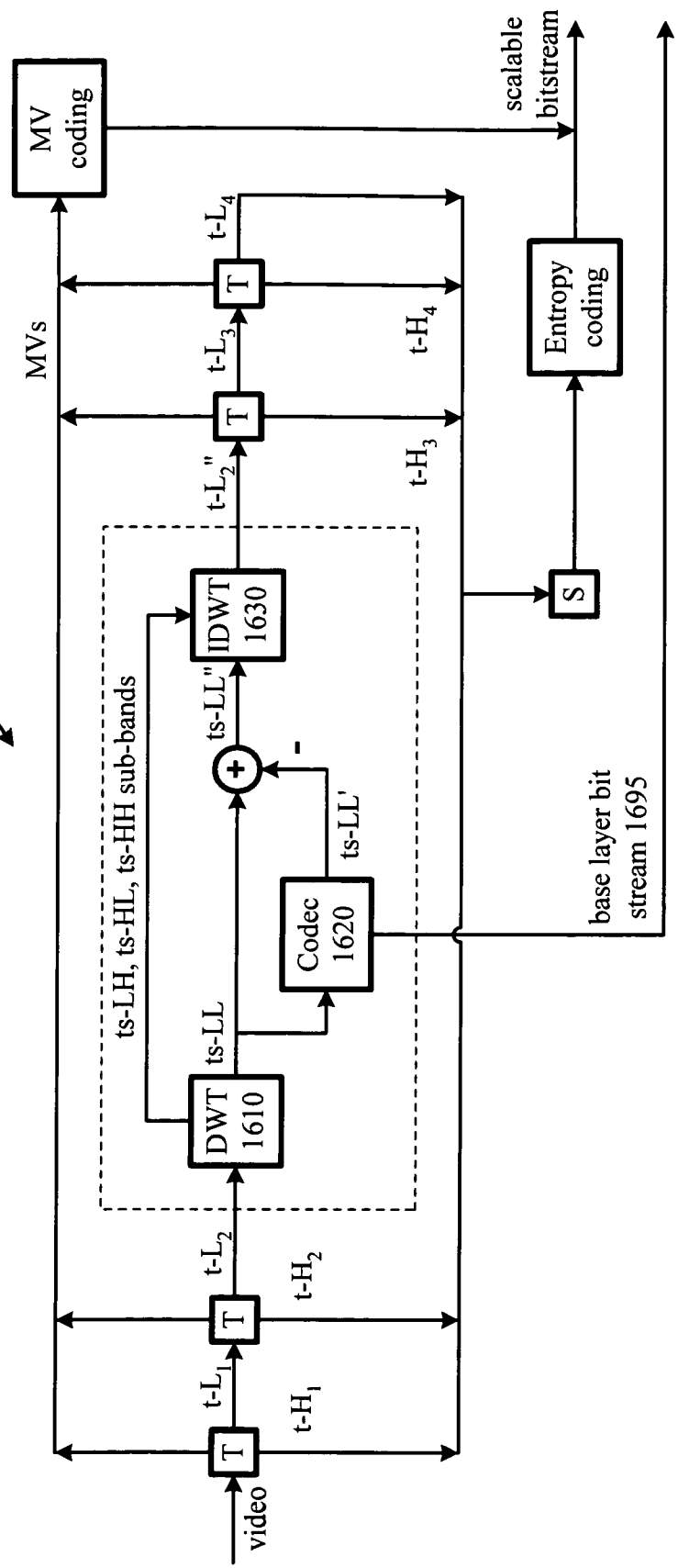
Figure 18:
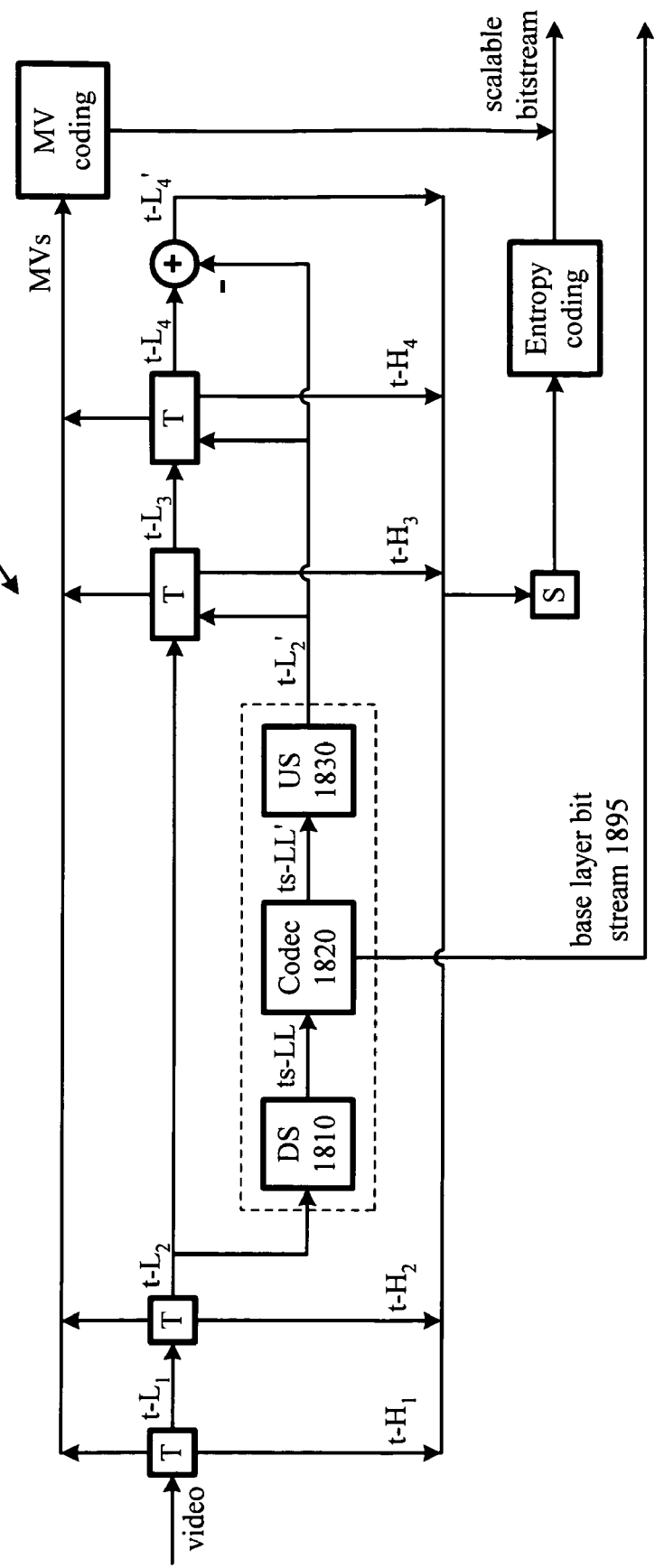

As such, the base layer codec is after two temporal sub-band transforms in the encoders of FIGS. 14, 16 and 18, and the base layer decoder is before the last two inverse temporal sub-band transforms in the decoders of 15, 17, and 19. Changing placement of the base layer codecs and decoders among the temporal transforms is one way to change the base layer frame rate. For example, although FIGS. 14, 16 and 18 show embedding base layer modules to accept a t-$L_2$ sub-band as input, alternatively the base layer modules are placed after the t-$L_1$ sub-band transform or another sub-band transform. In general, the placement among temporal transforms depends on the frame rate desired for the base layer video.

In FIGS. 14, 16, and 18, the spatial resolution change for the base layer is accomplished by sampling operations or spatial sub-band transform operations (adjacent the embedded codec or decoder) by some arbitrary factor. Changing the ratio of the sampling/spatial sub-band transform operations is one way to change the base layer spatial resolution.

Figure 15:
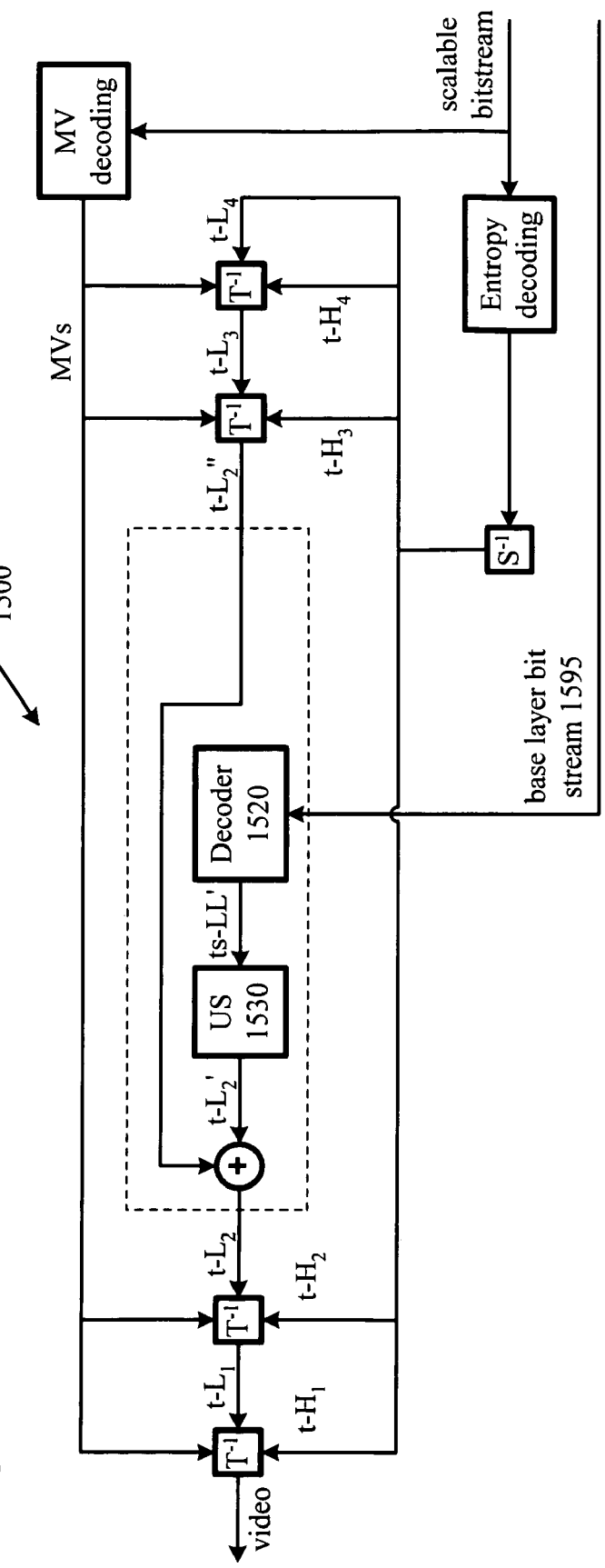
Figure 17:
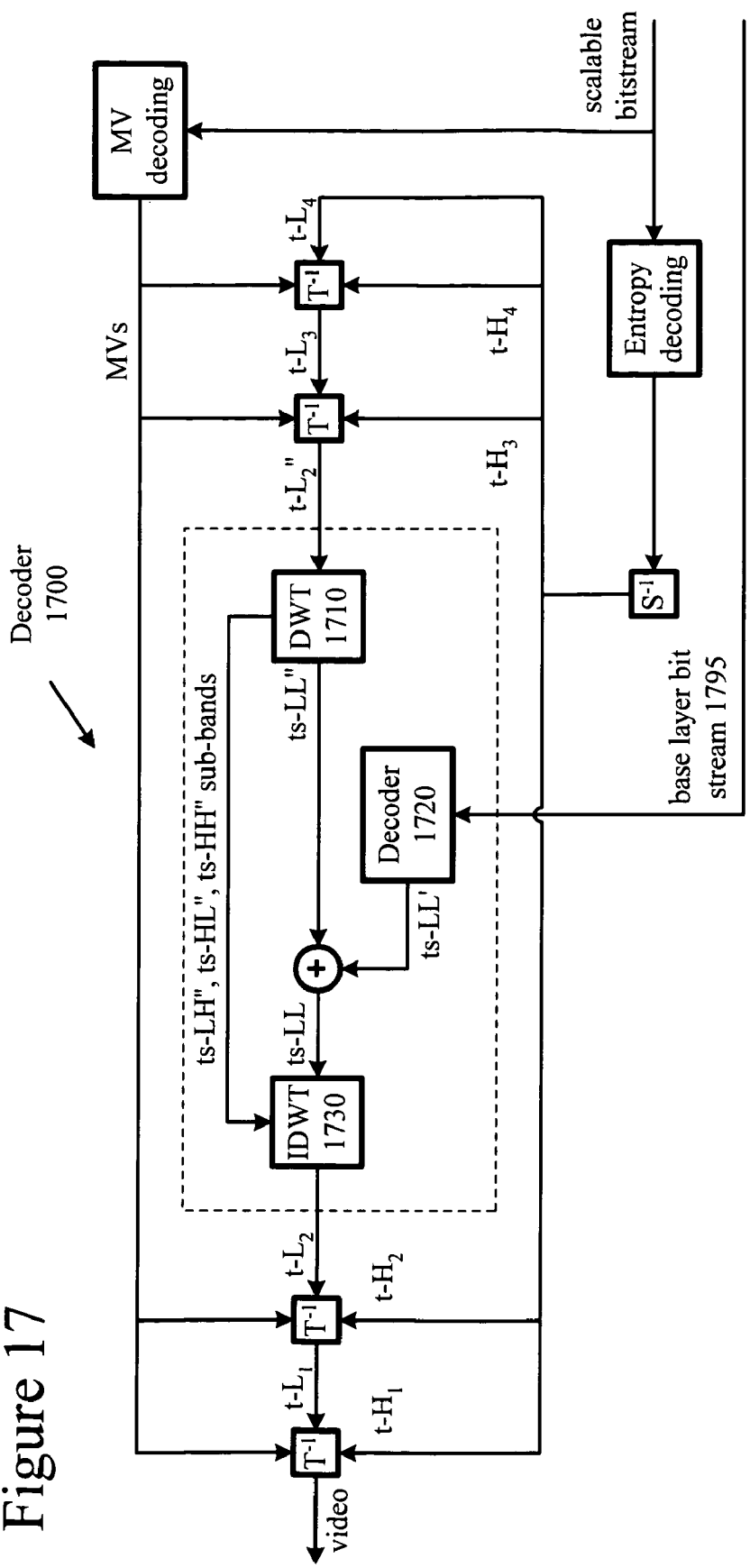
Figure 19:
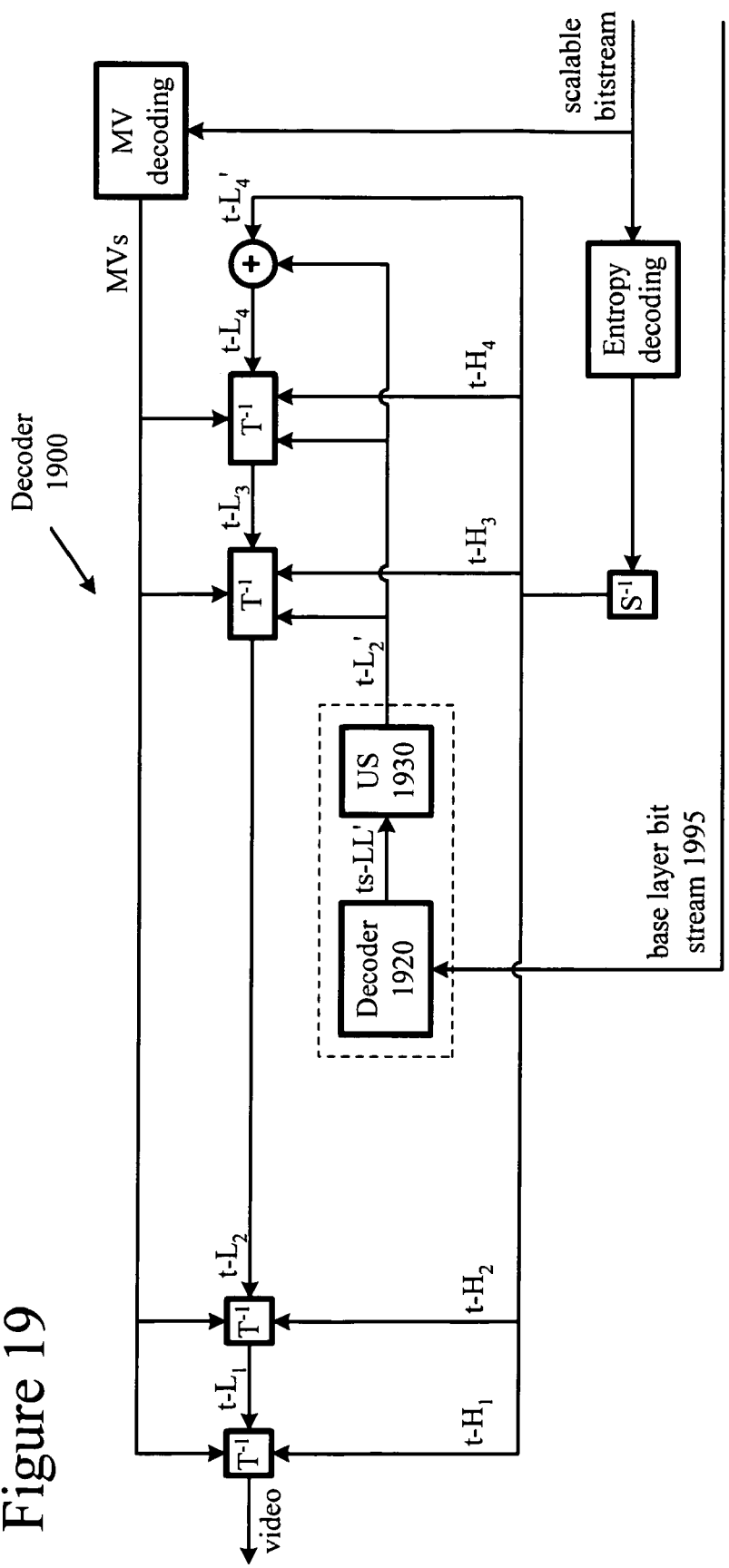

FIGS. 14, 16 and 18 include temporal sub-band transform modules T, spatial sub-band transform modules S, and MV coding and entropy coding modules, as well as inputs to and outputs from the modules. FIGS. 15, 17, and 19 include inverse temporal sub-band transform modules $T^{-1}$, inverse spatial sub-band transform modules $S^{-1}$, and MV decoding and entropy decoding modules, as well as inputs to and outputs from the modules. In general, the roles of these modules and their inputs/outputs are as discussed with reference to FIGS. 2 through 5.

The base layer codec shown in FIGS. 14, 16 and 18 can be a codec that produces a standards-compliant bit stream (e.g., MPEG-1, MPEG-2, MPEG-4, H.261, H.263, H.264/AVC, or VC-1), with a corresponding base layer decoder in FIGS. 15, 17, and 19. Or, the base layer codec/decoder can be a commercial product (e.g., WMV8, WMV9). More generally, the base layer codec/decoder can be any available codec/decoder having the desired performance and/or compatibility properties.

1. First Scheme

FIG. 14 shows a 3D sub-band encoder (1400) according to the first scheme. The encoder (1400) includes an embedded base layer codec (1420) as well as a downsampling module (1410) and an upsampling module (1430) around the base layer codec (1420).

The downsampling module (1410) and upsampling module (1430) are optional. They are used when the video coded by the embedded codec (1420) has lower spatial resolution than the temporal sub-band input to the embedded codec (1420). Otherwise, the downsampling module (1410) and upsampling module (1430) may be skipped.

The dashed rectangle in FIG. 14 encloses operations related to the base layer codec (1420) after two-level temporal decomposition. For the base layer, the input video is f/4 frames per second, and the resolution may reduced by the downsampling module (1410). Thus, the base layer video provides a low frame rate and (potentially) low spatial resolution representation of the original video.

The downsampling module (1410) downsamples the t-$L_2$ temporal sub-band using simple sub-sampling, a low-pass filter, or some other filtering mechanism. For example, the downsampling module (1410) reduces spatial resolution by a factor of two horizontally or vertically. In some implementations, the downsampling module (1410) applies an "MPEG" filter as described in the document Bjontegaard et al., "H.263 Anchors—Technical Description" or a Daubechies 9/7 DWT filter. More generally, the downsampling module (1410) changes spatial resolution of the input to the embedded codec (1420) by any arbitrary ratio to achieve the desired base layer spatial resolution and/or match an input spatial resolution allowed for the base layer codec (1420).

The embedded codec (1420) encodes the downsampled t-$L_2$ sub-band (shown as the ts-LL sub-band) using any of the usual operations for the embedded codec (1420). The embedded codec (1420) produces an output base layer bit stream (1495) at the base layer resolution, where the base layer bit stream (1495) is compatible with corresponding base layer decoders. For purposes of later encoding in the encoder (1400), the embedded codec (1420) also decodes the ts-LL sub-band using the corresponding decoding operations for the embedded codec (1420), producing the reconstructed sub-band ts-LL'.

The upsampling module (1430) upsamples the reconstructed output sub-band ts-LL' from the base layer codec (1420) using some filtering mechanism, generating a reconstructed version t-$L_2$' of the temporal sub-band t-$L_2$. The reconstructed sub-band t-$L_2$' has the same resolution as t-$L_2$. For example, the upsampling module (1430) increases spatial resolution by a factor of two horizontally or vertically. In some implementations, the upsampling module (1430) applies a simple 6-tap filter $\{-1, 5, 20, 20, 5, -1\}$, an 8-tap sinc filter as in Chen et al., "Improved MC-EZBC with Quarter-pixel Motion Vectors," or a Daubechies 9/7 IDWT filter. The upsampling filter need not mirror the downsampling filter—e.g., the MPEG filter may be used for downsampling and the IDWT filter for upsampling. More generally, the upsampling module (1430) changes spatial resolution of the output from the embedded codec (1420) by any arbitrary ratio to restore the video to the spatial resolution it had before the downsampling module (1410).

From the original temporal sub-band t-$L_2$, the encoder (1400) subtracts the reconstructed version t-$L_2$'. This produces a difference, or residual, sub-band t-$L_2$". When the base layer codec (1420) is efficient (e.g., VC-1 or H.264/AVC) and base layer bit rate is adequate, the base layer quality may be relatively good, such that the difference sub-band does not have much energy. On the other hand, when the base layer codec (1420) is less efficient or base layer bit rate is inadequate, the base layer quality may be relatively poor, such that the difference sub-band has more energy.

The encoder (1400) performs two further levels of temporal decomposition on the difference sub-band t-$L_2$". Finally, the encoder (1400) performs a spatial transform and entropy coding on the respective sub-bands (e.g., t-$H_1$, t-$H_2$, t-$H_3$, t-$H_4$, and t-$L_4$) to generate the scalable bit stream.

FIG. 15 shows a corresponding 3D sub-band decoder (1500) according to the first scheme. The decoder (1500) includes an embedded base layer decoder (1520) as well as an upsampling module (1530) after the base layer decoder (1520).

The upsampling module (1530) is optional. It is used when the video decoded by the embedded decoder (1520) has lower spatial resolution than the temporal sub-band t-$L_2$ output to downstream inverse temporal transform levels. Otherwise, the upsampling module (1530) may be skipped.

The dashed rectangle in FIG. 15 encloses operations related to the base layer decoder (1520) before two additional levels of inverse temporal decomposition. For the base layer, the video is f/4 frames per second, and the spatial resolution may have been reduced. Thus, the base layer gives a low frame rate and (potentially) low spatial resolution representation of the video. In fact, video with the low frame rate and (potentially) low spatial resolution can be directly decoded with the base layer decoder (1520) and output.

Otherwise, the decoder (1500) performs entropy decoding and inverse spatial decomposition on whichever ones of the sub-bands from the scalable bit stream (e.g., t-$H_1$, t-$H_2$, t-$H_3$, t-$H_4$, and t-$L_4$) the decoder (1500) will use to reconstruct the video. The decoder (1500) performs the third and fourth levels of inverse temporal decomposition to reconstruct the difference sub-band t-$L_2$" from the t-$H_3$, t-$H_4$, and t-$L_4$ sub-bands and associated motion information.

The embedded decoder (1520) receives the base layer bit stream (1595) for video encoded at the base layer resolution. Using the appropriate decoding operations, the embedded decoder (1520) decodes the compressed, downsampled sub-band ts-LL in the base layer bit stream (1595), producing a reconstructed version ts-LL' of the sub-band.

The upsampling module (1530) upsamples the reconstructed sub-band ts-LL' from the base layer decoder (1520) using some filtering mechanism, generating a reconstructed version t-$L_2$' of the temporal sub-band t-$L_2$. The reconstructed sub-band t-$L_2$' has the same resolution as t-$L_2$. For example, the upsampling module (1530) increases spatial resolution by a factor of two horizontally or vertically. More generally, the upsampling module (1530) changes spatial resolution of the output from the embedded decoder (1520) by any arbitrary ratio to restore the video to the spatial resolution it had before any base-layer downsampling.

The decoder (1500) adds the reconstructed difference sub-band t-$L_2$" to the corresponding reconstructed sub-band t-$L_2$'. This produces a reconstructed version of the temporal low-pass sub-band t-$L_2$, which is input to the rest of the inverse temporal decomposition.

2. Second Scheme

FIG. 16 shows a 3D sub-band encoder (1600) according to the second scheme. The encoder (1600) includes an embedded base layer codec (1620) as well as a DWT module (1610) and an IDWT module (1630) around the base layer codec (1620).

Like the downsampling module (1410) and upsampling module (1430) shown in FIG. 14, the DWT module (1610) and IDWT module (1630) are optional. They are used when the video coded by the embedded codec (1620) has lower spatial resolution than the temporal sub-band t-$L_2$ input to the embedded codec (1620). Otherwise, the DWT module (1610) and IDWT module (1630) may be skipped.

The dashed rectangle in FIG. 16 encloses operations related to the base layer codec (1620) after two-level temporal decomposition. The DWT module (1610) processes the t-$L_2$ temporal sub-band, generating the low-pass sub-band ts-LL. Generally, the DWT module (1610) changes spatial resolution of the input to the embedded codec (1620) to achieve the desired base layer spatial resolution and/or match an input spatial resolution allowed for the base layer codec (1620). The DWT module (1610) also produces spatial high-pass sub-bands ts-LH, ts-HL, and ts-HH that are routed to the IDWT module (1630).

The embedded codec (1620) encodes the ts-LL sub-band using any of the usual operations for the embedded codec (1620). The embedded codec (1620) produces an output base layer bit stream (1695) at the base layer resolution. The embedded codec (1620) also decodes the ts-LL sub-band using the corresponding decoding operations for the embedded codec (1620), yielding the reconstructed sub-band ts-LL'.

From the original ts-LL sub-band, the encoder (1600) subtracts the reconstructed version ts-LL' of it. This produces a residual sub-band ts-LL". As was the case for the encoder (1400) of FIG. 14, when the base layer codec (1620) is efficient and base layer bit rate is adequate, the residual ts-LL" typically does not have much energy. On the other hand, when the base layer codec (1620) is less efficient or base layer bit rate is inadequate, the residual ts-LL" may have more energy.

From the residual sub-band ts-LL" and the spatial high-pass sub-bands ts-LH, ts-HL, and ts-HH, the IDWT module (1630) generates a new residual sub-band $t-L_2''$. The new residual sub-band $t-L_2''$ has the same spatial resolution as the sub-band $t-L_2$ that was input to the DWT module (1610).

The encoder (1600) performs two further levels of temporal decomposition on the residual sub-band $t-L_2''$. Finally, the encoder (1600) performs a spatial transform and entropy coding on the respective sub-bands (e.g., $t-H_1$, $t-H_2$, $t-H_3$, $t-H_4$, and $t-L_4$) to generate the scalable bit stream.

FIG. 17 shows a corresponding 3D sub-band decoder (1700) according to the second scheme. The decoder (1700) includes an embedded base layer decoder (1720) as well as a DWT module (1710) and an IDWT module (1730) around the base layer decoder (1720).

The DWT module (1710) and IDWT module (1730) are optional. They are used when the video decoded by the embedded decoder (1720) has lower spatial resolution than the temporal sub-band $t-L_2$ output to downstream inverse temporal transform levels. Otherwise, the DWT module (1710) and IDWT module (1730) may be skipped.

The dashed rectangle in FIG. 17 encloses operations related to the base layer decoder (1720) before two additional levels of inverse temporal decomposition. The base layer gives a low frame rate and (potentially) low spatial resolution representation of the video, and such lower quality video can be directly decoded with the base layer decoder (1720) and output.

Otherwise, the decoder (1700) performs entropy decoding and inverse spatial decomposition on whichever ones of the sub-bands from the scalable bit stream (e.g., $t-H_1$, $t-H_2$, $t-H_3$, $t-H_4$, and $t-L_4$) the decoder (1700) will use to reconstruct the video. The decoder (1700) performs the third and fourth levels of inverse temporal decomposition to reconstruct the residual sub-band $t-L_2''$ from the $t-H_3$, $t-H_4$, and $t-L_4$ sub-bands and associated motion information.

The DWT module (1710) processes the residual sub-band $t-L_2''$, producing reconstructed versions of the spatial low-pass residual sub-band ts-LL" and spatial high-pass sub-bands ts-LH", ts-HL", and ts-HH". Generally, the DWT module (1710) changes spatial resolution so that the low-pass residual sub-band ts-LL" matches the output of the embedded decoder (1720) in terms of spatial resolution.

The embedded decoder (1720) receives the base layer bit stream (1795) for video encoded at the base layer resolution. Using the appropriate decoding operations, the embedded decoder (1720) decodes the compressed, transformed sub-band ts-LL in the base layer bit stream (1795), producing a reconstructed version ts-LL' of the sub-band.

The decoder (1700) adds the reconstructed residual sub-band ts-LL" to the corresponding reconstructed sub-band ts-LL' output from the embedded decoder (1720). This produces a reconstructed version of the original ts-LL sub-band.

The IDWT module (1730) then combines the reconstructed ts-LL sub-band with the spatial high-pass sub-bands ts-LH", ts-HL", and ts-HH" output from the DWT module (1710). This produces a reconstructed version of the temporal low-pass sub-band $t-L_2$, which is input to the rest of the inverse temporal decomposition.

3. Third Scheme

In the first two encoding schemes, the base layer codec is embedded in the temporal transforms and a residual signal is further decomposed in the later temporal transforms. In contrast, in the third encoding scheme, the later temporal transforms are applied to temporal low-pass frames (as opposed to residual frames).

FIG. 18 shows a 3D sub-band encoder (1800) according to the third scheme. The encoder (1800) includes an embedded base layer codec (1820) as well as a downsampling module (1810) and an upsampling module (1830) around the base layer codec (1820). The dashed rectangle in FIG. 18 encloses operations related to the base layer codec (1820) after two-level temporal decomposition. As with the corresponding modules of the encoder (1400) shown in FIG. 14, the downsampling module (1810) and upsampling module (1830) are optional. Like the scalable video between the second and third temporal transform's, the base layer video is f/4 frames per second, and the resolution may reduced by the downsampling module (1810). Thus, the base layer video again provides a low frame rate and (potentially) low spatial resolution representation of the original video.

The downsampling module (1810) downsamples the $t-L_2$ temporal sub-band using simple sub-sampling, a low-pass filter, or some other filtering mechanism. Generally, the downsampling module (1810) changes spatial resolution of the input to the embedded codec (1820) by any arbitrary ratio to achieve the desired base layer spatial resolution and/or match an input spatial resolution allowed for the base layer codec (1820).

The embedded codec (1820) encodes the downsampled $t-L_2$ sub-band (shown as the ts-LL sub-band) using any of the usual operations for the embedded codec (1820). The embedded codec (1820) produces a lowest bit rate, output base layer bit stream (1895) at the base layer resolution, where the base layer bit stream (1895) is compatible with corresponding base layer decoders. For purposes of later encoding in the encoder (1800), the embedded codec (1820) also decodes the ts-LL sub-band using the corresponding decoding operations for the embedded codec (1820), producing the reconstructed sub-band ts-LL'.

The upsampling module (1830) upsamples the reconstructed output sub-band ts-LL' from the base layer codec (1820) using some filtering mechanism, generating a reconstructed version $t-L_2'$ of the temporal sub-band $t-L_2$. The reconstructed sub-band $t-L_2'$ has the same resolution as $t-L_2$. Generally, the upsampling module (1830) changes spatial resolution of the output from the embedded codec (1820) by any arbitrary ratio to restore the video to the spatial resolution it had before the downsampling module (1810).

The encoder (1800) performs the third and fourth levels of temporal transform on the original (pre-base layer processing) temporal sub-band $t-L_2$. For the third and fourth temporal transforms, the encoder (1800) computes motion-compensated predictions for the temporal high-pass sub-bands t-$H_3$ and t-$H_4$. As expected, the temporal sub-band t-$L_2$ provides candidate reference frames (e.g., even frames of t-$L_2$) for the motion compensation in the third-level temporal transform, and the temporal sub-band t-$L_3$ provides candidate reference frames (e.g., even frames of t-$L_3$) for the motion compensation in the fourth-level temporal transform. According to the third scheme, temporally corresponding pictures in the upsampled, reconstructed sub-band t-$L_2$' act as additional candidate reference frames for the motion compensation. For example, alternating frames of t-$L_2$' (having the same times as the odd-indexed frames of t-$L_2$) are available as references for MCP of the odd-indexed frames of t-$L_2$ in the third-level temporal transform. Every fourth frame of t-$L_2$' (having the same time as a corresponding odd-indexed frame of t-$L_3$) is available as a reference for MCP of the temporally corresponding odd-indexed frame of t-$L_3$ in the fourth-level temporal transform.

Figure 20:
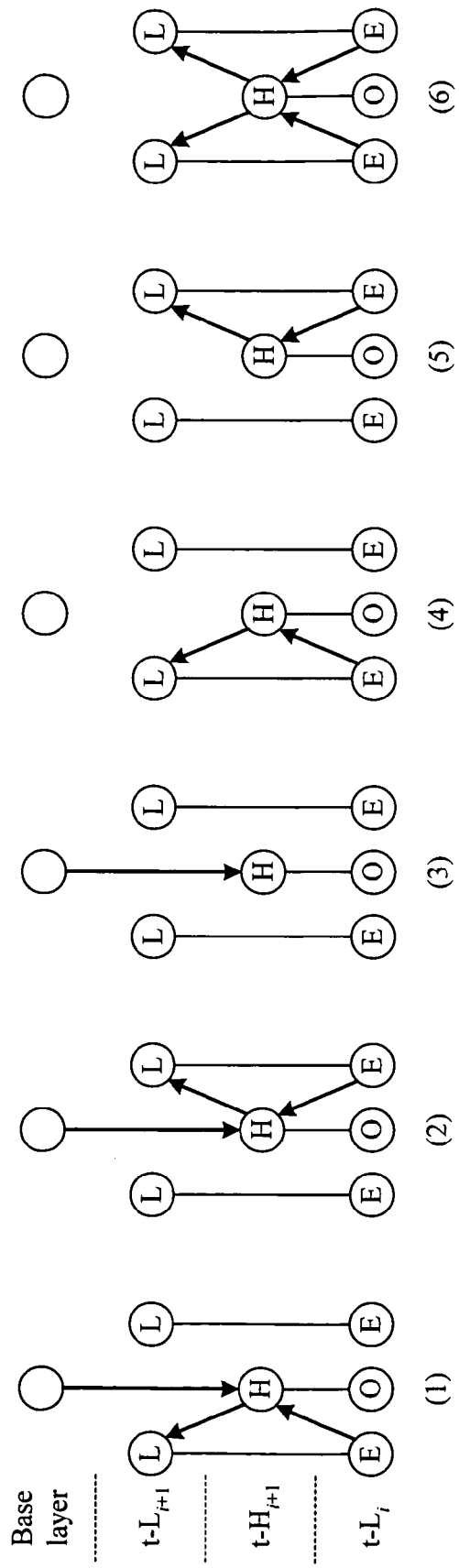
FIG. 20 is a diagram illustrating different reference frame combinations when a base layer codec or decoder provides reference candidates.

FIG. 20 shows different reference combination cases for motion compensation in temporal transforms following an embedded base layer codec. The candidate reference frames include frames (e.g., even frames) from the input temporal low-pass sub-band. The candidate reference frames also include temporally corresponding (e.g., same-time), reconstructed frames from the upsampled output of the base layer. For example, in combination (1) of FIG. 20, the high-pass sub-band frame H uses a first motion-compensated prediction from an even frame of the previous temporal sub-band (corresponding to a low-pass sub-band frame L) and uses a second motion-compensated prediction from an upsampled reconstruction from the base layer (temporally co-located with the high-pass sub-band frame H). Correspondingly, the high-pass sub-band frame H is only used to update the even frame used for motion compensation (to generate the corresponding low-pass sub-band frame L). If the reference from the base layer is used in the prediction step, the corresponding update step is not needed for it.

In some implementations, the encoder selects and switches reference frame(s) for motion compensation on a macroblock-by-macroblock basis. Alternatively, the encoder selects and switches reference frame(s) for motion compensation on some other basis (e.g., per current odd frame, per motion vector and macroblock partition).

Returning to FIG. 18, after the last temporal decomposition, the frame rate of the base layer output t-$L_2$' is quadruple the frame rate of the final temporal low-pass sub-band t-$L_4$. From the final temporal low-pass sub-band t-$L_4$, the encoder (1800) subtracts the temporally corresponding, upsampled reconstructed frames of the base layer output t-$L_2$'. This generates a residual sub-band t-$L_4$'. Finally, the encoder (1800) performs a spatial transform and entropy coding on the respective sub-bands (e.g., t-$H_1$, t-$H_2$, t-$H_3$, t-$H_4$, and t-$L_4$') to generate the scalable bit stream.

FIG. 19 shows a corresponding 3D sub-band decoder (1900) according to the third scheme. The decoder (1900) includes an embedded base layer decoder (1920) as well as an upsampling module (1930) after the base layer decoder (1920).

As with the decoder (1500) shown in FIG. 15, the upsampling module (1930) is optional. It is used when the video decoded by the embedded decoder (1920) has lower spatial resolution than the temporal sub-band frames used by downstream inverse temporal transform levels. Otherwise, the upsampling module (1930) may be skipped.

The dashed rectangle in FIG. 19 encloses operations related to the base layer decoder (1920) before the four levels of inverse temporal decomposition. As with the other base layer decoders, video with the low, base layer frame rate and (potentially) low spatial resolution can be directly decoded with the base layer decoder (1920) and output.

Otherwise, the decoder (1900) performs entropy decoding and inverse spatial decomposition on whichever ones of the sub-bands from the scalable bit stream (e.g., t-$H_1$, t-$H_2$, t-$H_3$, t-$H_4$, and t-$L_4$') the decoder (1900) will use to reconstruct the video.

The embedded decoder (1920) receives the base layer bit stream (1995) for video encoded at the base layer resolution. Using the appropriate decoding operations, the embedded decoder (1920) decodes the compressed, downsampled sub-band ts-LL in the base layer bit stream (1995), producing a reconstructed version ts-LL' of the sub-band. The upsampling module (1930) upsamples the reconstructed sub-band ts-LL' from the base layer decoder (1920) using some filtering mechanism, generating a reconstructed version t-$L_2$' of the temporal sub-band t-$L_2$.

The decoder (1900) adds the residual sub-band t-$L_4$' to the temporally corresponding (e.g., same time) frames of the upsampled base layer output t-$L_2$'. This produces a reconstructed version of the temporal low-pass sub-band t-$L_4$, which is input to the fourth-level inverse temporal decomposition.

The decoder (1900) performs the third and fourth levels of inverse temporal decomposition to reconstruct the temporal sub-band t-$L_2$ from the reconstructed t-$H_3$, t-$H_4$, and t-$L_4$ sub-bands and associated motion information. For the third and fourth inverse temporal transforms, the decoder (1900) computes motion-compensated predictions for the temporal high-pass sub-bands t-$H_3$ and t-$H_4$. The temporal sub-band t-$L_3$ has reconstructed reference frames (e.g., reconstructed even frames of t-$L_3$) for MCP in the fourth-level temporal transform, and the temporal sub-band t-$L_2$ has reconstructed reference frames (e.g., reconstructed even frames of t-$L_2$) for MCP in the third-level temporal transform. Temporally corresponding (e.g., same-time) pictures in the upsampled, reconstructed sub-band t-$L_2$' may act as additional reference frames for the MCP in the third and fourth levels of inverse temporal transforms.

B. Example Additional Uses of Base Layer Information

Aside from providing backward compatibility and improving compression efficiency in a rate-distortion sense for low bit rate video, output from the base layer can have additional uses.

1. Reusing Motion Vectors from the Base Layer

In 3D sub-band coding with lifting-based MCTF, motion vectors for the MCP steps are obtained by motion estimation. In some implementations, the motion estimation process is similar to conventional motion estimation for an encoder compliant with an existing video standard such as MPEG2, H.264/AVC, etc. Furthermore, Haar and 5/3 temporal transforms are similar to the motion compensation processes of the conventional P-pictures and B-pictures, respectively.

For a base layer codec compatible with an existing standard such as MPEG-2, MPEG-4, H.264/AVC etc., a block coded using inter compression for an inter-picture (P-picture or B-picture) typically has associated motion information. Meanwhile, in 3D sub-band coding, high-pass sub-bands at levels of temporal decomposition downstream from the base layer codec (e.g., at the third and fourth levels in FIGS. 14, 16, and 18) can find temporally corresponding pictures in the base layer output. In many cases (especially according to the third scheme), there is high resemblance between the motion information for such high-pass sub-bands and the motion information of temporally corresponding inter-pictures in the base layer. Based on this correlation, an encoder and/or decoder can reuse motion vectors from the base layer codec for several purposes.

In one example of an additional use of base layer motion vectors, a 3D sub-band encoder and 3D sub-band decoder simply use base layer motion vectors as the actual motion vectors for blocks for temporally corresponding high-pass sub-band frames. (When the base layer frames and high-pass sub-band frames have different spatial resolutions, the 3D sub-band encoder and 3D sub-band decoder can scale the base layer motion vectors accordingly.) In particular, the 3D sub-band encoder and 3D sub-band decoder use base layer motion vectors for this purpose at low bit rates. This reduces overhead for motion information, of course, since the base layer motion vectors are already signaled as part of the base layer bit stream. In many cases, the penalty in terms of loss of motion prediction accuracy is slight.

In another example of an additional use of base layer motion vectors, a 3D sub-band encoder and 3D sub-band decoder use motion vectors from the base layer codec in motion vector prediction. As part of conventional motion vector coding and decoding, motion vector prediction provides a prediction for the value of a current motion vector. The current motion vector may then be represented and signaled as a difference relative to the predicted motion vector. Both the encoder and the decoder select or derive the predicted motion vector for a current motion vector from the previously reconstructed motion vectors of neighboring blocks.

In some implementations, when selecting or deriving a predicted motion vector for a current motion vector for a block of a temporal high-pass sub-band, a 3D sub-band encoder and 3D sub-band decoder use the motion vector from a spatially corresponding block of the temporally corresponding base layer frame. For example, the 3D sub-band encoder and 3D sub-band decoder use the motion vector from the base layer as the predicted motion vector. Or, the 3D sub-band encoder and 3D sub-band decoder use the motion vector from the base layer as a candidate from which the predicted motion vector is selected (e.g., as the median value of the candidates).

In still another example of an additional use of base layer motion vectors, a 3D sub-band encoder uses base layer motion vectors to speed up motion estimation. For example, the sub-band encoder considers the corresponding base layer motion vector early in motion estimation so as to more quickly find a suitable current motion vector.

Similarly, the 3D sub-band encoder and 3D sub-band decoder can reuse motion mode (e.g., block partition, direction) information from the base layer. In some cases, the base layer mode information may be used as actual mode information for blocks of temporally corresponding high-pass sub-band frames. Or, the base layer mode information may be used for prediction of mode information or to speed up motion estimation.

Figure 21:
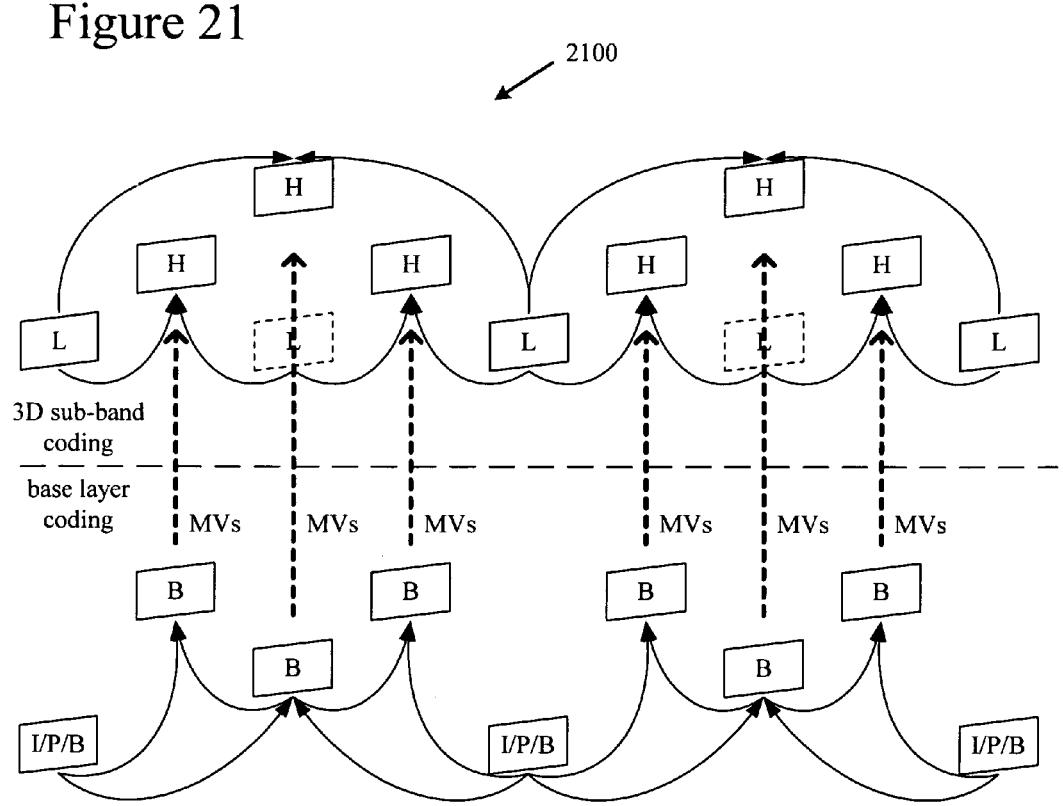
FIGS. 21, 22, and 23 are diagrams illustrating patterns of frames for encoding with a 3D sub-band codec and an embedded base layer codec.
Figure 22:
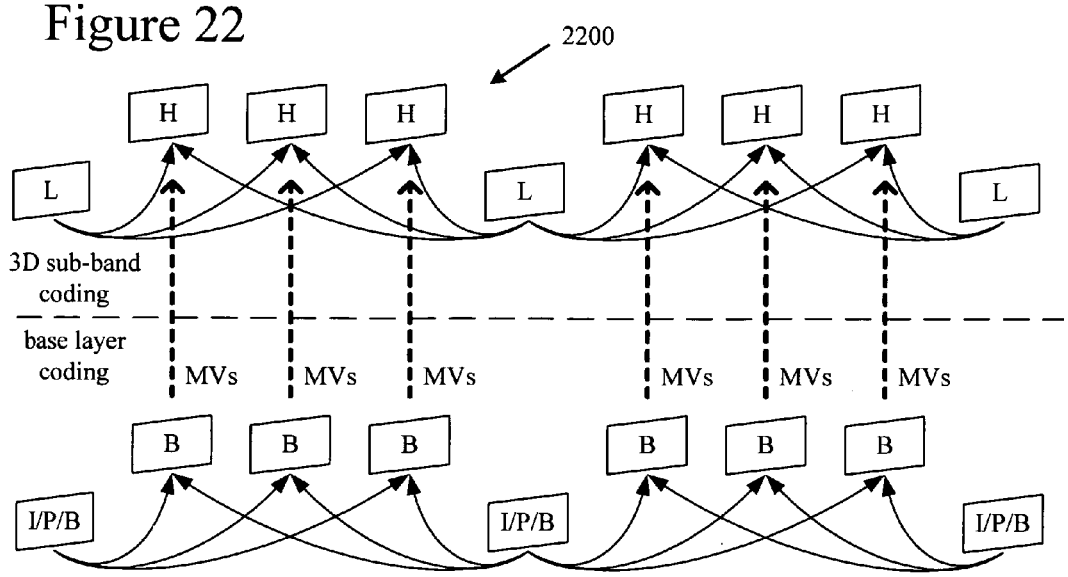
Figure 23:
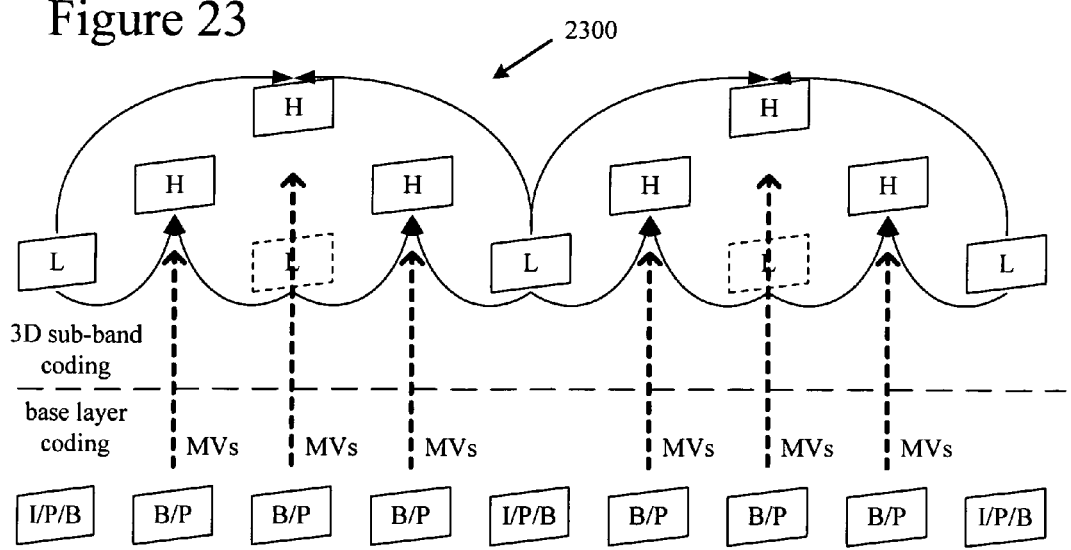

FIG. 21 through 23 show different coding structures (patterns of frame types) under which motion information from the base layer is particularly useful for the temporal high-pass sub-bands in temporal decomposition after the base layer. In FIG. 21, the coding structure of the base layer is adjusted to adapt to a common structure for 3D sub-band coding. Three B-pictures are inserted between two I- or P-pictures, and the second B-picture (like a stored B-picture used in H.264/AVC) is used as a reference for the first and third B-pictures. In this way, the motion vectors of the B-pictures in the base layer can very naturally be reused for the temporally corresponding high-pass sub-band frames in 3D sub-band coding.

For the sake of compatibility with certain existing standards for the base layer codec, the framework of FIG. 22 uses a conventional coding structure for the base layer but adjusts the pattern of frame types for the 3D sub-band coding. Three B-pictures are inserted between two I/P-pictures in the base layer, but the three B-pictures take only the I/P-pictures as references (no B-pictures as motion compensation references). In the 3D sub-band coding scheme, the pattern includes three high-pass sub-bands generated between two low-pass sub-bands.

FIG. 23 illustrates a generic pattern. In the base layer, the pictures temporally corresponding to high-pass sub-bands in 3D sub-band coding are coded with B- or P-pictures. Whereas the patterns shown in FIGS. 21 and 22 are suitable for 5/3 temporal decomposition, the pattern shown in FIG. 23 can be adaptively used for Haar and 5/3 temporal decomposition (corresponding to the P-picture and B-picture relations, respectively).

2. Predicting the Intra Region from the Base Layer

When there are occlusions or irregular motions in video sequences, motion estimation may find only poorly matched blocks for some blocks in a temporal high-pass sub-band. When no intra-coding mode is enabled, forced inter-prediction for these cases can make coding performance deteriorate and have bad effects on visual quality.

In the H.264/AVC standard, intra prediction techniques address cases where MCP fails. In intra prediction, the predictor for a current block is obtained by spatial prediction from neighboring reconstructed pixels. In 3D sub-band coding with an open-loop MCTF structure, however, such spatial prediction tends to introduce mismatch and error drifting.

In the first and second embedded base layer coding schemes described above, after finishing base layer coding and decoding, further temporal decomposition for 3D sub-band coding is performed on difference information. (In FIG. 14, for example, the difference information is the residual between the input temporal sub-band t-$L_2$ and the upsampled version t-$L_2$' of the output ts-LL' from the base layer codec.) Typically, the difference has only high-frequency energy and its spatial redundancy is low. Therefore, when a block is coded in intra mode in the base layer codec, intra prediction in later temporal decomposition in the 3D sub-band coding is usually rendered unnecessary. This helps avoid the problem of mismatch associated with intra prediction in open-loop 3D sub-band coding, while improving coding performance and visual quality.

On the other hand, in the third embedded base layer coding scheme described above, further temporal decomposition for 3D sub-band coding is not performed on difference information. In the third scheme, however, the output of the base layer codec may provide candidate reference pictures, and the candidate reference pictures may include blocks coded using spatial intra prediction. Performing motion-compensation relative to intra-coded blocks of reference pictures from the base layer output can help address situations where MCP in MCTF otherwise finds only poorly matched blocks. Reference pictures from the base layer output can also be used as predictors for low-pass sub-bands in the later 3D sub-band coding. A 3D sub-band encoder can use intra mode information from the base layer to determine when to use reference pictures from the base layer output for later MCP or other prediction.

3. Motion Estimation for Further Temporal Decomposition

In pure 3D sub-band coding, and in 3D sub-band coding with an embedded base layer codec according to the third scheme described above, motion estimation is done on original low-pass sub-bands to get higher level high-pass sub-bands and motion information. Such motion estimation effectively incorporates many conventional motion estimation parameters, such as a "lambda" parameter that weights the cost of coding residual information vs. the cost of coding motion information.

For 3D sub-band coding with an embedded base layer codec according the first and second schemes described above, however, motion estimation for further temporal decomposition is performed on difference information. As such, the motion estimation adapts conventional motion estimation parameters to exploit temporal redundancy among neighboring frames in further temporal decomposition. For example, the encoder adjusts the lambda parameter to account for the different input to temporal decomposition.

C. Example Techniques for Using Base Layer Codec or Decoder

FIG. 24 shows a technique (2400) for scalable encoding with an embedded base layer codec. FIG. 25 shows a technique (2500) for scalable decoding with an embedded base layer decoder. A 3D sub-band encoder such as one described with reference to FIG. 14, 16, or 18 performs the technique (2400) shown in FIG. 24, and a 3D sub-band decoder such as one described with reference to FIG. 15, 17, or 19 performs the technique (2500) shown in FIG. 25. Alternatively, another encoder or decoder performs the techniques (2400, 2500).

With reference to FIG. 24, a 3D sub-band encoder encodes (2410) one or more layers of the video using sub-band coding. This produces input to a base layer codec. For example, the 3D sub-band encoder performs one or more levels of MCTF, finding motion information for temporal high-pass sub-bands and producing a temporal low-pass sub-band to use as base frame rate video input to the base layer codec. Alternatively, the 3D sub-band encoder performs other and/or additional types of encoding at this stage.

The 3D sub-band encoder encodes (2430) the base layer video with the base layer codec. For example, the base layer codec is a H.264/AVC, MPEG-2, VC-1, or WMV9 codec and produces a corresponding compressed video bit stream and reconstructed output video. Motion information and intra mode information are part of the compressed video bit stream, or this information may be separately provided in some other form to the 3D sub-band encoder.

The 3D sub-band encoder then encodes (2450) one or more layers for the video using results from the base layer codec. For example, the 3D sub-band encoder performs one or more levels of temporal decomposition on difference information computed from the results of base layer coding and decoding. Or, the 3D sub-band encoder performs one or more levels of temporal decomposition on a temporal low-pass sub-band using reference pictures in the reconstructed video from the base layer codec. Or, the 3D sub-band encoder uses motion information and/or intra mode information in encoding or decisions in temporal decomposition. Alternatively, the 3D sub-band encoder uses results from the base layer codec in some other way in subsequent sub-band coding, or skips the subsequent encoding (2450).

The encoder determines (2490) whether or not to continue the encoding process and, if so, continues with the next frames.

With reference to FIG. 25, a 3D sub-band decoder decodes (2530) the base layer video with a base layer decoder. For example, the base layer decoder is a H.264/AVC, MPEG-2, VC-1, or WMV9 decoder, and it parses and decodes a corresponding compressed video bit stream and produces reconstructed output video.

The 3D sub-band decoder determines (2540) the resolution for decoding. The resolution may be determined according to a user-level setting or some other setting, determined according to how much information the decoder actually receives (e.g., just the base layer video or one or more additional layers as well), or determined in some other way. Alternatively, a 3D sub-band decoder has just one of the decoding paths. For example, one decoder may include a base layer path while another decoder includes the base layer+scalable layer path, suiting the resources of the respective decoders.

If no higher resolution video is to be decoded (the "no" path out of decision 2540), the 3D sub-band decoder continues at stage (2590).

Otherwise, the 3D sub-band decoder decodes (2550) one or more additional layers for the video using results from the base layer decoding. For example, the 3D sub-band decoder performs one or more levels of inverse temporal decomposition on difference information then adds the reconstructed difference information to the results of the base layer decoding. Or, the 3D sub-band decoder performs one or more levels of inverse temporal decomposition to reconstruct a temporal low-pass sub-band, using reference pictures in the reconstructed video from the base layer decoder. Alternatively, the 3D sub-band decoder uses results from the base layer decoder in some other way in subsequent sub-band decoding.

Finally, the decoder determines (2590) whether or not to continue the decoding process and, if so, continues with the next frames.

Various operations shown in FIGS. 24 and 25 may be split, combined with other operations, or reordered.

VI. Spatial Scalability in Decoding SDMCTF-Encoded Video

In general, there are two categories of MCTF, depending on when the MCTF is performed in 3D sub-band video coding. In the first category, termed in-band MCTF ("IBMCTF"), an encoder first spatially decomposes video and then performs MCTF in the sub-band/wavelet domain. The encoder may then perform further spatial decompositions. In the second category, termed spatial-domain MCTF ("SDMCTF"), an encoder performs MCTF directly in the spatial domain, before spatial decomposition. Similarly, during decoding, IMCTF may be performed in the spatial domain ("SDIMCTF") or in-band ("IBIMCTF").

Thus, in 3D sub-band coding with SDMCTF, the whole video is decomposed by a number of motion-aligned temporal transforms in the spatial domain and subsequent spatial transforms. FIG. 5 shows a complete encoding and decoding scheme with four levels of (inverse) temporal transforms and two levels of (inverse) spatial transforms, and without spatial scalability in decoding. The decoding process is exactly the inverse of the encoding in FIG. 5.

In general, the performance of IBMCTF schemes is not as good as the performance of SDMCTF schemes in terms of quality for a particular bit rate. For this reason, many 3D sub-band encoders use SDMCTF. In some applications, however, a decoder produces a lower spatial resolution version of video output. For example, for original video in CIF resolution (352×288 pixels), for decoding with one-level spatial scalability, the 3D sub-band decoder produces a QCIF version (176×144 pixels) of the decoded video. This may be the case if the decoder is associated with a smaller screen device (e.g., cellular videophone) or if the decoder receives only the lower spatial resolution sub-band information over an unreliable connection. These scenarios are problematic when MCTF operations on the video were performed in the spatial domain, however, since motion information, reference pictures, etc. are represented in terms of full spatial resolution.

This section describes various mechanisms for improving decoding performance when decoding SDMCTF-encoded video for output at a lower spatial resolution. In some embodiments, for example, a 3D sub-band video decoder receives video encoded using SDMCTF at some resolution (e.g., CIF) but decodes the video for output at a lower resolution (e.g., QCIF). The 3D sub-band decoder uses any of several different mechanisms to improve decoding performance.

A. Simple Spatial Scalability Schemes in Decoding SDMCTF Video

Figure 26:
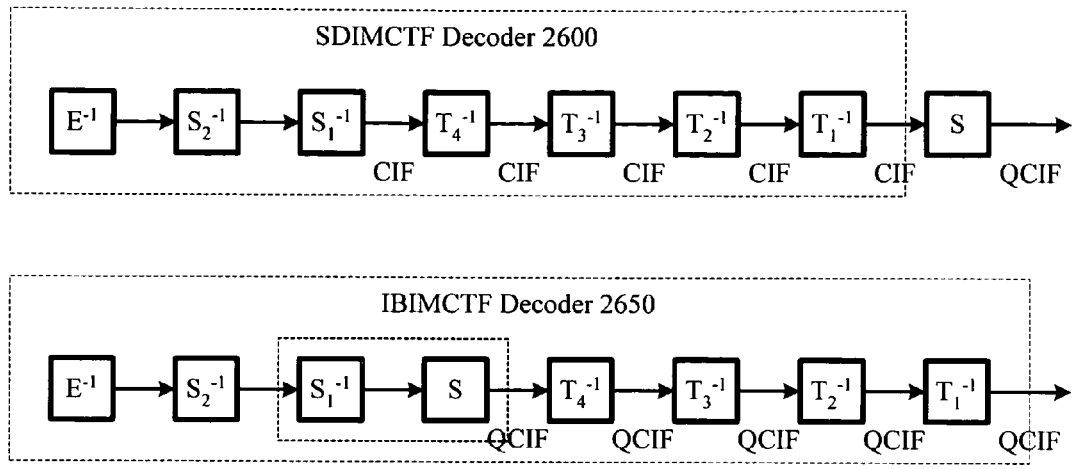
FIG. 26 is a block diagram illustrating two schemes for decoding SDMCTF-encoded video for output at a lower spatial resolution.

FIG. 26 illustrates two simple schemes (2600, 2650) for decoding and outputting lower spatial resolution video from a compressed video bit stream for SDMCTF-encoded video. The lower spatial resolution video differs from full spatial resolution by one-level of spatial scalability in FIG. 26.

The first scheme (2600) provides a direct solution. A 3D sub-band decoder recovers the full spatial resolution video (shown as CIF video) first. (Under the assumption that the spatial high-pass ("SH") sub-bands for the second inverse spatial transform are missing, the decoder treats the SH sub-bands as empty (SH=0) in the second inverse spatial transform.) After inverse temporal decomposition, the 3D sub-band decoder downsamples the full spatial resolution video with a filter (shown as a spatial transform) to the output resolution (shown as QCIF). The decoder performs SDIMCTF, and the decoder uses many decoding resources (e.g., computational resources, reference picture buffers) when decoding CIF video in intermediate steps.

On the other hand, in the second scheme (2650), a 3D sub-band decoder performs IBIMCTF. The second scheme (2650) illustrates a heuristic way to decode low resolution video. Like the first scheme (2600), the second scheme (2650) includes entropy decoding and four levels of inverse temporal transforms. The second scheme (2650) effectively includes one fewer inverse spatial transform than the first scheme (2600). (The second inverse spatial transform and subsequent spatial transform shown for the second scheme (2650) cancel each other and may be omitted.)

In the second scheme (2650), the 3D sub-band decoder essentially treats the spatial low-pass ("SL") sub-band (output of the first inverse spatial transform) as the whole of the original video, performing inverse temporal transforms at the SL sub-band resolution. This approximates the decoding process without spatial scalability, and it has the advantages of low computational complexity and low buffer requirements (for reference pictures, etc.). Furthermore, the original resolution of the video and the spatial scalability can be totally transparent to the decoder. The performance of the scheme (2650) is satisfactory at low bit rates but not at high bit rates. In particular, as bit rate increases it becomes difficult or impossible to reconstruct high-quality low spatial resolution video, even if the bit rate is very high.

Figure 27:
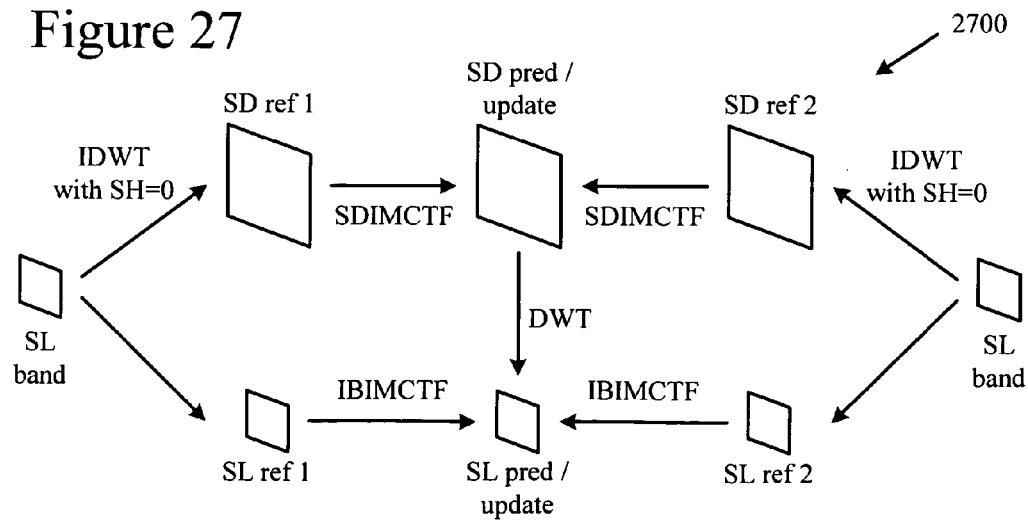
FIG. 27 is a diagram illustrating motion-compensated prediction in SDIMCTF and IBIMCTF.

A difference between the two decoding schemes (2600, 2650) shown in FIG. 26 is how the MCP and MCU steps are performed during IMCTF. FIG. 27 illustrates MCP for the two schemes (2600, 2650) in one level of IMCTF. In particular, FIG. 27 shows generation of the SL lifting signals at the prediction step from available SL sub-band information (not also SH sub-band information) in reference pictures.

For the SDIMCTF, the SL lifting signal is produced as follows:

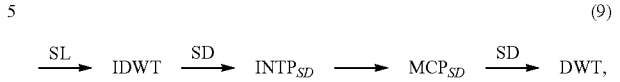

(9)

where $INTP_{SD}$ indicates interpolation on pixels in the spatial domain for reference picture information, and $MCP_{SD}$ indicates MCP in the spatial domain. A DWT is a linear operation, and:

$$DWT(F_1+F_2)=DWT(F_1)+DWT(F_2) \qquad (10).$$

To use a SL resolution buffer to hold the intermediate results, the DWT reduces the spatial-domain prediction to a prediction in the SL domain.

For the IBIMCTF, the SL lifting signal is produced as follows:

(11)

where $INTP_{SL}$ indicates interpolation on pixels in the SL domain for reference picture information, and $MCP_{SL}$ indicates MCP in the SL domain. For the sake of simplicity, the same interpolation filter is used for $INTP_{SD}$ and $INTP_{SL}$.

B. Theoretical Analysis

Various factors lead to problems with spatial scalability in 3D sub-band decoding of SDMCTF-encoded video. One factor is the inefficiency of interpolation and motion compensation in the SL domain. Another factor is the position of IMCTF (compared to the position of MCTF in encoding). Still another factor is power spectrum leak across sub-bands caused by motion compensation.

Aside from these factors, various encoding/decoding features can result in mismatches between the SDMCTF in an encoder and IBIMCTF in a decoder. Two such features are motion vector scaling and OBMC. In this section, for the sake of simplicity, it is assumed that the accuracy of motion vectors is not changed in IBIMCTF, and that the sub-pixel interpolation used for motion compensation is fine enough to exploit the motion information during IBIMCTF. Again for the sake of simplicity, OBMC is disabled, and MCP operations are assumed to be simple pixel-fetching operations only according to the applicable motion vector. Even with these simplifying assumptions, the factors listed in the preceding paragraph may degrade the performance of IBIMCTF.

1. Interpolation

Even when the same interpolation filter (such as a bilinear filter or 8-tap sinc filter) is used for both the spatial-domain interpolation and SL domain interpolation, a given fractional pixel at the same position in a frame is interpolated from different sets of pixels, due to the different scale of the two operations. This results in mismatch between the sub-pixel interpolated reference pictures.

Interpolation in the SL domain may be non-optimal for another reason. Due to the decimation aspect of a wavelet transform, the spatial LL band alone is not a complete representation of the whole low-pass signal of original video. That is, without considering the high-pass signal or when the high-pass signal is absent, part of the low-pass signal is lost, at half of the phase positions. One consequence of the decimation is the shift-variant property of spatial LL band. Due to the non-completeness of the LL band, when obtaining an interpolated low-pass frame, performing interpolation directly in the LL band (as shown in operation (12)) may be non-optimal.

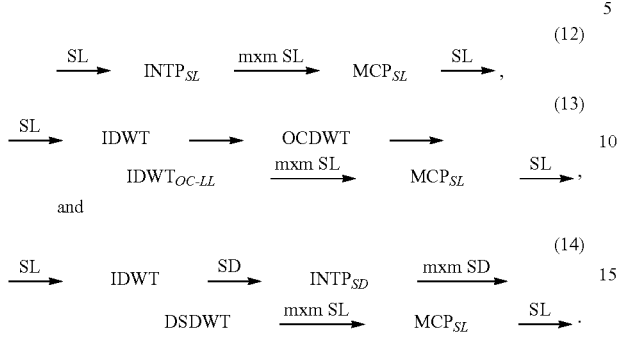

An alternative is to perform half-pixel interpolation through conversion to an overcomplete wavelet representation. The overcomplete representation from a SL sub-band can be produced by a complete-to-overcomplete DWT (not shown) or by an inverse DWT and an overcomplete DWT ("OCDWT") (shown in operation 13). This IDWT plus OCDWT combination acts as one-level interpolation. The remaining levels of interpolation can be done with conventional interpolation in the overcomplete wavelet domain, denoted as $FNTP_{OC\text{-}LL}$ in operation (13).

Conversion to a conventional overcomplete wavelet representation only provides half-pixel interpolation in the SL domain. To support quarter-pixel motion vector accuracy or finer motion in the SL domain, the decoder may use a continuous phase overcomplete wavelet transform ("CPOCWT"). For quarter-pixel locations in the SL sub-band, the decoder performs interpolation in the spatial domain, as shown in operation (14). Then, the low-pass sub-band of the interpolated frame is obtained by DWT. A DWT is a scale-sensitive operation. So as to match the DWT in the encoder, the decoder performs the OCDWT on m-sampled pixels in the interpolated frame, where m×m is the factor of spatial-domain interpolation before the OCDWT. In operation (14), DSDWT represents downsampling the spatial-domain interpolated frame into many sub-frames, performing OCDWTs on the respective sub-frames, and interleaving the obtained coefficients back. As such, a DSDWT is a kind of OCDWT.

According to each of operations (12) through (14), the decoder performs motion-compensation prediction in the SL domain on m×m reference pictures.

2. Position Swap of DWT and MCP

For IBIMCTF, even if in-band interpolation is replaced with spatial-domain interpolation as in (14), the reference pictures for MCP are still low-pass frames—the MCP occurs in the wavelet domain. Compared with the encoder, the expected ordering of the DWT and MCP is swapped (where, in the encoder, MCP precedes DWT). DWT and MCP operation are non-commutative, however, due to the shift-variant property of DWT:

$$DWT(MCP_{SD}(F_{SD})) \neq MCP_{SL}(DWT(F_{SD})) \quad (15), \text{and}$$

$$IDWT(MCP_{SL}(F_{SL})) \neq MCP_{SD}(IDWT(F_{SL})) \quad (16).$$

Assuming for the sake of simplicity that MCP involves simple, block-based motion shift operations, equation (15) can be illustrated as follows. Assume a current frame is divided into blocks $B=\{B_i|i=1,\ldots,m\}$, and that the motion vectors for these blocks are $MV=\{mv_i|i=1,\ldots,m\}$. $F_{ref}^i$ is a new version of the reference frame $F_{ref}$ where only the pixels referenced by block $B_i$ are retained and other pixels are set to zero.

$$F_{pred}(x) = \sum_{i=1}^{m} F_{ref}^i(x - mv_i), \quad (17)$$

$$DWT(MCP(F_{ref})) = DWT\left(\sum_{i=1}^{m} F_{ref}^i(x + mv_i)\right) =$$
$$\sum_{i=1}^{m} DWT(F_{ref}^i(x + mv_i)) \neq \sum_{i=1}^{m} (DWTF_{ref}^i(x + mv_i)) =$$
$$MCP\left(\sum_{i=1}^{m} DWT(F_{ref}^i)\right) =$$
$$MCP\left(DWT\left(\sum_{i=1}^{m} F_{ref}^i\right)\right) \neq MCP(DWT(F_{ref})). \quad (18)$$

The first inequality in (18) is due to the shift-variant property of DWT. The second inequality in (18) is due to overlapping and uncovering during motion shift in MCP, when motion is very complex.

One possible solution is to move the MCP to the spatial domain before DWT, as shown in operation (19). In case, the MCP is part of SDIMCTF.

$$SL \xrightarrow{} IDWT \xrightarrow{SD} INTP_{SD} \xrightarrow{} MCP_{SD} \xrightarrow{SD} DWT. \quad (19)$$

3. Power Spectrum Leak by Motion Shift

In 3D wavelet coding, spatio-temporal sub-bands are usually assumed to be independent. In many applications, spatio-temporal sub-bands are dropped at will, especially the high-pass sub-bands. In 3D sub-band coding with MCTF, however, low-pass sub-bands and high-pass sub-bands of neighboring frames are have resemblances due to power spectrum leak introduced by motion shifts.

Figure 28:
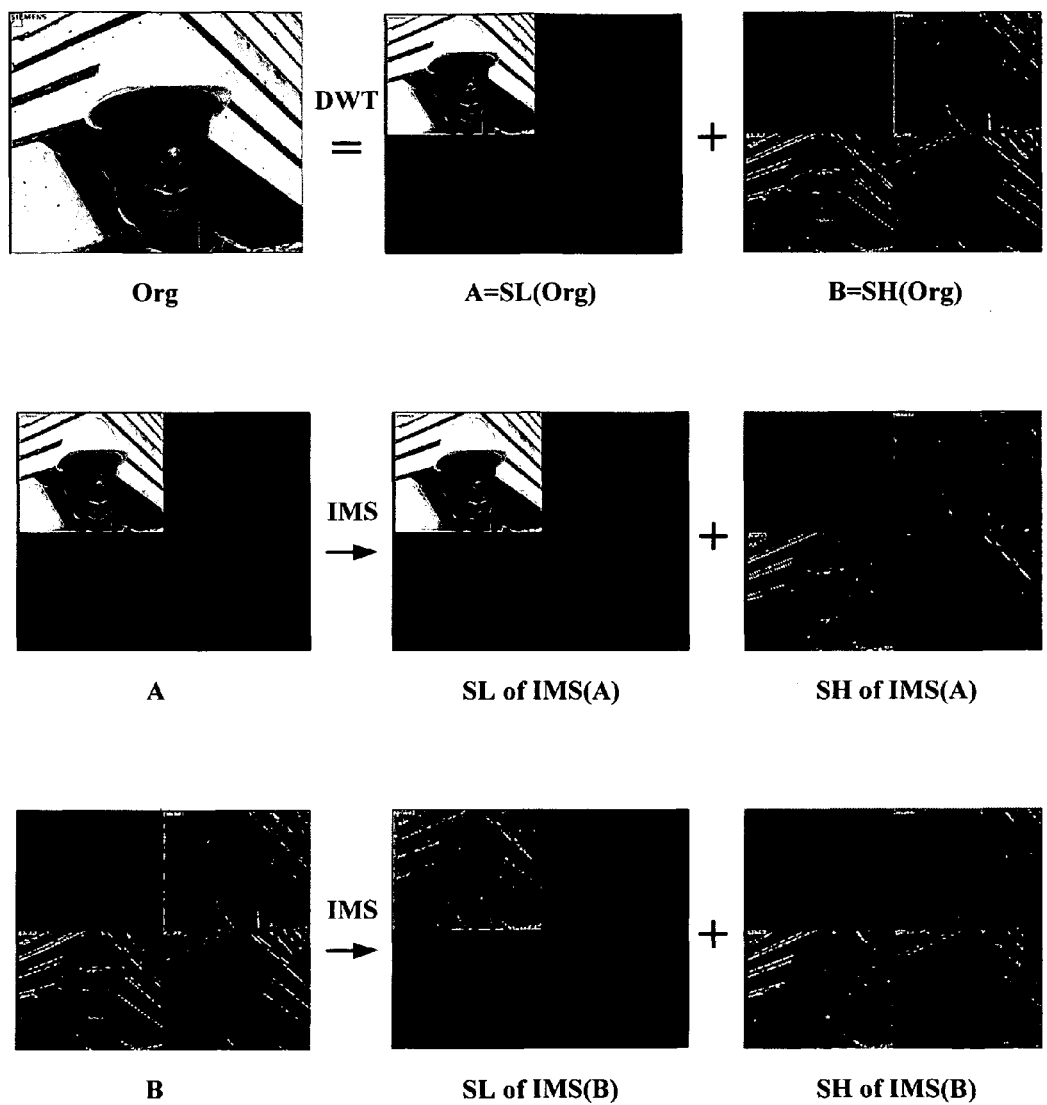
FIG. 28 is a graphic illustrating power spectrum leak due to motion shift.

When a frame that only contains a signal in one spatial sub-band is shifted according to motion, part of the signal will transfer to other spatial sub-bands. FIG. 28 illustrates the phenomenon for simple global motion. In the first row of FIG. 28, the original frame Org is divided into two parts: a SL signal A and a SH signal B. In the second row, the frame that only contains the SL signal A is shifted in the spatial domain with a simple image-domain motion shift ("IMS"), and the shifted frame now contains a SH signal. Similarly, in the third row of FIG. 28, the frame that only contains the SH signal B is shifted in the spatial domain, and the shifted frame now contains a SL signal. Spectrum leak problems become even more serious when motion is complex.

Thus, with SDMCTF in an encoder but IMCTF using SL information, the SL components of reference frames predict part of the SH components of the frames. Therefore, even if a decoder has only SL sub-band information in the beginning, the decoder gains meaningful SH sub-band information in the intermediate results of each level of IMCTF. When the decoder uses a SL resolution buffer to hold intermediate results between levels of IMCTF, however, this drops the SH sub-band information, which might have been useful for MCP in the next level of IMCTF.

Furthermore, the SH components of reference frames predict part of the SL components of the frames. To code the SL components, an encoder may exploit the SH sub-band information in reference frames. When the decoder cannot access these SH components, the absence of the SH sub-bands results in a kind of drifting. (E.g., when the encoder performs MCP from full resolution frames (including SH information), but the decoder has only SL information.) The consequence is a PSNR ceiling—the PSNR curve turns horizontal at a relatively low bit rate.

C. Examples of Improved Schemes for Decoding SDM-CTF-Encoded Video with Spatial Scalability In some embodiments, a 3D sub-band decoder uses any of several techniques to improve decoding performance when decoding SDMCTF-encoded video for lower spatial resolution output. The techniques improve decoding performance step-by-step, and mostly require no changes to the encoder and transmitted bit stream. In the aggregate, these techniques provide a flexible decoding scheme with different options at different levels of complexity.

In some schemes, a decoder allocates extra resources to decoding. In general, the decoder reconstructs better video when extra computational resources are devoted to the decoding. Moreover, the decoder reconstructs better video when extra buffer resources are devoted to storing reference picture information.

Or, an encoder or decoder emphasizes SH sub-band information for decoding SL video. For example, to incorporate SH sub-band information into IMCTF decisions, even when the decoder is only reconstructing SL resolution video, a bit stream extractor allocates bandwidth to SH coefficients, instead of dropping them completely.

Various Figures in this section (namely, FIGS. 29 through 34) show one level of spatial scalability. Alternatively, a 3D sub-band decoder outputs video for multiple levels of spatial scalability. Along the same lines, various Figures in this section show a 3D sub-band decoder that outputs QCIF video for original video encoded with MCTF at CIF resolution. The techniques and tools described herein are not limited to use with CIF and QCIF resolutions.

For many of the Figures in this section, motion vectors have half-pixel accuracy in original resolution and quarter-pixel accuracy in SL resolution. This affects operations such as sub-pixel interpolation. Alternatively, the motion vectors have other accuracies, and the decoder performs more or less sub-pixel interpolation accordingly. Moreover, although several Figures in this section show a sinc filter for interpolation, alternatively, a decoder uses another type of filter (e.g., bilinear, bicubic).

Finally, various Figures in this section show dyadic DWT and IDWT operations. Alternatively, a decoder uses other operations for a spatial transform and inverse spatial transform.

1. Scheme A: IBIMCTF (Baseline)

Figure 29:
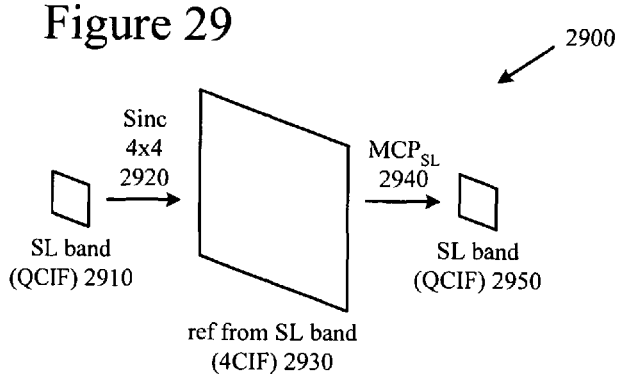
FIG. 29 is a diagram illustrating a baseline scheme for decoding SDMCTF-encoded video for output at a lower spatial resolution.

For the sake of comparison with later schemes, FIG. 29 illustrates IBIMCTF without additional computational or buffer resources dedicated during decoding. The scheme in FIG. 29 corresponds to one level of IMCTF in the IBIMCTF decoder (2650) of FIG. 26. The operations shown in FIG. 29 occur in the wavelet domain.

According to FIG. 29, a 3D sub-band decoder uses a SL buffer (2910) to store SL sub-band information for use as reference picture information. The effective resolution of the SL sub-band information is QCIF.

The decoder performs sub-pixel interpolation (2920) using a 4×4 sinc filter. (The motion vector accuracy for MCP in the SL domain is quarter-pixel accuracy.) This produces a sub-pixel interpolated reference frame (2930). The effective resolution of the interpolated reference frame is 4CIF (704×576 pixels).

The decoder performs MCP (2940) in the SL domain, using the interpolated reference frame (2930) for reference picture information. The $MCP_{SL}$ (2940) produces a prediction (2950) in the SL domain. Again, the effective resolution of the prediction (2950) is QCIF.

2. Scheme B: Optimized IBIMCTF

Figure 30:
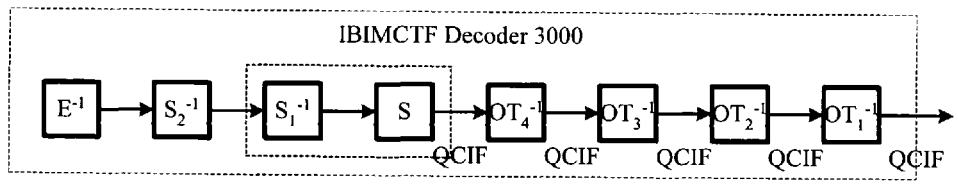
FIG. 30 is a block diagram illustrating a generalized scheme for decoding SDMCTF-encoded video for output at a lower spatial resolution
Figure 31:
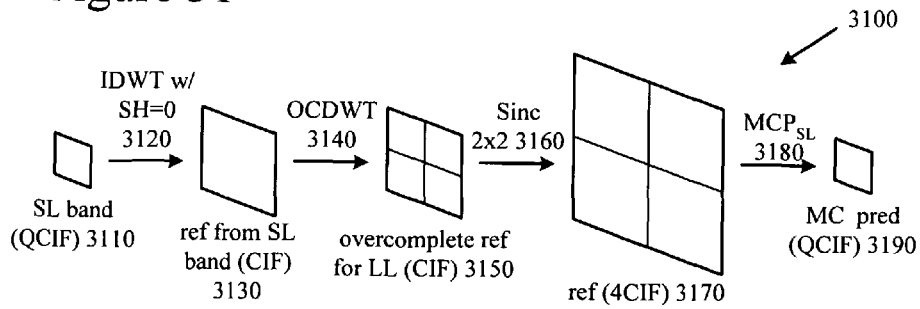
FIGS. 31, 32, 33, and 34 are diagrams illustrating schemes for decoding SDMCTF-encoded video for output at a lower spatial resolution.
Figure 32:
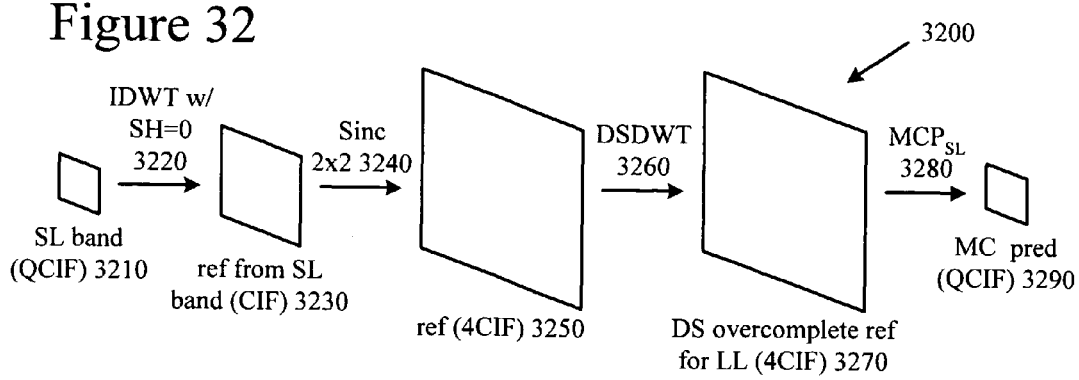
Figure 33:
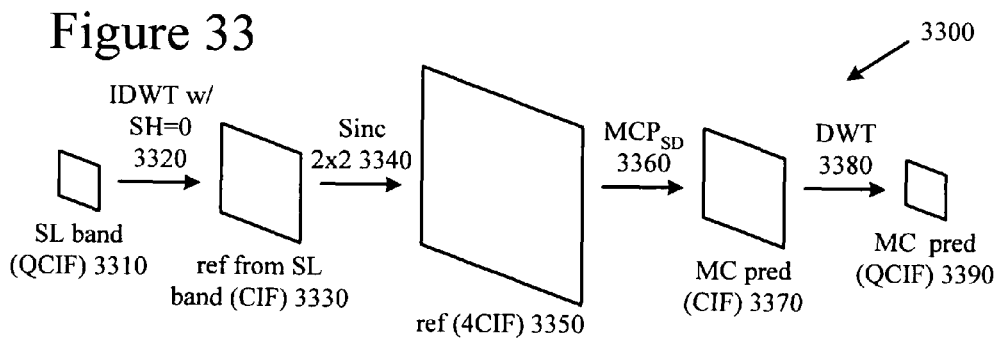

In a second type of scheme, a 3D sub-band decoder improves IMCTF by moving interpolation operations and/or MCP operations into the spatial domain. The decoder still uses SL resolution buffers for reference picture information. FIG. 30 shows a generalized framework for the second type of scheme, in which the inverse temporal transforms are denoted as optimized inverse temporal transforms $OT_i^{-1}$. FIGS. 31, 32, and 33 show examples of one level of IMCTF according to different variations of the second type of scheme.

a. Scheme B1

According to the scheme shown in FIG. 31 (scheme B 1), a 3D sub-band decoder uses a SL buffer (3110) to store SL sub-band information for use as reference picture information. The decoder performs an IDWT operation (3120) using the buffered SL sub-band information. The SH sub-bands are taken as empty (SH=0) in the IDWT operation (3120). The IDWT operation (3120) thus produces a reference frame (3130) from the SL sub-band information. When the effective resolution of the SL sub-band is QCIF, the effective resolution of the reference frame (3130) is CIF.

The decoder then performs an OCDWT (3140) operation on the reference frame (3130), producing an overcomplete representation (3150). Alternatively, the decoder performs a complete-to-overcomplete DWT rather than the IDWT (3120) and OCDWT (3140). Either way, the overcomplete representation (3150) includes phase-shifted values suitable for half-pixel MCP.

In preparation for quarter-pixel MCP, the decoder then performs sub-pixel interpolation (3160) using a 2×2 sinc filter. This produces a sub-pixel interpolated reference frame (3170). The effective resolution of the interpolated reference frame (3170) is 4CIF.

The decoder performs MCP (3180) in the SL domain, using the interpolated reference frame (3170) for reference picture information. The $MCP_{SL}$ (3180) produces a prediction (3190) in the SL domain. Again, the effective resolution of the prediction (3190) is QCIF.

b. Scheme B2

According to the scheme shown in FIG. 32 (scheme B2), a 3D sub-band decoder uses a SL buffer (3210) to store SL sub-band information for use as reference picture information. The decoder performs an IDWT operation (3220) using the buffered SL sub-band information. The SH sub-bands are taken as empty (SH=0) in the IDWT operation (3220). The IDWT operation (3220) thus produces a reference frame (3230) from the SL sub-band information. When the effective resolution of the SL sub-band is QCIF, the effective resolution of the reference frame (3230) is CIF.

The decoder performs sub-pixel interpolation (3240) using a 2×2 sinc filter. This produces a sub-pixel interpolated reference frame (3250), with resolution increased by a factor of two horizontally and vertically. The effective resolution of the interpolated reference frame (3250) is 4CIF.

The decoder then performs a DSDWT (3260) operation on the interpolated reference frame (3250). This produces an overcomplete representation (3270) of the reference frame information. The overcomplete representation (3270) includes phase-shifted values suitable for quarter-pixel MCP.

The decoder performs MCP (3280) in the SL domain, using the interpolated reference frame (3270) for reference picture information. The MCP$_{SL}$ (3280) produces a prediction (3290) in the SL domain. Again, the effective resolution of the prediction (3290) is QCIF.

c. Scheme B3

According to the scheme shown in FIG. 33 (scheme B3), a 3D sub-band decoder uses a SL buffer (3310) to store SL sub-band information for use as reference picture information. The decoder performs an IDWT operation (3320) using the buffered SL sub-band information. The SH sub-bands are taken as empty (SH=0) in the IDWT operation (3320). The IDWT operation (3320) thus produces a reference frame (3330) from the SL sub-band information. When the effective resolution of the SL sub-band is QCIF, the effective resolution of the reference frame (3330) is CIF.

The decoder performs sub-pixel interpolation (3340) using a 2×2 sinc filter. This produces a sub-pixel interpolated reference frame (3350), with resolution increased by a factor of two horizontally and vertically. The effective resolution of the interpolated reference frame (3350) is 4CIF.

The decoder performs MCP (3360) in the spatial domain, using the interpolated reference frame (3350) for reference picture information. The MCP$_{SD}$ (3360) (with half-pixel accurate motion vectors) produces a prediction (3370) in the spatial domain. In this case, the effective resolution of the prediction (3370) is CIF.

The decoder performs a DWT operation (3380) on the prediction (3370), producing a lower spatial resolution version (3390) of the prediction (3370). The effective resolution of the lower spatial resolution prediction (3390) is QCIF.

3. Scheme C: SDIMCTF

Figure 34:
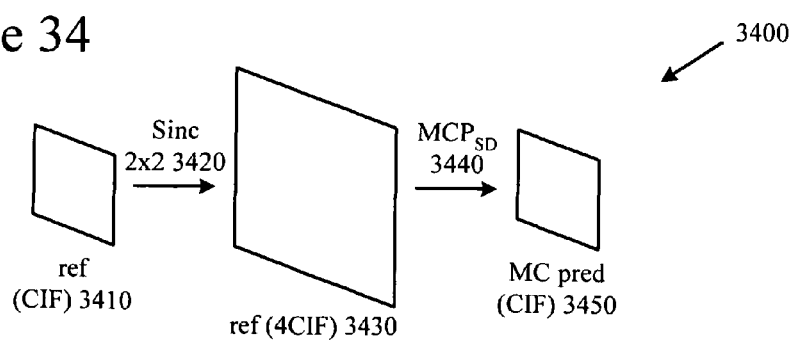

FIG. 34 illustrates SDIMCTF with additional computational and buffer resources dedicated during decoding. The scheme in FIG. 34 corresponds to one level of IMCTF in the SDIMCTF decoder (2600) of FIG. 26. The operations shown in FIG. 34 occur in the spatial domain. Compared to scheme B3, the reference picture buffer in scheme C is a SD buffer, and the decoder does not perform IDWT and DWT operations per level of IMCTF. In this way, the SH information in intermediate results is retained for use in later SDIMCTF.

According to scheme C, a 3D sub-band decoder uses a SD buffer (3410) to store spatial-domain information for use as reference picture information. For the first inverse temporal transform, the final inverse spatial transform produces the information in the SD buffer (3410) from SL sub-band information. For subsequent inverse temporal transforms, the information in the SD buffer (3410) is retained from earlier inverse temporal transforms, and the information in the SD buffer (3410) may include SH information generated due to power spectrum leaks. The effective resolution of the information in the SD buffer (3410) is CIF.

The decoder performs sub-pixel interpolation (3420) using a 2×2 sinc filter. This produces a sub-pixel interpolated reference frame (3430), with resolution increased by a factor of two horizontally and vertically. The effective resolution of the interpolated reference frame (3430) is 4CIF.

The decoder performs MCP (3440) in the spatial domain, using the interpolated reference frame (3430) for reference picture information. The MCP$_{SD}$ (3440) (with half-pixel accurate motion vectors) produces a prediction (3450) in the spatial domain. In this case, the effective resolution of the prediction (3450) is CIF.

4. Scheme D: SDIMCTF with SH Coefficients

To handle the SH drifting problem, bandwidth is allocated to SH coefficients in a bit stream extractor. This is unlike conventional spatial scalability, according to which the SH sub-band information is simply dropped when decoding for SL resolution video output.

To determine the optimal rate for SH coefficients, the contribution of the SH coefficients to reducing the distortion of low spatial resolution video is measured. (In contrast, with conventional spatial scalability practices, the contribution of the SH coefficients to reducing distortion of the whole, original spatial resolution video is measured.) In other words, even when only low spatial resolution video is output, the gain factors for SH sub-bands are considered so as to account for the benefits (e.g., improved motion-compensated prediction accuracy) of the SH sub-band in reducing distortion in the SL video. In this way, the SH sub-band information is more likely to be carried forward into decoding of SL video.

In scheme D, the current gain factors for SH sub-bands are used when decoding SL video, as if the decoder was extracting original resolution video. Coefficients of both SL and SH sub-bands are allowed to be included into final bit stream. Alternatively, different gain factors are computed for the SH sub-bands for original spatial resolution decoding and SL decoding.

In scheme D, a 3D sub-band decoder uses the decoding framework shown in FIG. 34 for one level of IMCTF when decoding the SL video. The reference picture buffer (3410) is a SD buffer. For the first inverse temporal transform, the SD buffer includes reference picture information reconstructed using SL sub-band information and (at least some) SH sub-band information, even though the final output video will have only SL resolution effectively. SH information in intermediate results is also retained for use in later SDIMCTF.

The decoder performs sub-pixel interpolation (3420) using a 2×2 sinc filter. This produces a sub-pixel interpolated reference frame (3430), with resolution increased by a factor of two horizontally and vertically. The decoder performs MCP (3440) in the spatial domain, using the interpolated reference frame (3430) for reference picture information. The MCP$_{SD}$ (3440) (with half-pixel accurate motion vectors) produces a prediction (3450) in the spatial domain.

5. Comparison

The following table compares characteristics of schemes A, B1, B2, B3, C, and D.

| Scheme | SL coeffs only | SL buffer only | In-band INTP | In-band MCP |
|---|---|---|---|---|
| A | Yes | Yes | Yes | Yes |
| B1 | Yes | Yes | Yes | Yes |
| B2 | Yes | Yes | No | Yes |
| B3 | Yes | Yes | No | No |
| C | Yes | No | No | No |
| D | No | No | No | No |

Alternatively, the decoder uses some other combination of spatial-domain interpolation, spatial-domain motion compensation, spatial-domain reference picture buffers, and/or use of SH information to improve decoding performance when decoding SDMCTF-encoded video for lower spatial resolution output.

VI. Continuous-Phase Overcomplete Sub-Band Transforms

One problem with IBMCTF and IBIMCTF is how to reduce the effect of shift-variance of wavelet transforms on motion estimation and compensation—a shift/motion in the image domain does not map to the transform domain directly. Some techniques map integer pixel movements to the transform domain. (See, e.g., Y. A. Andreopoulos et al., "A New Method for Complete-to-Overcomplete Discrete Wavelet Transforms," Proc. IEEE Conf. Digital Signal Proc. (2002); and X. Li, L. Kerofsky, S. Lei, "All-phase Motion Compensated Prediction for High Performance Video Coding," Proc. ICIP, vol. 3, pp. 538-541 (2001).) This section describes techniques for mapping fractional pixel movements to phase changes in the transform domain. By doing so, motion estimation and compensation can be done with more accuracy, which can influence coding performance significantly.

This section illustrates a continuous-phase overcomplete sub-band transform ("CPOST") with an example of a one-level, one-dimensional wavelet transform. The decomposition process of a p-pixel CPOST has four sequential stages: (1) p-pixel interpolation, (2) continuous shifting, (3) downsampling, and (4) wavelet transform.

Consider a continuous p-pixel phase overcomplete transform for (p=1, ½, ¼, ⅛, ... ). When p=1, CPOST is the integer-pixel phase overcomplete case. Other values of p present sub-pixel phase overcomplete cases. Suppose that the input signal is a sequence in the discrete time domain $\{x(n)\}$, n=0, 1, 2, 3, .... The encoder or decoder first does p-pixel interpolation of $\{x(n)\}$, then continuously shifts the p-pixel interpolation sequence $$\frac{2}{p} - 1$$

times and downsamples the shifted sequences. This produces a set of continuous phase-shifting sequences of $\{x(n))\}$, described by $\{x_p^i(n)\}$, $$i = 0, 1, \ldots, \frac{2}{p} - 1.$$

Finally, the encoder or decoder performs a wavelet decomposition transform on $\{x_p^i(n)\}$.

For the case of p=½, the continuous phase-shifting sequence is as follows. $\{y(n)\}$ is the sequence which consists of the ½-pixel interpolation points of $\{x(n)\}$.

... $x(n) y(n) x(n+1) y(n+1) x(n+2) y(n+2) x(n+3) y(n+3)$ ...

0-phase ... $x(n) x(n+1) x(n+2)$ ...

½-phase ... $y(n) y(n+1) y(n+2)$ ...

1-phase ... $x(n+1) x(n+2) x(n+3)$ ...

³⁄₂-phase ... $y(n+1) y(n+2) y(n+3)$ ...

A 2D CPOST can be implemented by doing two sequential 1D CPOSTs along the horizontal and vertical directions, respectively.

In the wavelet domain, the continuous p-pixel phase-shifting sequences can be obtained using a set of prediction filters $$F_p^i(z) \; i = 0, 1, \ldots, \frac{2}{p} - 1.$$

These filters are equivalent to shifting the sub-pixel interpolation sequence continuously and down-sampling these shifted sequences. The decomposition process of p-pixel CPOST can be presented as an application of the filters to $\{x(n)\}$, followed by processing the results with a low-pass filter $G_L(z)$ and separately with a high-pass filter $G_H(z)$ for the wavelet decomposition transform, then downsampling. $l_p^i(n)$ and $h_p^i(n)$ for $$\left( i = 0, 1, 2, \ldots, \frac{2}{p} - 1 \right)$$

are the low-pass and high-pass coefficients, respectively, of CPOST. In the z domain, $X(z)$ and $X_p^i(z)$ are the z transforms of $\{x(n)\}$ and $\{x_p^i(n)\}$, respectively. $L_p^i(z)$ and $H_p^i(z)$ are the z transforms of $l_p^i(n)$ and $h_p^i(n)$, respectively.

$$X_p^i(z) = F_p^i(z)X(z) \; i = 0, 1, 2, \ldots, \frac{2}{p} - 1, \tag{20}$$

$$L_p^i(z) = 1/2[G_L(z^{1/2})X_p^i(z^{1/2}) + G_L(-z^{1/2})X_p^i(-z^{1/2})] \tag{21}$$

$$H_p^i(z) = 1/2[G_H(z^{1/2})X_p^i(z^{1/2}) + G_H(-z^{1/2})X_p^i(-z^{1/2})].$$

$$i = 0, 1, 2, 3, \ldots, \frac{2}{p} - 1$$

The decomposition process of p-pixel CPOST corresponds to the matrix expression:

$$\begin{bmatrix} L_p^0(z) \\ H_p^0(z) \end{bmatrix} = \frac{1}{2} \begin{bmatrix} G_L(z^{1/2}) & G_L(-z^{1/2}) \\ G_H(z^{1/2}) & G_H(-z^{1/2}) \end{bmatrix} \begin{bmatrix} X(z^{1/2}) \\ X(-z^{1/2}) \end{bmatrix}, \tag{22}$$

$$\begin{bmatrix} L_p^i(z) \\ H_p^i(z) \end{bmatrix} = \frac{1}{2} \begin{bmatrix} G_L(z^{1/2}) & G_L(-z^{1/2}) \\ G_H(z^{1/2}) & G_H(-z^{1/2}) \end{bmatrix} \begin{bmatrix} X_p^i(z^{1/2}) \\ X_p^i(-z^{1/2}) \end{bmatrix} \tag{23}$$

$$i = 1, 2, 3, \ldots, \frac{2}{p} - 1$$

Expression (22) presents the wavelet decomposition transform of the original sequence without shifting. Expression (23) presents the wavelet decomposition transform of the continuous sub-phase shifting sequence. Expression (23) and (24) make up the CPOST. As for the relation between $L_p^i(z)$, $H_p^i(z)$ and $L_p^0(z)$, $H_p^0(z)$. From (20) to (23):

$$\begin{bmatrix} L_p^i(z) \\ H_p^i(z) \end{bmatrix} = \tag{24}$$

$$\frac{1}{2} \begin{bmatrix} G_L(z^{1/2}) & G_L(-z^{1/2}) \\ G_H(z^{1/2}) & G_H(-z^{1/2}) \end{bmatrix} \begin{bmatrix} F_p^i(z^{1/2}) & 0 \\ 0 & F_p^i(-z^{1/2}) \end{bmatrix} \begin{bmatrix} X(z^{1/2}) \\ X(-z^{1/2}) \end{bmatrix}.$$

From (22) and (24):

$$\begin{bmatrix} L_p^i(z) \\ H_p^i(z) \end{bmatrix} = G(z) \begin{bmatrix} F_p^i(z^{1/2}) & 0 \\ 0 & F_p^i(-z^{1/2}) \end{bmatrix} G^{-1}(z) \begin{bmatrix} L^0(z) \\ H^0(z) \end{bmatrix} \tag{25}$$

where $$G(z) = \begin{bmatrix} G_L(z^{1/2}) & G_L(-z^{1/2}) \\ G_H(z^{1/2}) & G_H(-z^{1/2}) \end{bmatrix},$$

and where $G^{-1}(z)$ is the inverse matrix of $G(z)$.

According to (25), the transform matrix $T_p^i(z)$ and inverse transform matrix $IT_p^i(z)$ can be obtained from the wavelet transform of the original sequence (i.e., the 0-phase shifting sequence) to get the wavelet transform of the sub-pixel phase-shifting sequences.

$$T_p^i(z) = G(z) \begin{bmatrix} F_p^i(z^{1/2}) & 0 \\ 0 & F_p^i(-z^{1/2}) \end{bmatrix} G^{-1}(z). \quad (26)$$

$$IT_p^i(z) = [T_p^i(z)]^{-1} = G^{-1}(z) \begin{bmatrix} F_p^i(z^{1/2}) & 0 \\ 0 & F_p^i(-z^{1/2}) \end{bmatrix}^{-1} G(z). \quad (27)$$

From (26), if there exists an expression (28), the result of sub-pixel interpolation after overcomplete wavelet transform is equal to the result of overcomplete wavelet transform after sub-pixel interpolation in the discrete time domain. Otherwise, the result of sub-pixel interpolation after overcomplete wavelet transform is not equal to the result of overcomplete wavelet transform after sub-pixel interpolation in the discrete time domain.

$$\begin{bmatrix} F_p^i(z^{1/2}) & 0 \\ 0 & F_p^i(-z^{1/2}) \end{bmatrix} G^{-1}(z) = G^{-1}(z) \begin{bmatrix} F_p^i(z^{1/2}) & 0 \\ 0 & F_p^i(-z^{1/2}) \end{bmatrix}. \quad (28)$$

Generally, expression (28) does not exist, which suggests not exchanging the order of sub-pixel interpolation and overcomplete wavelet transform for in-band video coding. According to (25), however, the CPOST coefficients of an original sequence can be derived from its wavelet transform coefficients.

The CPOST method realizes not only the integer-pixel phase overcomplete wavelet transform but also the sub-pixel phase overcomplete wavelet transform. The continuous phase overcomplete transform matrix coefficients for p=½ with a 5-3 wavelet transform and 6-tap interpolation filters follow. The coefficients of each element for transform matrices $T_{1/2}^1(z)$, $T_{1/2}^2(z)$, and $T_{1/2}^3(z)$ are as follows:

$T_{1/2}^1(0,0)$=[0.0098−0.0957 0.8867 0.2227−0.0215−0.0020]

$T_{1/2}^1(0,1)$=[−0.0024 0.0488−0.2290 0.3242−0.1440 0.0020 0.0005]

$T_{1/2}^1(1,0)$=[0.0391−0.2344 0.3438−0.1406−0.0078]

$T_{1/2}^1(1,1)$=[−0.0098 0.1582 0.3633−0.5352 0.0215 0.0020]

$T_{1/2}^2(0,0)$=[−0.0625 0.5625 0.5625−0.0625]

$T_{1/2}^2(0,1)$=[0.015625−0.25 0.46875−0.25 0.01565]

$T_{1/2}^2(1,0)$=[−0.25 0.5−0.25]

$T_{1/2}^2(1,1)$=[0.0625−0.5625−0.5625 0.0625]

$T_{1/2}^3(0,0)$=[−0.0020−0.0215 0.2227 0.8867−0.0957 0.0098]

$T_{1/2}^3(0,1)$=[0.0005 0.0020−0.1440 0.3242−0.2290 0.0488−0.0024]

$T_{1/2}^3(1,0)$=[−0.0078−0.1406 0.3438−0.2344 0.0391]

$T_{1/2}^3(1,1)$=[0.0020 0.02148−0.5352 0.3633 0.1582−0.0098]

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a video decoder, a method comprising:
   receiving, at the computing device that implements the video decoder, video encoded by spatial-domain motion-compensated temporal filtering ("SDMCTF") at a first spatial resolution, the SDMCTF being characterized by encoding with motion-compensated temporal filtering of spatial-domain values in a spatial domain before spatial decomposition into plural sub-band domains including a low-pass sub-band domain at a second spatial resolution lower than the first spatial resolution, wherein the SDMCTF produces a motion-compensated prediction in the spatial domain at the first spatial resolution; and
   with the computing device that implements the video decoder, decoding at least part of the video with in-band inverse motion-compensated temporal filtering ("IBIM-CTF") for output at the second spatial resolution lower than the first spatial resolution, the IBIMCTF being characterized by inverse motion-compensated temporal filtering of sub-band values, including performing interpolation for one or more reference pictures, wherein the interpolation is not in-band interpolation on buffered spatial low-pass sub-band information, and wherein the IBIMCTF produces a motion-compensated prediction in the low-pass sub-band domain at the second spatial resolution.

2. The method of claim 1 wherein the decoding comprises:
   performing an inverse spatial sub-band transform on the buffered spatial low-pass sub-band information;
   performing an overcomplete spatial sub-band transform on results of the inverse spatial sub-band transform, wherein the interpolation applies to results of the overcomplete spatial sub-band transform; and
   performing the motion-compensated prediction for the IBIMCTF on results of the interpolation.

3. The method of claim 2 wherein the inverse spatial sub-band transform is an inverse discrete wavelet transform ("IDWT"), and wherein the overcomplete spatial sub-band transform is an overcomplete discrete wavelet transform ("DWT").

4. The method of claim 1 wherein the decoding comprises:
   performing an inverse spatial sub-band transform on the buffered spatial low-pass sub-band information, wherein the interpolation applies to results of the inverse spatial sub-band transform;
   performing a downsampling discrete wavelet transform ("DSDWT") on results of the interpolation; and
   performing the motion-compensated prediction for the IBIMCTF on results of the DSDWT.

5. The method of claim 4 wherein the inverse spatial sub-band transform is an inverse discrete wavelet transform ("IDWT"), and wherein the DSDWT is an m-sampled overcomplete discrete wavelet transform ("DWT").

6. The method of claim 1 wherein the motion-compensated prediction for the IBIMCTF uses motion information from the SDMCTF.

7. The method of claim 1 wherein the decoding further comprises performing an inverse spatial sub-band transform on the buffered spatial low-pass sub-band information but not any spatial high-pass sub-band information, and wherein the interpolation follows the inverse spatial sub-hand transform.

8. The method of claim 1 wherein the first spatial resolution is double the second spatial resolution horizontally and vertically.

9. In a computing device that implements a video decoder, a method comprising:

receiving, at the computing device that implements the video decoder, video encoded by spatial-domain motion-compensated temporal filtering ("SDMCTF") at a first spatial resolution, the SDMCTF being characterized by encoding with motion-compensated temporal filtering of spatial-domain values in a spatial domain before spatial decomposition into plural sub-band domains including a low-pass sub-band domain at a second spatial resolution lower than the first spatial resolution; and with the computing device that implements the video decoder, decoding at least part of the video with spatial-domain inverse motion-compensated temporal filtering ("SDIMCTF") for output at the second spatial resolution lower than the first spatial resolution, the SDIMCTF being characterized by inverse motion-compensated temporal filtering of spatial-domain values, wherein the SDIMCTF uses one or more reference pictures to produce a motion-compensated prediction in the spatial domain at the first spatial resolution, and wherein the one or more reference pictures for the SDIMCTF are reconstructed from received spatial low-pass sub-band information for the low-pass sub-band domain at the second spatial resolution but not from received spatial high-pass sub-band information associated with resolution enhancement up to the first spatial resolution.

10. The method of claim 9 wherein the decoding comprises:

performing an inverse spatial sub-band transform on the received spatial low-pass sub-band information but not any spatial high-pass sub-band information;

performing spatial-domain interpolation on results of the inverse spatial sub-band transform;

performing the motion-compensated prediction for the SDIMCTF using results of the spatial-domain interpolation as reference picture information; and performing a spatial sub-band transform on results of the motion-compensated prediction for the SDIMCTF.

11. The method of claim 10 wherein the inverse spatial sub-band transform is an inverse discrete wavelet transform ("IDWT"), and wherein the spatial sub-band transform is a discrete wavelet transform ("DWT").

12. The method of claim 10 wherein one or more buffers store the received spatial low-pass sub-band information but not spatial high-pass sub-band information.

13. The method of claim 9 wherein the decoding comprises:

performing spatial-domain interpolation on buffered spatial-domain information; and performing the motion-compensated prediction for the SDIMCTF using results of the spatial-domain interpolation as reference picture information.

14. The method of claim 13 wherein for an initial level of the SDIMCTF the buffered spatial-domain information is generated from the received spatial low-pass sub-band information but not any spatial high-pass sub-band information, and wherein for one or more subsequent levels of the SDIMCTF the buffered spatial-domain information retains spatial high-pass sub-band information generated as intermediate results of the SDIMCTF.

15. In a computing device that implements a video decoder, a method comprising:

receiving, at the computing device that implements the video decoder, video encoded by spatial-domain motion-compensated temporal filtering ("SDMCTF") at a first spatial resolution, the SDMCTF being characterized by encoding with motion-compensated temporal filtering of spatial-domain values in a spatial domain before spatial decomposition; and with the computing device that implements the video decoder, decoding at least part of the video with spatial-domain inverse motion-compensated temporal filtering ("SDIMCTF") for output at a second spatial resolution lower than the first spatial resolution, the SDIMCTF being characterized by inverse motion-compensated temporal filtering of spatial-domain values, wherein the SDIMCTF produces a motion-compensated prediction in the spatial domain at the first spatial resolution, and wherein the decoding includes using spatial high-pass sub-band information associated with the first spatial resolution to improve motion compensation performance in the SDIMCTF without using the spatial high-pass sub-band information to enhance spatial resolution up to the first spatial resolution.

16. The method of claim 15 wherein the decoding comprises:

performing spatial-domain interpolation on buffered spatial-domain information; and performing the motion-compensated prediction for the SDIMCTF using results of the spatial-domain interpolation as reference picture information.

17. The method of claim 16 wherein the spatial high-pass sub-band information is generated as intermediate results of the SDIMCTF and retained as the buffered spatial-domain information.

18. The method of claim 16 wherein the spatial high-pass sub-band information is part of the received video, and wherein the buffered spatial-domain information is generated from received spatial low-pass sub-band information and the received spatial high-pass sub-band information.

19. The method of claim 15 wherein using the spatial high-pass sub-band information helps control drift in the SDIMCTF.

20. The method of claim 15 wherein one or more gain factors associated with the spatial high-pass sub-band information account for how the spatial high-pass sub-band information reduces distortion in the output at the second spatial resolution.

* * * * *